US012719178B2

(12) United States Patent
Woo et al.

(10) Patent No.: US 12,719,178 B2
(45) Date of Patent: Aug. 25, 2026

(54) ANTENNA MODULE IMPLEMENTED AS MULTI-LAYER SUBSTRATE, AND ELECTRONIC DEVICE INCLUDING SAME

(71) Applicant: LG ELECTRONICS INC., Seoul (KR)

(72) Inventors: Seungmin Woo, Seoul (KR); Yusuhk Suh, Seoul (KR); Dongik Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 54 days.

(21) Appl. No.: 18/988,397

(22) Filed: Dec. 19, 2024

(65) Prior Publication Data

US 2025/0132504 A1 Apr. 24, 2025

Related U.S. Application Data

(63) Continuation of application No. 18/041,332, filed as application No. PCT/KR2021/010770 on Aug. 13, 2021, now Pat. No. 12,191,572.

(30) Foreign Application Priority Data

Oct. 29, 2020 (KR) ........................ 10-2020-0142469

(51) Int. Cl.
*H01Q 21/06* (2006.01)
*H01Q 9/16* (2006.01)
(Continued)

(52) U.S. Cl.
CPC ............. *H01Q 21/062* (2013.01); *H01Q 9/16* (2013.01); *H01Q 19/06* (2013.01); *H01Q 21/08* (2013.01)

(58) Field of Classification Search
CPC ........ H01Q 9/16; H01Q 19/06; H01Q 21/062; H01Q 21/08
See application file for complete search history.

(56) References Cited

U.S. PATENT DOCUMENTS

2017/0201011 A1 7/2017 Khripkov et al.
2018/0294576 A1* 10/2018 Niakan ................ H01Q 1/2258
(Continued)

FOREIGN PATENT DOCUMENTS

KR 10-2011-0049544 5/2011
KR 10-2019-0061161 6/2019
(Continued)

OTHER PUBLICATIONS

United States Patent and Trademark Office U.S. Appl. No. 18/041,332, Notice of Allowance dated Sep. 3, 2024, 9 pages.
(Continued)

*Primary Examiner* — Daniel Munoz
(74) *Attorney, Agent, or Firm* — LEE, HONG, DEGERMAN, KANG & WAIMEY

(57) ABSTRACT

This electronic device comprises: a main frame disposed along a peripheral region of a display and extending along a side region and a rear region of the electronic device; and an antenna module disposed in an inner space of the main frame and configured to radiate a radio signal in a forward direction or a downward direction of the electronic device through the main frame. The antenna module comprises: a first dielectric layer disposed spaced apart from one side of the antenna substrate in a first direction in which antenna elements radiate signals; a second dielectric layer disposed spaced apart from the first dielectric layer in the first direction; and an air gap layer disposed between the first dielectric layer and the second dielectric layer.

20 Claims, 37 Drawing Sheets

(51) Int. Cl.

| | |
|---|---|
| ***H01Q 19/06*** | (2006.01) |
| ***H01Q 21/08*** | (2006.01) |

(56) References Cited

U.S. PATENT DOCUMENTS

| | | | | |
|---|---|---|---|---|
| 2022/0069442 | A1* | 3/2022 | Kim ......................... | H04B 1/40 |
| 2023/0268669 | A1 | 8/2023 | Park et al. | |
| 2023/0299502 | A1 | 9/2023 | Woo et al. | |

FOREIGN PATENT DOCUMENTS

| | | |
|---|---|---|
| KR | 10-2019-0061795 | 6/2019 |
| KR | 10-2020-0100634 | 8/2020 |
| KR | 10-2020-0101172 | 8/2020 |

OTHER PUBLICATIONS

PCT International Application No. PCT/KR2021/010770, International Search Report dated Nov. 26, 2021, 6 page.

* cited by examiner (a)

(b)

(a)

(b)

(a)

(b)

(a)

(b)

(a)

(b)

(a)

(b)

(a) (b)

| NAME | THETA | Ang | Mag |
|---|---|---|---|
| m1 | 90.0000 | 90.0000 | 7.9498 |
| m2 | 90.0000 | 90.0000 | 13.0113 |

ANTENNA MODULE IMPLEMENTED AS MULTI-LAYER SUBSTRATE, AND ELECTRONIC DEVICE INCLUDING SAME

CROSS-REFERENCE TO RELATED APPLICATIONS

This application is a continuation of U.S. patent application Ser. No. 18/041,332, filed on Feb. 10, 2023, which is the National Stage filing under 35 U.S.C. 371 of International Application No. PCT/KR2021/010770, filed on Aug. 13, 2021, which claims the benefit of earlier filing date and right of priority to Korean Application No. 10-2020-0142469, filed on Oct. 29, 2020, the contents of which are all hereby incorporated by reference herein in their entireties.

TECHNICAL FIELD

The present disclosure relates to an antenna module and an electronic device including the same. A particular implementation relates to an antenna module implemented as a multi-layer substrate, and an electronic device including the antenna module.

BACKGROUND ART

As functions of electronic devices diversify, an image display apparatus such as a multimedia player having composite functions such as playback of music or video files, games, broadcasting reception, etc. may be implemented.

The image display apparatus is an apparatus configured to playback image content, and receives an image from various sources and plays the image back. The image display apparatus is implemented as various devices such as a smartphone, a tablet PC, a laptop computer, a TV, etc. The image display apparatus such as a smart TV, etc. may provide an application for providing web content such as a web browser, etc.

A communication module including an antenna may be provided so that the electronic device such as the image display device may perform communication with a neighboring electronic device. Recently, as a display area of the image display device is enlarged, an arrangement space of the communication module including the antenna is reduced. Accordingly, there is an increasing need for arranging an antenna in a multi-layer circuit substrate on which the communication module is implemented.

A WiFi wireless interface may be taken into account, as an interface for a communication service between electronic devices. When using such a WiFi wireless interface, a millimeter wave (mmWave) band may be used for high-speed data transmission between electronic devices. In particular, high-speed data transmission between electronic devices may be performed using a wireless interface such as the 802.11ay wireless interface.

In relation to this, an array antenna capable of operating in a mmWave band may be mounted in the antenna module. However, electronic components such as an antenna and a transceiver circuit arranged in such an antenna module are configured to be electrically connected to each other. To do so, a transceiver circuit may be operably combined with the antenna module, and the antenna module may be configured as a multi-layer substrate.

Antenna elements of the antenna module in a form of a multi-layer substrate may radiate a radio signal in one side direction of the antenna module. However, this side direction radiation structure has a problem such that a specific antenna structure capable of increasing a gain of the antenna element has not been provided.

DISCLOSURE OF INVENTION

Technical Problem

Therefore, to obviate those problems, an aspect of the detailed description is directed to solving the aforementioned problems and other drawbacks. Another aspect of the present disclosure is to provide a broadband antenna module operating in a mmWave band, and an electronic device including the broadband antenna module.

Another aspect of the present disclosure is to enhance an antenna gain by enhancing directivity of an antenna element operating in a mmWave band.

Another aspect of the present disclosure is to enhance an antenna gain by enhancing efficiency of an antenna element operating in a mmWave band.

Another aspect of the present disclosure is to enhance an antenna gain in a desired direction using a dielectric and an air gap in a mmWave band.

Another aspect of the present disclosure is to perform wireless communication with various peripheral electronic devices in several directions by arranging antenna modules in difference positions below an electronic device.

Solution to Problem

To achieve these and other advantages and in accordance with the purpose of the present disclosure, as embodied and broadly described herein, there is provided an electronic device having an antenna module. The electronic device includes: a main frame disposed along a peripheral region of a display and extending along a side region and a rear region of the electronic device; and an antenna module disposed in an inner space of the main frame and configured to radiate a radio signal in a forward direction or a downward direction of the electronic device through the main frame. The antenna module includes: a first dielectric layer disposed spaced apart from one side of the antenna substrate in a first direction in which antenna elements radiate signals; a second dielectric layer disposed spaced apart from the first dielectric layer in the first direction; and an air gap layer disposed between the first dielectric layer and the second dielectric layer.

According to embodiments, the first dielectric layer may be provided to have a first width W1 in the first direction, the second dielectric layer is provided to have a second width W2 in the first direction, and the air gap layer may be provided to have a particular gap G in the first direction.

According to embodiments, the first width W1 may be set to a value equal to or greater than a first threshold value of a wavelength corresponding to an operating frequency of the plurality of antenna elements, and the second width W2 may be set to a value equal to or less than a second threshold value of the wavelength.

According to embodiments, the particular gap G may be set to a value equal to or greater than a third threshold value of the wavelength.

According to embodiments, the first width W1 may be set to a value equal to or greater than a value of 0.14 times the wavelength, the second width W2 may be set to a value equal to or less than a value of 0.61 times the wavelength, and the particular gap G may be set to a value equal to or greater than a value of 0.29 times the wavelength.

According to embodiments, the first dielectric layer and the second dielectric layer may be connected to each other through first to fourth side surfaces constituting a side surface region of the antenna module to provide a hexahedron structure having an air gap layer implemented therein. The first dielectric layer may constitute a rear surface of the hexahedron structure, and the second dielectric layer may constitute a front surface of the hexahedron structure, and a radio signal radiated through the plurality of antenna elements may have directivity toward a front direction through a dielectric cavity corresponding to the hexahedron structure.

According to embodiments, a third dielectric layer arranged between the first dielectric layer and the second dielectric layer, and configured to be connected to first to fourth side surfaces of the hexahedron structure may be further included. A third permittivity of the third dielectric layer may be set to a value lower than a value of a first permittivity of the first dielectric layer and a second permittivity of the second dielectric layer.

According to embodiments, the first dielectric layer may constitute a first surface of the antenna module, and the second dielectric layer may be implemented as the main frame combined with a second surface of the antenna module. The air gap layer may be provided as a space from a front surface of the antenna module to the main frame.

According to embodiments, the first dielectric layer and the main frame may be connected to each other through first to fourth side surfaces constituting a side region surface of the antenna module to provide a hexahedron structure having an air gap layer implemented therein. The first dielectric layer may constitute a rear surface of the hexahedron structure, and the main frame constitutes a front surface of the hexahedron structure. A radio signal radiated through the plurality of antenna elements may have directivity toward a front direction through a dielectric cavity corresponding to the hexahedron structure including the main frame.

According to embodiments, the second dielectric layer of the antenna module may be provided integrally with a front surface portion of the main frame. A beamforming signal radiated through the plurality of antenna elements may be radiated through the front surface portion of the main frame.

According to embodiments, the second dielectric layer of the antenna module may be provided integrally with a side surface portion of the main frame. The antenna module may be combined with an inner frame attached to a rear surface of the display and the side surface portion of the main frame. A beamforming signal radiated through the plurality of antenna elements may be radiated through the side surface portion of the main frame.

According to embodiments, the second dielectric layer of the antenna module may be provided integrally with a side surface portion of the main frame. The antenna module may be combined with a support frame attached to a rear surface portion of the main frame and the side surface portion of the main frame. A beamforming signal radiated through the plurality of antenna elements may be radiated through the side surface portion of the main frame.

According to embodiments, the antenna module may be coupled to a rear surface of the display through a joint portion. The antenna module may be coupled to an inner frame arranged on the rear surface of the display through the joint portion, at one point in one side surface region in which the first dielectric layer and the second dielectric layer of the antenna module are connected to each other.

According to embodiments, the antenna module includes: a first antenna module configured such that a second dielectric portion is provided integrally with a front surface portion of the main frame and a first beamforming signal provided through a first array antenna is radiated through the front surface portion of the main frame; and a second antenna module configured such that the second dielectric portion is provided integrally with a side surface portion of the main frame and a second beamforming signal provided through a second array antenna is radiated through the side surface portion of the main frame.

According to embodiments, the first dielectric layer may be provided as a first curved surface portion having a first curvature of a first shape or the second dielectric layer may be provided as a second curved surface portion having a second curvature of a second shape to improve directivity in a front direction of the antenna module.

According to embodiments, the first dielectric layer and the second dielectric layer may be configured to be connected to each other on a side surface. The second dielectric layer may be arranged to be inclined at a certain angle relative to the first dielectric layer to change a direction of a radio signal radiated through the second dielectric layer of the antenna module by a certain angle.

According to embodiments, the antenna module may further include a transceiver circuit arranged on a rear surface of a multi-layer substrate and configured to electrically connected to the plurality of antenna elements to apply a radio frequency (RF) signal. The transceiver circuit may control the plurality of antenna elements to radiate a beamforming radio signal through the antenna module, by applying signals having different phases to the plurality of antenna elements.

According to embodiments, the antenna substrate may be configured as a multi-layer substrate including a plurality of dielectric layers and a conductive layer. The plurality of antenna elements may be arranged on or inside the multi-layer substrate to radiate a beamforming signal through a side surface of the multi-layer substrate.

There is also provided an antenna module implemented as a multi-layer substrate. The antenna module may include: an antenna substrate on which a plurality of antenna elements are arranged; a first dielectric layer disposed spaced apart from one side surface of the antenna substrate in a first direction in which the plurality of antenna elements radiate signals; a second dielectric layer disposed spaced apart from the first dielectric layer in the first direction; and an air gap layer disposed between the first dielectric layer and the second dielectric layer. The first dielectric layer may be provided to have a first width W1 in the first direction, and the second dielectric layer may be provided to have a second width W2 in the first direction. The air gap layer may be provided to have a particular gap G in the first direction.

According to embodiments, the first dielectric layer and the second dielectric layer may be connected to each other through first to fourth side surfaces constituting a side surface region of the antenna module to provide a hexahedron structure having an air gap layer implemented therein. The first dielectric layer may constitute a rear surface of the hexahedron structure, and the second dielectric layer may constitute a front surface of the hexahedron structure. A radio signal radiated through the plurality of antenna elements may have directivity toward a front direction through a dielectric cavity corresponding to the hexahedron structure.

Advantageous Effects of Invention

Hereinafter, technical effects of an antenna module implemented as a multi-layer substrate disclosed herein, and an electronic device including the antenna module are to be described.

According to embodiments, a wideband antenna module adopting a dielectric module structure to which a multi-layer dielectric structure operating in a millimeter wave band is applied, and an electric device including the wideband antenna module may be provided.

According to embodiments, in designing a multi-layer antenna structure in a millimeter wave band, a dielectric module structure to which a multi-layer dielectric structure is applied is implemented to improve directivity of an antenna element to thereby improve an antenna gain.\

According to embodiments, in designing a multi-layer antenna structure in a millimeter wave band, an air gap is implemented to enhance efficiency of an antenna element to thereby improve an antenna gain.

According to embodiments, an antenna module to which a dielectric module structure is applied may be arranged in different positions below an electronic device to thereby perform wireless communication with various peripheral electronic devices in several directions.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

MODE FOR THE INVENTION

Figure 1:
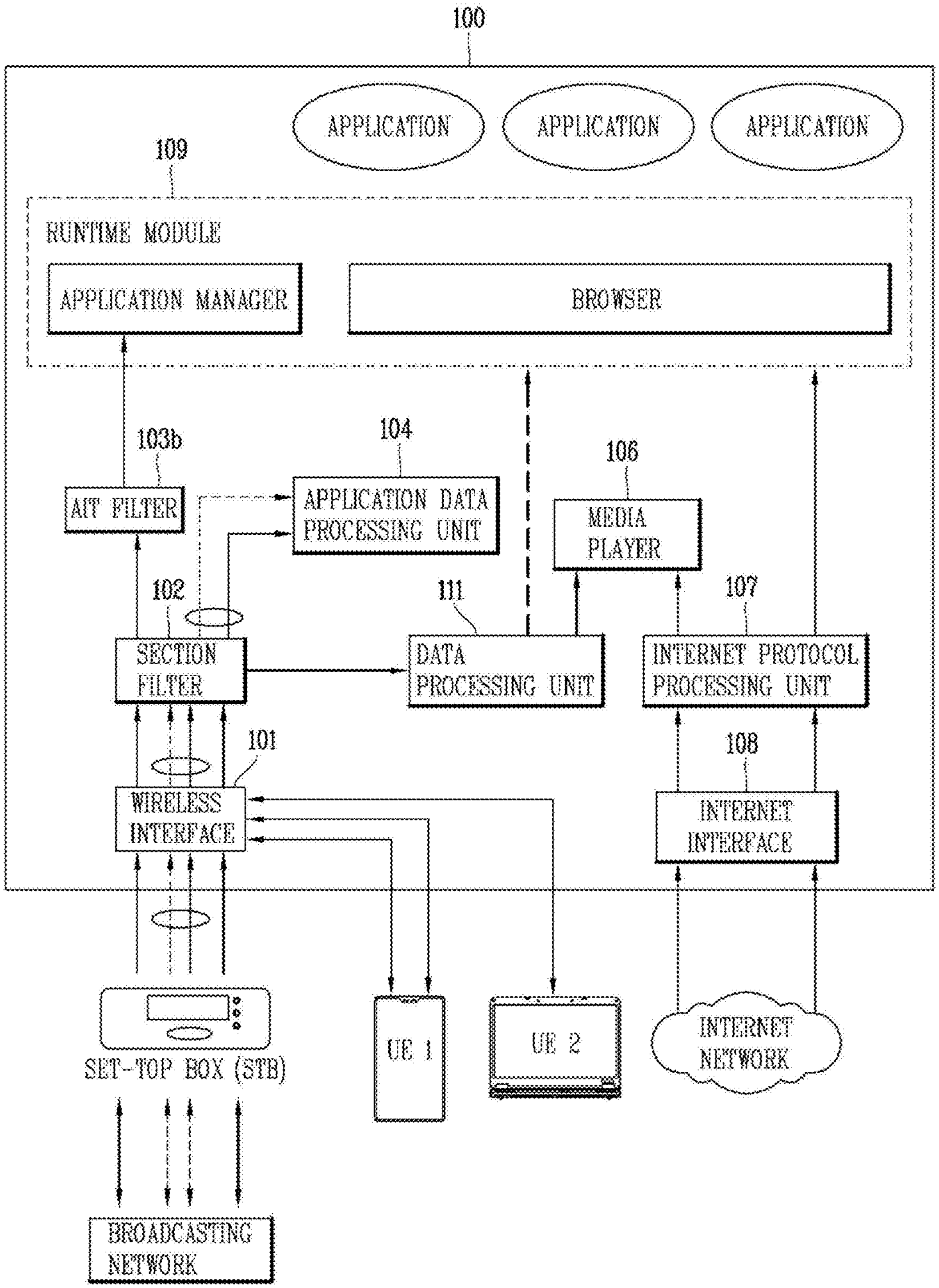
FIG. 1 is a diagram schematically illustrating an example of a whole of a wireless audiovisual (AV) system including an image display device according to an embodiment of the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known technology or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

An electronic device described herein may include a mobile phone, a smartphone, a laptop computer, a digital broadcasting terminal, a personal digital assistant (PDA), a portable multimedia player (PMP), a navigation system, a slate personal computer (PC), a tablet PC, an ultrabook, a wearable device, (e.g., a smartwatch, smart glasses, a head mounted display (HMD)), or the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

FIG. 1 is a diagram schematically illustrating an example of a whole of a wireless audiovisual (AV) system including an image display device according to an embodiment of the present disclosure.

As illustrated in FIG. 1, an image display device 100 according to another embodiment of the present disclosure is connected to the wireless AV system (or a broadcasting network) and an Internet network. The image display device 100 may be, for example, a network TV, a smart TV, a hybrid broadcast broadband TV (HBBTV), or the like.

The image display device 100 may be wirelessly connected to the wireless AV system (or the broadcasting network) via a wireless interface or wirelessly or wiredly connected to the Internet network via an Internet interface. In relation to this, the image display device 100 may be configured to be connected to a server or another electronic device via a wireless communication system. As an example, the image display device 100 needs to provide an 802.11ay communication service operating in a millimeter wave (mmWave) band to transmit or receive large-capacity data at a high speed.

The mmWave band may be any frequency band in a range of 10 GHz to 300 GHz. In this disclosure, the mm Wave band may include an 802.11ay band of a 60 GHz band. In addition, the mmWave band may include a 5G frequency band of a 28 GHz band or the 802.11ay band of the 60 GHz band. The 5G frequency band may be set to about 24 to 43 GHz band and the 802.11ay band may be set to 57 to 70 GHz or 57 to 63 GHz band, but are not limited thereto.

The image display device 100 may wirelessly transmit or receive data to/from an electronic device in a periphery of the image display device 100, e.g., a set-top box or another electronic device via the wireless interface. As an example, the image display device 100 may transmit or receive wireless AV data to/from a set-top box or another electronic device, e.g., a mobile terminal arranged in front of or below the image display device 100.

The image display device 100 includes, for example, a wireless interface **101*b*, a section filter 102*b*, an application information table (AIT) filter 103*b*, an application data processing unit 104*b*, a data processing unit 111*b*, a media player 106*b*, an Internet protocol processing unit 107*b*, an Internet interface 108*b*, and a runtime module 109*b***.

Through a broadcast interface that is the wireless interface **101*b***, AIT data, real-time broadcast content, application data, and a stream event are received. The real-time broadcast content may be referred to as linear audio/video (A/V) content.

The section filter **102*b* performs section filtering on four types of data received through the wireless interface 101*b* to transmit the AIT data to the AIT filter 103*b*, the linear A/V content to the data processing unit 111*b*, and the stream events and the application data to the application data processing unit 104*b***.

Non-linear A/V content and the application data are received through the Internet interface **108*b*. The non-linear A/V content may be, for example, a content on demand (COD) application. The non-linear A/V content is transmitted to the media player 106*b*, and the application data is transmitted to the runtime module 109*b***.

Further, the runtime module **109*b* includes, for example, an application manager and a browser as illustrated in FIG. 1**. The application manager controls a life cycle of an interactive application using, for example, the AIT data. In addition, the browser performs, for example, a function of displaying and processing the interactive application.

Hereinafter, a communication module having an antenna for providing a wireless interface in an electronic device such as the above-described image display device is described in detail. In relation to this, the wireless interface for communication between electronic devices may be a WiFi wireless interface, but is not limited thereto. As an example, a wireless interface supporting the 802.11ay standard may be provided for high-speed data transmission between electronic devices.

The 802.11ay standard is a successor standard for raising a throughput for the 802.11ad standard to 20 Gbps or greater. An electronic device supporting an 802.11ay wireless interface may be configured to use a frequency band of about 57 to 64 GHz. The 802.11ay wireless interface may be configured to provide backward compatibility for an 802.11ad wireless interface. The electronic device providing the 802.11ay wireless interface may be configured to provide coexistence with a legacy device using the same band.

In relation to a wireless environment for the 802.11ay standard, it may be configured to provide a coverage of 10 meters or longer in an indoor environment, and 100 meters or longer in an outdoor environment with a line of sight (LOS) channel condition.

The electronic device supporting the 802.11ay wireless interface may be configured to provide visual reality (VR) headset connectivity, support server backups, and support cloud applications that require low latency.

An ultra-short range (USR) communication scenario, i.e., a near field communication scenario which is a use case of the 802.11ay wireless interface, is a model for fast large-capacity data exchange between two terminals. The USR communication scenario may be configured to require low power consumption of less than 400 mW, while providing a fast link setup within 100 msec, transaction time within 1 second, and a 10 Gbps data rate at a very close distance of less than 10 cm.

As the use case of the 802.11ay wireless interface, the 8K UHD Wireless Transfer at Smart Home Usage Model may be taken into account. In the Smart Home Usage Model, a wireless interface between a source device and a sync device may be taken into consideration to stream 8K UHD content at home. In relation to this, the source device may be one of a set-top box, a Blue-ray player, a tablet PC, and a smart phone and the sink device may be one of a smart TV and a display device, but are not limited thereto. In relation to this, the wireless interface may be configured to transmit uncompressed 8K UHD streaming data (60 fps, 24 bits per pixel, at least 4:2:2) with a coverage of less than 5 m between the source device and the sink device. To do so, the wireless interface may be configured such that data is transmitted between electronic devices at a speed of at least 28 Gbps.

In order to provide such a wireless interface, embodiments related to an array antenna operating in a mmWave band and an electronic device including the array antenna is described with reference to the accompanying drawings. It will be apparent to those skilled in the art that the present disclosure may be embodied in other specific forms without departing from the spirit or essential characteristics thereof.

Figure 2:
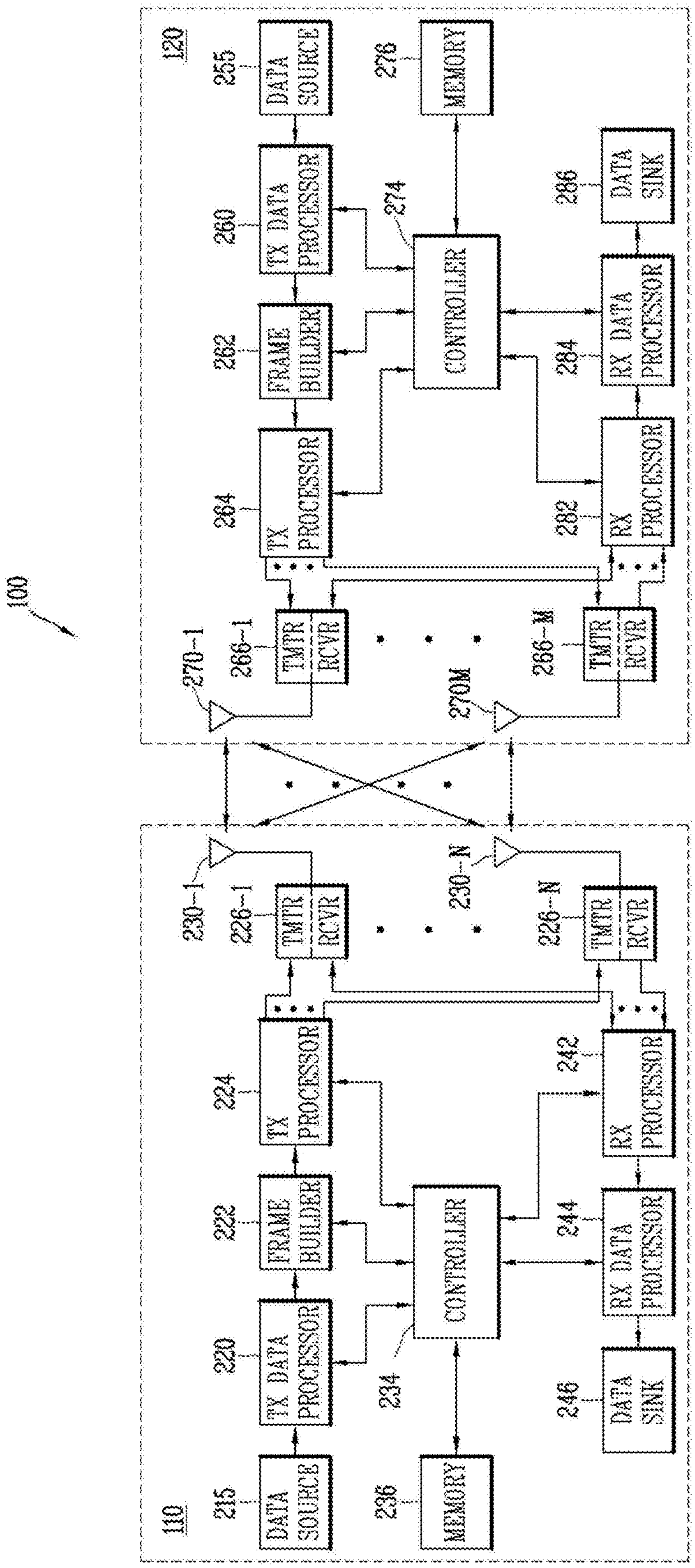
FIG. 2 illustrates a detailed configuration of electronic devices configured to support a wireless interface according to the present disclosure.

FIG. 2 illustrates a detailed configuration of electronic devices configured to support a wireless interface according to the present disclosure. FIG. 2 illustrates a block diagram of an access point 110 (generally, a first wireless node) and an access terminal 120 (generally, a second wireless node) in a wireless communication system. The access point 110 is a transmitting entity for downlink transmission and a receiving entity for uplink transmission. The access terminal 120 is a transmitting entity for uplink transmission and a receiving entity for downlink transmission. As used herein, the "transmitting entity" is an independently operating apparatus or device capable of transmitting data through a wireless channel, and the "receiving entity" is an independently operating apparatus or device capable of receiving data through a wireless channel.

Referring to FIGS. 1 and 2, the set-top box (STB) of FIG. 1 may be the access point 110, and an electronic device, that is, the image display device 100 of FIG. 1 may be the access terminal 120, but are not limited thereto. Accordingly, it should be understood that the access point 110 may alternatively be an access terminal, and the access terminal 120 may alternatively be an access point.

To transmit data, the access point 110 includes a transmission (TX) data processor 220, a frame builder 222, a TX processor 224, a plurality of transceivers 226-1 to 226-N, and a plurality of antennas 230-1 to 230-N. The access point 110 also includes a controller 234 configured to control operations of the access point 110.

To transmit data, the access point 110 includes a transmission (TX) data processor 220, a frame builder 222, a TX processor 224, a plurality of transceivers 226-1 to 226-N, and a plurality of antennas 230-1 to 230-N. The access point 110 also includes a controller 234 configured to control operations of the access point 110.

During operation, the TX data processor 220 receives data (e.g., data bits) from a data source 215, and processes the data for transmission. For example, the TX data processor 220 may encode data (e.g., data bits) into encoded data, and modulate the encoded data into data symbols. The TX data processor 220 may support different modulation and coding schemes (MCSs). For example, the TX data processor 220 may encode data at any one of a plurality of different coding rates (e.g., using low-density parity check (LDPC) encoding). In addition, the TX data processor 220 may modulate the encoded data using any one of a plurality of different modulation schemes including, but not limited to, BPSK, QPSK, 16QAM, 64QAM, 64APSK, 128APSK, 256QAM, and 256APSK.

The controller 234 may transmit, to the TX data processor 220, a command for specifying an MCS to be used (e.g., based on channel conditions for downlink transmission). The TX data processor 220 may encode and modulate the data received from the data source 215 according to the specified MCS. It needs to be recognized that the TX data processor 220 may perform additional processing on the data, such as data scrambling and/or other processing. The TX data processor 220 outputs the data symbols to the frame builder 222.

The frame builder 222 constructs a frame (also referred to as a packet) and inserts the data symbols into a data payload of the frame. The frame may include a preamble, a header, and a data payload The preamble may include a short training field (STF) sequence and a channel estimation (CE) sequence to assist the access terminal 120 in receiving the frame. The header may include information regarding data in a payload, such as a length of the data and an MCS used to encode and modulate the data. Based on this information, the access terminal 120 may demodulate and decode the data. The data in the payload may be partitioned among a plurality of blocks, and each block may contain a part of the data and a guard interval (GI) to assist the receiver in phase tracking. The frame builder 222 outputs the frame to the TX processor 224.

The TX processor 224 processes the frame for transmission on downlink. For example, the TX processor 224 may support different transmission modes, e.g., an orthogonal frequency-division multiplexing (OFDM) transmission mode and a single-carrier (SC) transmission mode. In this example, the controller 234 may transmit, to the TX processor 224, a command for specifying a transmission mode to be used, and the TX processor 224 may process the frame for transmission according to the specified transmission mode. The TX processor 224 may apply a spectrum mask to the frame so that a frequency configuration of a downlink signal complies with particular spectrum requirements.

The TX processor 224 may support multiple-input-multiple-output (MIMO) transmission. In these aspects, the access point 110 may include a plurality of antennas 230-1 to 230-N and a plurality of transceivers 226-1 to 226-N (e.g., one for each antenna). The TX processor 224 may perform spatial processing on incoming frames and provide a plurality of transmission frame streams to a plurality of antennas. The transceivers 226-1 to 226-N receive and process (e.g., convert to analog, amplify, filter, and frequency up-convert) each of the transmission frame streams to generate transmission signals for transmission through the antennas 230-1 to 230-N.

To transmit data, the access terminal 120 includes a TX data processor 260, a frame builder 262, a TX processor 264, a plurality of transceivers 266-1 to 266-M, and a plurality of antennas 270-1 to 270-M (e.g., one antenna per transceiver). The access terminal 120 may transmit data to the access point 110 on uplink and/or transmit the data to another access terminal (e.g., for peer-to-peer communication). The access terminal 120 also includes a controller 274 configured to control operations of the access terminal 120.

The transceivers 266-1 to 266-M receive and process (e.g., convert to analog, amplify, filter, and frequency up-convert) an output from the TX processor 264 for transmission via one or more of the antennas 270-1 to 270-M. For example, the transceiver 266-1 may up-convert the output from the TX processor 264 into a transmission signal having a frequency in a 60 GHz band. Accordingly, the antenna module described herein may be configured to perform a beamforming operation in the 60 GHz band, for example, in a band of about 57 to 63 GHz. In addition, the antenna module may be configured to support MIMO transmission while performing beamforming in the 60 GHz band.

In relation to this, the antennas 270-1 to 270-M and the transceivers 266-1 to 266-M may be implemented in an integrated form on a multi-layer circuit substrate. To do so, among the antennas 270-1 to 270-M, an antenna configured to operate with vertical polarization may be vertically arranged inside the multi-layer circuit substrate.

To receive data, the access point 110 includes a reception (RX) processor 242 and an RX data processor 244. During operation, the transceivers 226-1 to 226-N receive a signal (e.g., from the access terminal 120) and spatially process (e.g., frequency down-convert, amplify, filter, and digitally convert) the received signal.

The RX processor 242 receives outputs from the transceivers 226-1 through 226-N and processes the outputs to recover data symbols. For example, the access point 110 may receive data from a frame (e.g., from the access terminal 120). In this example, the RX processor 242 may detect a start of the frame using a short training field (STF) sequence in a preamble of the frame. The RX processor 242 may also use the STF for automatic gain control (AGC) adjustment. The RX processor 242 may also perform channel estimation (e.g., using a channel estimation (CE) sequence in the preamble of the frame), and perform channel equalization on the received signal based on the channel estimation.

The RX data processor 244 receives data symbols from the RX processor 242 and an indication of a corresponding MSC scheme from the controller 234. The RX data processor 244 demodulates and decodes the data symbols, recovers the data according to the indicated MSC scheme, and stores and/or outputs the recovered data (e.g., data bits) to a data sink 246 for additional processing.

The access terminal 120 may transmit the data using an orthogonal frequency-division multiplexing (OFDM) transmission mode or a single-carrier (SC) transmission mode. In this case, the RX processor 242 may process the received signal according to a selected transmission mode. In addition, as described above, the TX processor 264 may support MIMO transmission. In this case, the access point 110 includes the antennas 230-1 to 230-N and the transceivers 226-1 to 226-N (e.g., one for each antenna). Accordingly, the antenna module described herein may be configured to perform a beamforming operation in the 60 GHz band, for example, in a band of about 57 to 63 GHz. In addition, the antenna module may be configured to support MIMO transmission while performing beamforming in the 60 GHz band.

In relation to this, the antennas 230-1 to 230-M and the transceivers 226-1 to 226-M may be implemented in an integrated form on a multi-layer circuit board. To do so, among the antennas 230-1 to 230-M, an antenna configured to operate with vertical polarization may be vertically arranged inside the multi-layer circuit substrate.

Meanwhile, each transceiver receives and processes (e.g., frequency down-converts, amplifies, filters, and digitally converts) a signal from each antenna. The RX processor 242 may perform spatial processing on the outputs from the transceivers 226-1 to 226-N to recover the data symbols.

The access point 110 also includes a memory 236 coupled to the controller 234. The memory 236 may store commands that, when executed by the controller 234, cause the controller 234 to perform one or more of the operations described herein. Similarly, the access terminal 120 also includes a memory 276 coupled to the controller 274. The memory 276 may store commands that, when executed by the controller 274, cause the controller 274 to perform one or more of the operations described herein.

Figure 3A:
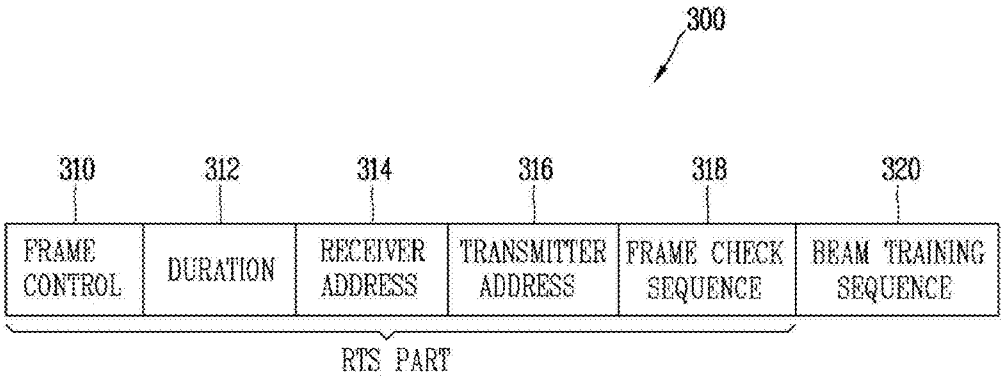
FIG. 3A illustrates a request-to-send frame (RTS) and a clear-to-send (CTS) frame according to the present disclosure.
Figure 3A:
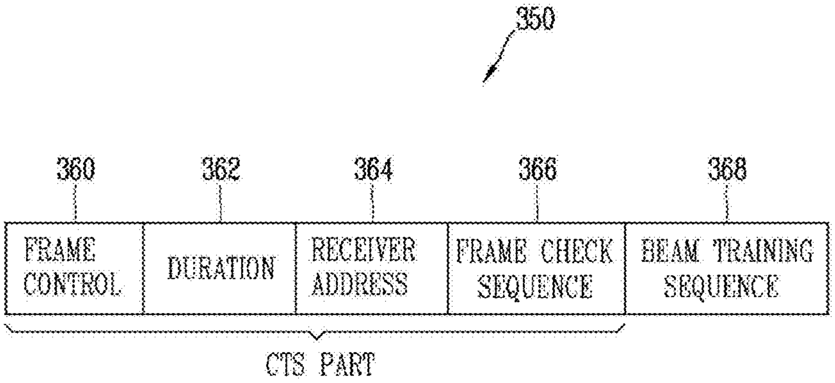

The electronic device supporting the 802.11ay wireless interface described herein determines whether a communication medium may be used to communicate with another electronic device. To do so, the electronic device transmits a request-to-send (RTS)-TRN frame including an RTS part and a first beam training sequence. In relation to this, FIG. 3A illustrates an RTS frame and a clear-to-send (CTS) frame according to the present disclosure. In relation to this, a transmission device may use the RTA frame to determine whether a communication medium may be used to transmit one or more data frames to a destination device. In a response to receiving the RTS frame, the destination device transmits the CTS frame back to the transmission device when the communication medium may be used. In a response to receiving the CTS frame, the transmission device transmits one or more data frames to the destination device. In a response to successfully receiving the one or more data frames, the destination device transmits one or more acknowledgment ("ACK") frames to the transmission device.

Referring to (a) of FIG. 3A, a frame 300 includes the RTS part including a frame control field 310, a duration field 312, a receiver address field 314, a transmitter address field 316, and a frame check sequence field 318. To improve communication and reduce interference, the frame 300 further includes a beam training sequence field 320 for configuring respective antennas of the destination device and one or more neighboring devices.

Referring to (b) of FIG. 3A, a CTS frame 350 includes an CTS part containing a frame control field 360, a duration field 362, a receiver address field 364, and a frame check sequence field 366. To improve communication and reduce interference, a frame, i.e., is the CTS frame 350 further includes a beam training sequence field 368 for configuring respective antennas of the destination device and one or more neighboring devices.

The beam training sequence fields 320 and 368 may conform to a training (TRN) sequence according to the IEEE 802.11ad or 802.11ay standard. The transmission device may use the beam training sequence field 368 to configure an antenna of the transmission device for directional transmission to the destination device. The transmission device may use the beam training sequence field to configure respective antennas of the transmission and destination devices to prevent transmission interference at the destination device. In this case, the beam training sequence field may be used to configure respective antennas of the transmission and destination devices to generate an antenna radiation pattern with nulls targeting the destination device.

Figure 3B:
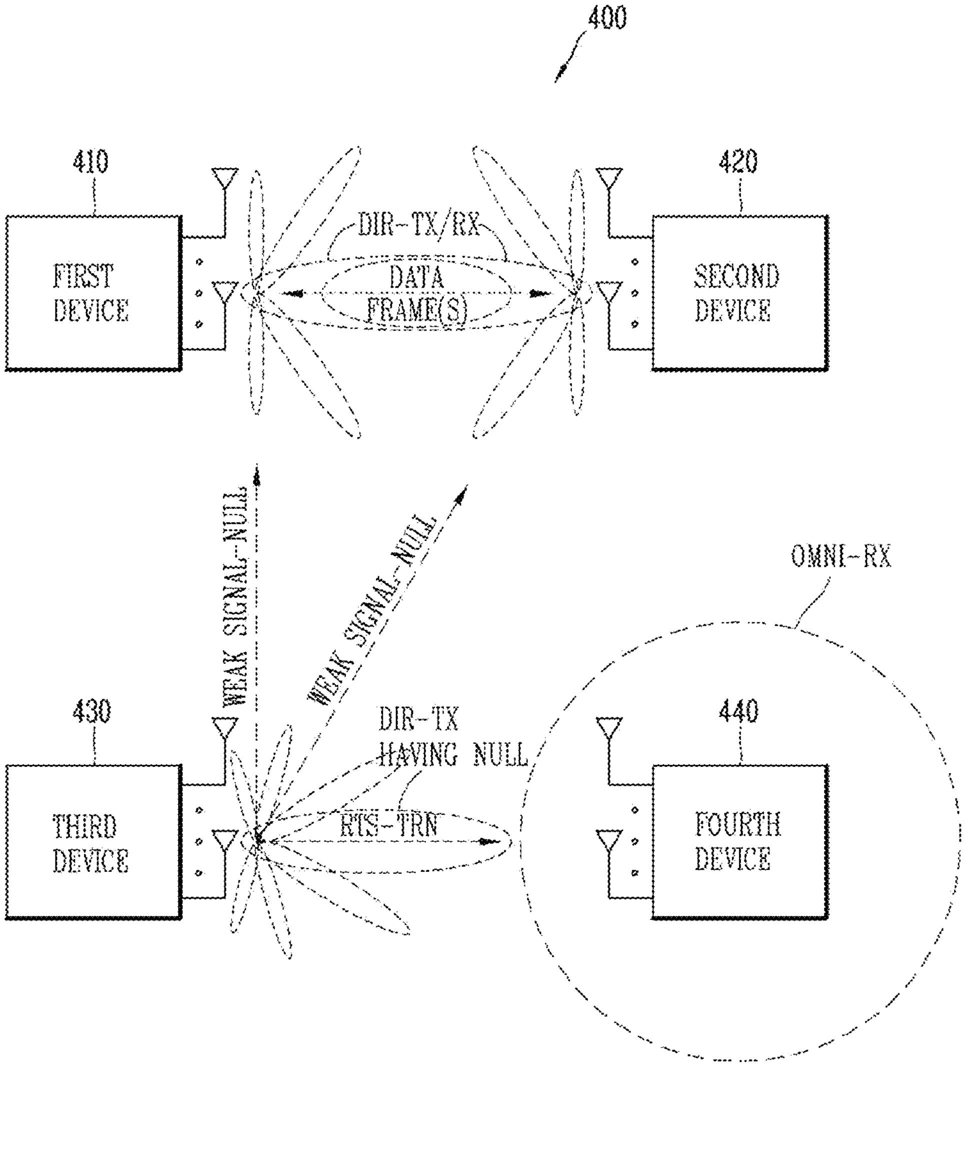
FIG. 3B illustrates a block diagram of a communication system 400 according to an example of the present disclosure.

Accordingly, electronic devices supporting the 802.11ay wireless interface may provide an initial beam to have a low interference level with each other, using a beamforming pattern determined according to a beam training sequence. In relation to this, FIG. 3B illustrates a block diagram of a communication system 400 according to an example of the present disclosure. As illustrated in FIG. 3B, the first and second devices 410 and 420 may improve communication performance by matching directions of main beams with each other. To reduce interference with a third device 430, the first and second devices 410 and 420 may provide a signal-null having a weak signal strength in a specific direction.

In relation to the provision of the main beams and the signal-null, a plurality of electronic devices described herein may be configured to perform beamforming through an array antenna. Referring to FIG. 3B, some of the electronic devices may be configured to communicate with an array antenna of another electronic device through a single antenna. In relation to this, when communicating through a single antenna, a beam pattern is provided as an omnidirectional pattern.

FIG. 3B illustrates that the first to third devices 410 to 430 perform beamforming and a fourth device 440 does not perform beamforming. However, performance of beamforming is not limited thereto Accordingly, three of the first to fourth devices 410 to 440 may be configured to perform beamforming, and the other may be configured not to perform beamforming.

As another example, only one of the first to fourth devices 410 to 440 may be configured to perform beamforming, and the other three devices may be configured not to perform beamforming. As another example, two of the first to fourth devices 410 to 440 may be configured to perform beamforming but the other two may be configured not to perform beamforming. As another example, all of the first to fourth devices 410 may be configured to perform beamforming.

Referring to FIGS. 3A and 3B, the first device 410 determines that the first device 410 is an intended receiving device for the CTS-TRN frame 350, i.e., the CTS frame, based on an address indicated in the receiver address field 364 of the CTS-TRN frame 350. In response to the determining as being the intended receiving device for the CTS-TRN frame 350, the first device 410 may selectively use a beam training sequence in the beam training sequence field 368 of the received CTS-TRN frame 350 to configure an antenna of the first device 410 for directional transmission substantially targeting the second device 420. That is, the antenna of the first device 410 is configured to generate an antenna radiation pattern having a primary lobe (e.g., a highest gain lobe) substantially targeting the second device 420 and non-primary lobes targeting other directions.

The second device 420 is already aware of a direction toward the first device 410 on a basis of the beam training sequence of the beam training sequence field 320 in the frame 300, i.e., an RTS-TRN frame previously received by the second device 420. Thus, the second device 420 may configure an antenna of the second device 420 for directional reception selectively targeting the first device 410 (e.g., a primary antenna radiation lobe). Therefore, while the antenna of the first device 410 is configured for the directional transmission to the second device 420 and the antenna of the second device 420 is configured for the directional reception from the first device 410, the first device 410 transmits one or more data frames to the second device 420. Accordingly, the first and second devices 410 and 420 perform directional transmission/reception DIR-TX/RX of one or more data frames through the primary lobe (the main beam).

The first and second devices 410 and 420 may partially modify a beam pattern of the third device 430 to reduce interference with the third device 430 due to the antenna radiation pattern having the non-primary lobes.

In relation to this, the third device 430 determines that the third device 430 is not the intended receiving device for the CTS-TRN frame 350 on a basis of an address indicated in the receiver address field 364 of the CTS-TRN frame 350. In a response to the determining that the third device 430 is not the intended receiving device for the CTS-TRN frame 350, the third device 430 uses the beam training sequence in the beam training sequence field 368 of the received CTS-TRN 350 and a sequence of the beam training sequence field 320 in the RTS-TRN frame 300 previously received, to configure the antenna of the third device 430 to generate antenna radiation patterns having nulls substantially targeting the second device 420 and the first device 410, respectively. The nulls may be based on an estimated angle of arrival of the RTS-TRN frame 300 previously received, and the CTS-TRN frame 350. In general, the third device 430 generates antenna radiation patterns having desired signal powers, rejections or gains targeting the first device 410 and the second device 420, respectively (for example, to achieve an estimated interference in the first and second devices 410 and 420 to be equal to or less than a defined threshold (e.g., to acquire desired BER, SNR, SINR and/or other one or more communication properties)).

The third device 430 may configure an antenna transmission radiation pattern of the third device 430 by estimating antenna gains in directions toward the first and second devices 410 and 420, estimating antenna reciprocity differences between the third device 430 and the first and second devices 410 and 420 (e.g., a transmission antenna gain minus a reception antenna gain), and respectively calculating the antenna gains and the antenna reciprocity differences throughout one or more sectors to determine estimated interferences corresponding to the first and second devices 410 and 420.

The third device 430 transmits the RTS-TRN frame 300 intended for the fourth device 440 and to be received by the fourth device 440. As long as the first and second devices 410 and 420 perform communication on a basis of durations indicated in the duration fields 312 and 362 of the RTS-TRN frame 300 and the CTS-TRN frame 350, respectively, the third device 430 maintains an antenna configuration having nulls targeting the first and second devices 410 and 420. Since the antenna of the third device 430 is configured to generate nulls targeting the first device 410 and the second device 420, transmission of the RTS-TRN frame 300 by the third device 430 may generate reduced interference in the first device 410 and the second device 420, respectively.

Accordingly, the electronic devices supporting the 802.11ay wireless interface disclosed herein may provide a signal null direction in a specific direction to reduce interference while matching main beam directions with each other using an array antenna. To do so, a plurality of the electronic devices may provide an initial beam direction through a beam training sequence and change a beam direction through a periodically updated beam training sequence.

As described above, for high-speed data communication between the electronic devices, beam directions should be configured to match each other. In addition, a loss of a radio signal transmitted to an antenna element needs to be minimized for high-speed data communication. To do so, an array antenna needs to be arranged in a multi-layer substrate on which a radio frequency integrated chip (RFIC) is arranged. In addition, for radiation efficiency, the array antenna needs to be arranged adjacent to a side area in the multi-layer substrate.

In addition, in order to adapt to a change in a wireless environment, a beam training sequence update between the electronic devices is needed. To update the beam training sequence, the RFIC needs to periodically transceive signals with a processor such as a modem. Therefore, to minimize update delay time, transception of a control signal between the RFIC and the modem needs to be performed within short time. To do so, a physical length of a connection path between the RFIC and the modem needs to be reduced. To do so, the modem may be arranged on a multi-layer substrate on which the array antenna and the RFIC are arranged. Alternatively, a connection length between the RFIC and the modem may be configured to be minimized in a structure in which the array antenna and the RFIC are arranged on the multi-layer substrate and the modem is arranged on a main substrate. In relation to this, a detailed structure will be described with reference to FIG. 5C.

Figure 4:
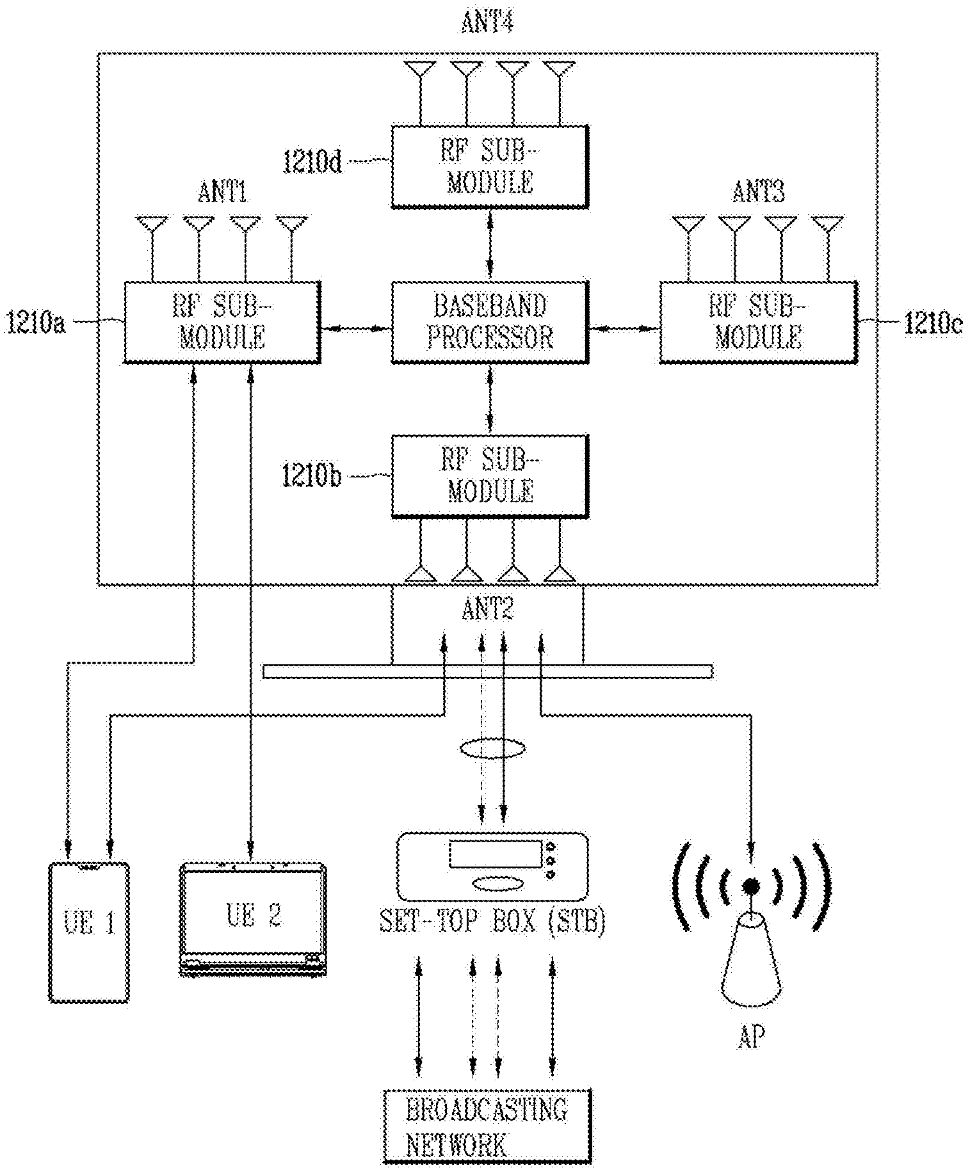
FIG. 4 illustrates an electronic device in which a plurality of antenna modules and a plurality of transceiver circuit modules are arranged, according to an embodiment.

Hereinafter, an electronic device having an antenna operable in a mmWave band will be described. In relation to this, FIG. 4 illustrates an electronic device in which a plurality of antenna modules and a plurality of transceiver circuit modules are arranged, according to an embodiment. Referring to FIG. 4, a home appliance in which the antenna modules and the transceiver circuit modules are arranged may be a television, but is not limited thereto. Accordingly, in the present disclosure, the home appliance in which the antenna modules and the transceiver circuit modules are arranged may include any home appliance or a display device each configured to support a communication service in a millimeter wave band.

Referring to FIG. 4, an electronic device 1000 includes a plurality of antenna modules ANT1 to ANT4 and a plurality of transceiver circuit modules 1210*a* to 1210*d*. In relation to this, the transceiver circuit modules 1210*a* to 1210*d* may correspond to a transceiver circuit 1250 described above. Alternatively, the transceiver circuit modules 1210*a* to 1210*d* may be a partial configuration of the transceiver circuit 1250 or a partial configuration of a front-end module arranged between the antenna modules ANT1 to ANT4 and the transceiver circuit 1250.

The antenna modules ANT 1 to ANT4 may be configured as an array antenna in which a plurality of antenna elements are arranged. A number of elements of the antenna modules ANT 1 to ANT4 is not limited to two, three, four, or the like as illustrated in the drawing. For example, the number of the elements of the antenna modules ANT 1 to ANT4 may extend to 2, 4, 8, 16, or the like. In addition, the elements of the antenna modules ANT 1 to ANT4 may be selected in a same number or in different numbers. The plurality of antenna modules ANT 1 to ANT4 may be arranged in different areas in a display, or in a lower portion or on a side surface of the electronic device. The plurality of antenna modules ANT 1 to ANT4 may be arranged in an upper portion, a left portion, a lower portion, or a right portion of the display. However, an arrangement structure thereof is not limited thereto. As another example, the antenna modules ANT 1 to ANT4 may be arranged in an upper left portion, an upper right portion, a lower left portion, or a lower right portion of the display.

The antenna modules ANT 1 to ANT4 may be configured to transmit or receive a signal in a specific direction in any frequency band. For example, the antenna modules ANT 1 to ANT4 may operate in any one of a 28 GHz band, a 39 GHz band, and a 64 GHz band.

The electronic device may maintain a connection state with different entities through two or more of the antenna modules ANT 1 to ANT4, or perform a data transmitting or receiving operation to maintain the connections state described above. In relation to this, the electronic device corresponding to a display device may transmit or receive data with a first entity through a first antenna module, i.e., the antenna module ANT1. Also, the electronic device may transmit or receive data with a second entity through a second antenna module, i.e., the antenna module ANT2. As an example, the electronic device may transmit or receive data with a mobile terminal UE through the first antenna module ANT1. The electronic device may transmit or receive data with a control device such as a set-top box or an access point (AP) through the second antenna module ANT2.

Data may be transmitted or received with another entity through other antenna modules, e.g., the antenna modules ANT3 and ANT4, i.e., third and fourth antenna modules. As another example, dual connection or MIMO may be performed through at least one of the first and second entities both previously connected via the third antenna module ANT3 and the fourth antenna module ANT4.

Mobile terminals UE1 and UE2 may be arranged on a front surface area of the electronic device, and configured to communicate with the first antenna module ANT1. The set-top box (STB) or the access point AP may be arranged in a lower portion of the electronic device, and configured to communicate with the second antenna module ANT2, but is not limited thereto. As another example, the second antenna module ANT2 may include both a first antenna radiating toward a lower region and a second antenna radiating toward a front area. Accordingly, the second antenna module ANT2 may communicate with the set-top box (STB) or the access point AP through the first antenna, and with one of the mobile terminals UE1 and UE2 through the second antenna.

One of the mobile terminals UE1 and UE2 may be configured to perform MIMO with the electronic device. As an example, the mobile terminal UE1 may be configured to perform MIMO while performing beamforming with the electronic device. As described above, the electronic device corresponding to the image display device may perform high-speed communication with another electronic device or the set-top box STB through a WiFi wireless interface. As an example, the electronic device may perform high-speed communication in a 60 GHz band with another electronic device or the set-top box STB through the 802.11ay wireless interface.

The transceiver circuit modules 1210*a* to 1210*d* may operate to process a transmission signal and a reception signal in an RF frequency band. Here, the RF frequency band may be any frequency band of a millimeter band, such as a 28 GHz band, a 39 GHz band, and a 64 GHz band, as described above. The transceiver circuit modules 1210*a* to 1210*d* may be referred to as RF sub-modules 1210*a* to

1210*d*. In this case, a number of the RF sub-modules 1210*a* to 1210*d* is not limited to four, and may be changed to an arbitrary number of two or more according to applications.

In addition, the RF sub-modules 1210*a* to 1210*d* may include an up-conversion module and a down-conversion module both configured to convert a signal in the RF frequency band into a signal in an IF (intermediate frequency) band or convert a signal in the IF frequency band into a signal in the RF frequency band. To this end, the up-conversion module and the down-conversion module may include a local oscillator (LO) capable of performing up-frequency conversion and down-frequency conversion. Local Oscillator).

One of the plurality of RF sub-modules 1210*a* to 1210*d*, i.e., the transceiver circuit modules may transmit a signal may be transmitted to another transceiver circuit module adjacent thereto. Accordingly, a configuration may be such that the signal is transmitted to all of the transceiver circuit modules 1210*a* to 1210*d* at least once.

To do so, a data transfer path having a loop structure may be added. In relation to this, the RF sub-modules 1210*b* and 1210*c* adjacent to each other may bidirectionally transmit a signal through a transmission path P2 having the loop structure.

Alternatively, a data transfer path having a feedback structure may be added. In relation to this, at least one sub-module 1210*c* may transmit a signal to the remaining sub-modules 1210*a*, 1210*b*, and 1210*d* unidirectionally through the data transfer path having the feedback structure.

The plurality of RF sub-modules may include first to fourth RF sub-modules 1210*a* to 1210*d*. In relation to this, a signal from the first RF sub-module 1210*a* may be transmitted to the RF sub-module 1210*b* and the fourth RF sub-module 1210*d* both adjacent thereto. In addition, the second RF sub-module 1210*b* and the fourth RF sub-module 1210*d* may transmit the signal to the third RF sub-module 1210*c* adjacent thereto. In this case, when bidirectional transmission between the second RF sub-module 1210*b* and the third RF sub-module 1210*c* may be performed as shown in FIG. 4, this may be referred to as a loop structure. On the other hand, when only omnidirectional transmission may be performed between the second RF sub-module 1210*b* and the third RF sub-module 1210*c*, this may be referred to as a feedback structure. In the feedback structure, at least two signals may be transmitted to the third RF sub-module 1210*c*.

However, a structure is not limited thereto, and a baseband module may be included only in a specific module among the first to fourth RF sub-modules 1210*a* to 1210*d* depending on applications. Alternatively, depending on applications, the baseband module may not be included in the first to fourth RF sub-modules 1210*a* to 1210*d*, but may be configured as a separate control unit, that is, a baseband processor 1400. For example, a control signal may be transmitted only by a separate control unit, that is, the baseband processor 1400.

Hereinafter, a specific configuration and function of the electronic device illustrated in FIG. 1 and including the wireless interface of FIG. 2 are to be described. Transmission or reception of data between electronic devices needs to be performed using a communication service in a mmWave band therebetween. In relation to this, a wireless audio-video (AV) service and/or high-speed data transmission may be provided using the 802.11ay wireless interface as a mmWave wireless interface. This is not limited to the 802.11ay wireless interface, and any wireless interface of a 60 GHz band may be adopted. In relation to this, a 5G or 6G wireless interface using a 28 GHz band or a 60 GHz band may be used for high-speed data transmission between electronic devices.

There is such a problem that a specific solution for transmitting an image with a resolution of 4K or higher is not presented, with respect to an antenna and an RFIC configured to provide a wireless interface in an electronic device such as an image display device. In particular, transmitting or receiving wireless AV data with another electronic device needs to be performed by taking into account a situation in which an electronic device such as an image display device is arranged on a wall of a building or on a table. To do so, it is needed to present a specific configuration for arrangement regions of the antenna and the RFIC in the image display device, and a structure of the antenna.

Figure 5A:
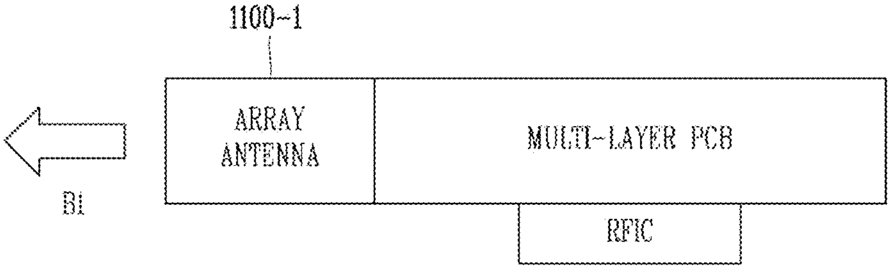
FIG. 5A illustrates a configuration in which a multi-layer circuit substrate in which an array antenna module is arranged is connected to a radio frequency integrated chip (RFIC), in relation to the present disclosure.
Figure 5A:
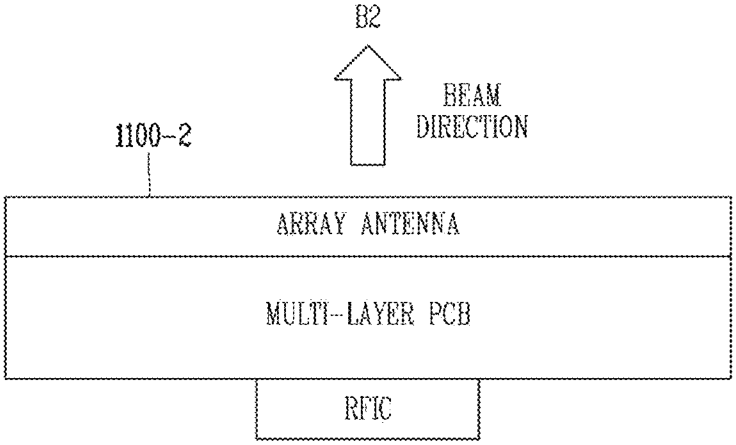

In this regard, FIG. 5A illustrates a configuration in which a multi-layer circuit substrate in which an array antenna module is arranged is connected to an RFIC, according to the present disclosure. Specifically, in relation to the present disclosure, a structure of an AIP (antenna in package) module and an antenna module structure implemented on a flexible substrate are illustrated.

Referring to (a) of FIG. 5A, the AIP module is configured as an RFIC-PCB-antenna integrated type for mmWave band communication. In relation to this, an array antenna module 1100-1 may be configured integrally with a multi-layer PCB, that is, a multi-layer substrate as illustrated in (a) of FIG. 5A. Accordingly, the array antenna module 1100-1 configured integrally with the multi-layer substrate may be referred to as an AIP module. Specifically, the array antenna module 1100-1 may be arranged in one side area of the multi-layer substrate. In relation to this, a first beam B1 may be provided on a side area of the multi-layer substrate using the array antenna module 1100-1 arranged on one side area of the multi-layer substrate.

On the other hand, referring to (b) of FIG. 5A, an array antenna module 1100-2 may be arranged on the multi-layer substrate. The arrangement of the array antenna module 1100-2 is not limited to the structure of (b) of FIG. 5A, but may be arranged on any layer in the multi-layer substrate. In relation to this, a second beam B2 may be provided on a front surface region of the multi-layer substrate using the array antenna module 1100-2 arranged on any layer of the multi-layer substrate. In relation to this, in a case of the AIP module, i.e., an array antenna module provided integrally with the multi-layer substrate, an array antenna may be arranged on a same printed circuit board (PCB) to minimize a distance between the RFIC and an antenna.

The antenna of the AIP module may be implemented using a multi-layer PCB manufacturing process, and radiate a signal in a vertical/side direction of the PCB. In relation to this, double polarization may be implemented using a patch antenna or a dipole/monopole antenna. Accordingly, the first array antenna 1100-1 shown in (a) of FIG. 5A may be arranged on the side area of the multi-layer substrate, and the second array antenna 1100-2 shown in (b) of FIG. 5A may be arranged on the side area of the multi-layer substrate. Therefore, the first beam B1 may be generated through the first array antenna 1100-1, and the second beam B2 may be generated through the second array antenna 1100-2.

The first array antenna 1100-1 and the second array antenna 1100-2 may be configured to have same polarization. Alternatively, the first array antenna 1100-1 and the second array antenna 1100-2 may be configured to have orthogonal polarization. In relation to this, the first array antenna 1100-1 may operate as a vertical polarization antenna and also operate as a horizontally polarized antenna. For example, the first array antenna 1100-1 may be a monopole antenna having vertical polarization, and the second array antenna may be a patch antenna having horizontal polarization.

Figure 5B:
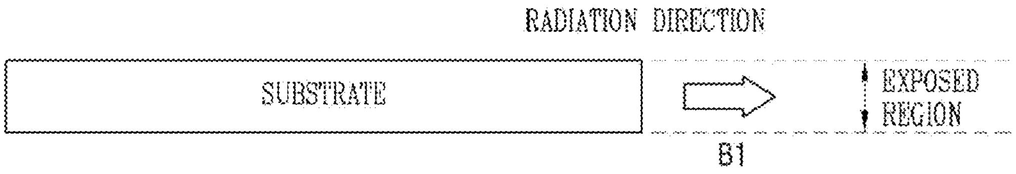
FIG. 5B is a conceptual diagram illustrating antenna structures having different radiation directions.
Figure 5B:
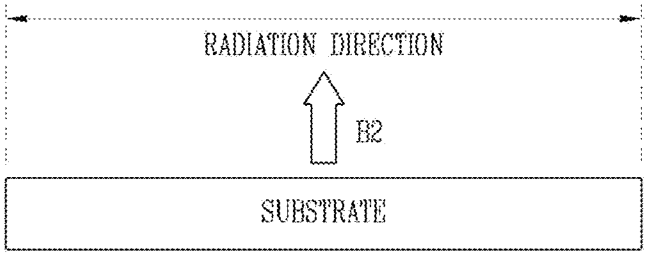

FIG. 5B is a conceptual diagram illustrating antenna structures having different radiation directions.

Referring to (a) of FIG. 5A and (a) of FIG. 5B, a radiation direction of the antenna module arranged in the side area of the multi-layer substrate corresponds to a side direction. In relation to this, the antenna implemented on the flexible substrate may be configured as a radiating element such as a dipole/monopole antenna. That is, antennas implemented on the flexible substrate may be end-fire antenna elements.

In relation to this. end-fire radiation may be implemented by an antenna radiating in a horizontal direction with the substrate. Such an end-fire antenna may be implemented as a dipole/monopole antenna, a Yagi-dipole antenna, a Vivaldi antenna, a substrate integrated waveguide (SIW) horn antenna, or the like. In relation to this, the Yagi-dipole antenna and the Vivaldi antenna have horizontal polarization characteristics. One of the antenna modules arranged in the image display device described herein needs a vertical polarization antenna. Accordingly, there is a need to present an antenna structure capable of minimizing an antenna exposure area while operating as a vertical polarization antenna.

Referring to (b) of FIG. 5A and (a) of FIG. 5B, a radiation direction of the antenna module arranged in the front area of the multi-layer substrate corresponds to a front direction. In relation to this, an antenna arranged in the AIP module may be configured as a radiating element such as a patch antenna. That is, the antenna arranged in the AIP module may be a broadside antenna element radiating in the broadside direction.

Figure 5C:
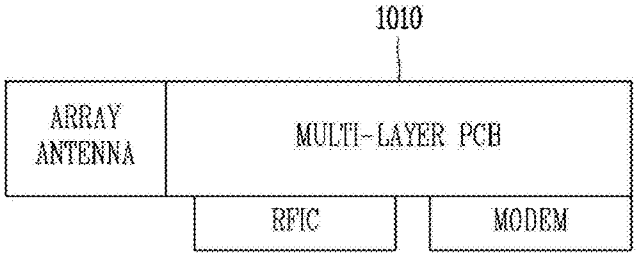
FIG. 5C illustrates a combination structure between a multi-layer substrate and a main substrate according to embodiments.
Figure 5C:
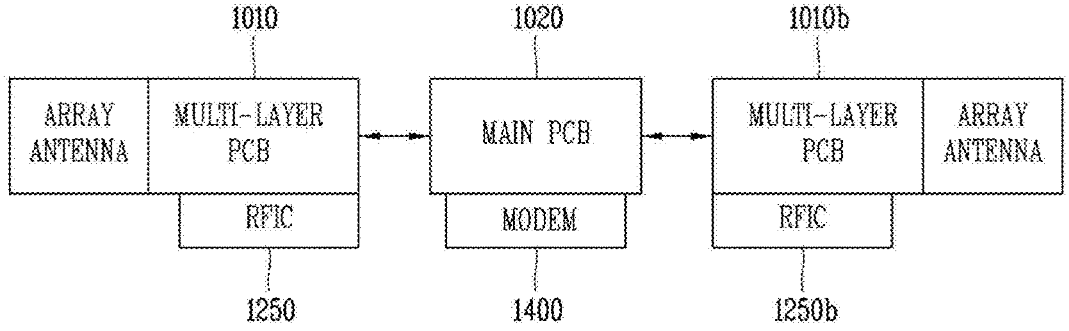

The multi-layer substrate having the array antenna arranged therein may be provided integrally with the main substrate or may be configured to be combined with the main substrate as a modular type by a connector. In relation to this, FIG. 5C illustrates a combination structure between a multi-layer substrate and a main substrate. Referring to (a) of FIG. 5C, a structure in which an RFIC 1250 and a modem 1400 are integrally provided on a multi-layer substrate 1010 is shown. The modem 1400 may be referred to as the baseband processor 1400. Accordingly, the multi-layer substrate 1010 is integrally provided integrally with the main substrate. The integrated structure may be applied to a structure in which only one array antenna module is arranged in the electronic device.

On the other hand, the multi-layer substrate 1010 and the main substrate 1020 may be configured to be combined with each other as a modular type by a connector. Referring to (b) of FIG. 5C, in relation to this, the multi-layer substrate 1010 may be configured to interface with the main substrate 1020 through a connector. In this case, the RFIC 1250 may be arranged on the multi-layer substrate 1010, and the modem 1400 may be arranged on the main substrate 1020. Accordingly, the multi-layer substrate 1010 may be provided as a substrate separate from the main substrate 1020 and configured to be combined with the main substrate 1020 through a connector.

Such a modular structure may be applied to a structure in which a plurality of array antenna modules are arranged in the electronic device. Referring to (b) of FIG. 5C, the multi-layer substrate 1010 and a second multi-layer substrate 1010*b* may be configured to interface with the main substrate 1020 through connector connection. The modem 1400 arranged on the main substrate 1020 is configured to be electrically coupled to RFICs 1250 and 1250*b* arranged on the multi-layer substrate 1010 and the second multi-layer substrate 1020, respectively.

Figure 6:
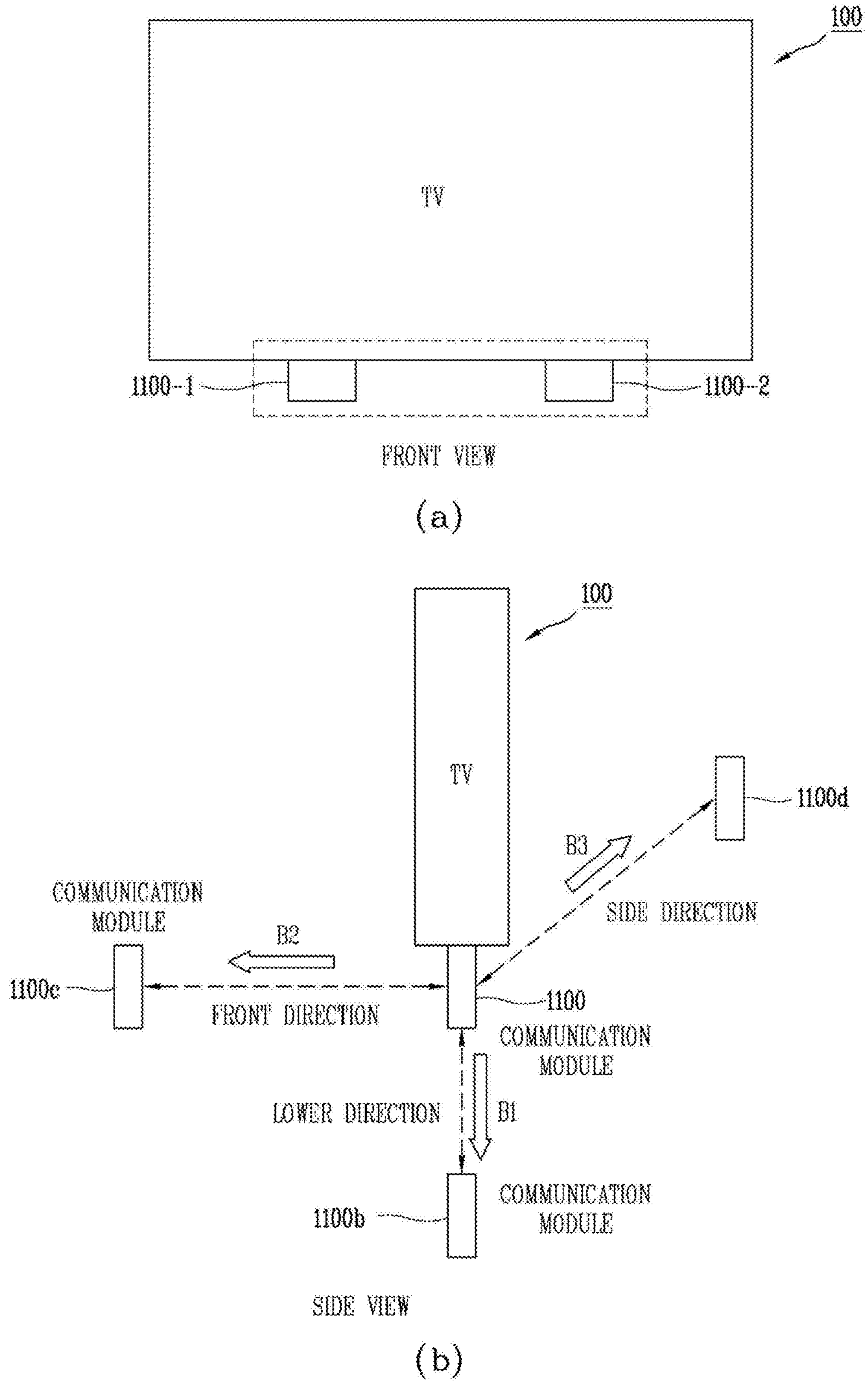
FIG. 6 is a conceptual diagram illustrating a plurality of communication modules arranged in a lower portion of the image display device, a configuration of the communication modules, and communication between the communication modules and other communication modules arranged in a front direction from the image display device.

When the AIP module is arranged in a lower portion of the electronic device such as the image display device, communication needs to be performed with other communication modules arranged in a lower direction and a front direction. In relation to this, FIG. 6 is a conceptual diagram illustrating a plurality of communication modules arranged in a lower portion of the image display device, a configuration of the communication modules, and communication between the communication modules and other communication modules arranged in a front direction from the image display device. Referring to (a) of FIG. 6, different communication modules 1100-1 and 1100-2 may be disposed in a lower portion of the image display device 100. Referring to (b) of FIG. 6, the image display device 100 may perform communication with a communication module 1100*b* arranged below the image display device 100 through the antenna module 1100. Communication may be performed with the second communication module 1100*c* arranged in front of the image display device 100 through the antenna module 1100 of the image display device 100. In addition, communication may be performed with the third communication module 1100*d* arranged by a side of the image display device 100 through the antenna module 1100 of the image display device 100.

In relation to this, the communication module 1100*b* may be a set-top box or an access point (AP) configured to transmit AV data to the image display apparatus 100 through the 802.11ay wireless interface at a high speed, but is limited thereto. The second communication module 1100*c* may be any electronic device configured to transceive data to/from the image display device 100 at a high speed through the 802.11ay wireless interface. To perform wireless communication with the communication modules 1100*b*, 1100*c*, and 1100*d* arranged in front of, below, and by a side of the image display device 100, respectively, the antenna module 1100 having a plurality of array antennas provide beams in different directions. Specifically, the antenna module 1100 may provide beams in a front direction B1, a lower direction B2, and a side direction B3 through different array antennas, respectively.

In the AIP module structure as illustrated in (a) of FIG. 5A, an antenna height may increase according to an RFIC driving circuit and a heat dissipation structure. Also, depending on a type of an antenna that is being used, an antenna height may increase in the AIP module structure as shown in (a) of FIG. 5A. On the other hand, in the antenna module structure implemented in a side area of the multi-layer substrate as illustrated in (b) of FIG. 5A, an antenna may be implemented in a low-profile shape.

Hereinafter, a detailed configuration of an antenna module of FIGS. 5A to 5C which may be arranged inside or on a side surface of the electronic device of FIGS. 4 and 6, in the electronic device of FIGS. 1 to 2 and in a configuration of FIGS. 3A and 3B, is described.

A communication module including an antenna may be provided so that the electronic device such as the image display device may perform communication with a neighboring electronic device. Recently, as a display area of the image display device is enlarged, an arrangement space of the communication module including the antenna is reduced. Accordingly, there is an increasing need for arranging an antenna in a multi-layer circuit board on which the communication module is implemented.

A WiFi wireless interface may be taken into account, as an interface for a communication service between electronic devices. When using such a WiFi wireless interface, a mmWave band may be used for high-speed data transmission between electronic devices. In particular, high-speed data transmission between electronic devices may be performed using a wireless interface such as the 802.11ay wireless interface.

In relation to this, an array antenna capable of operating in a mmWave band may be mounted in the antenna module. However, electronic components such as an antenna and a transceiver circuit arranged in such an antenna module are configured to be electrically connected to each other. To do so, a transceiver circuit may be operably coupled to the antenna module, and the antenna module may be configured as a multi-layer substrate.

Antenna elements of the antenna module in a form of a multi-layer substrate may radiate a radio signal in one side direction of the antenna module. However, this side direction radiation structure has a problem such that a specific antenna structure capable of increasing a gain of the antenna element has not been provided.

The present disclosure is directed to solving the aforementioned problems and other drawbacks. Another aspect of the present disclosure is to provide a broadband antenna module operating in a mmWave band, and an electronic device including the broadband antenna module.

Another aspect of the present disclosure is to enhance an antenna gain by enhancing directivity of an antenna element operating in a mmWave band.

Another aspect of the present disclosure is to enhance an antenna gain by enhancing efficiency of an antenna element operating in a mmWave band.

Another aspect of the present disclosure is to enhance an antenna gain in a desired direction using a dielectric and an air gap in a mmWave band.

Another aspect of the present disclosure is to perform wireless communication with various peripheral electronic devices in several directions by arranging antenna modules in difference positions below an electronic device.

Figure 7A:
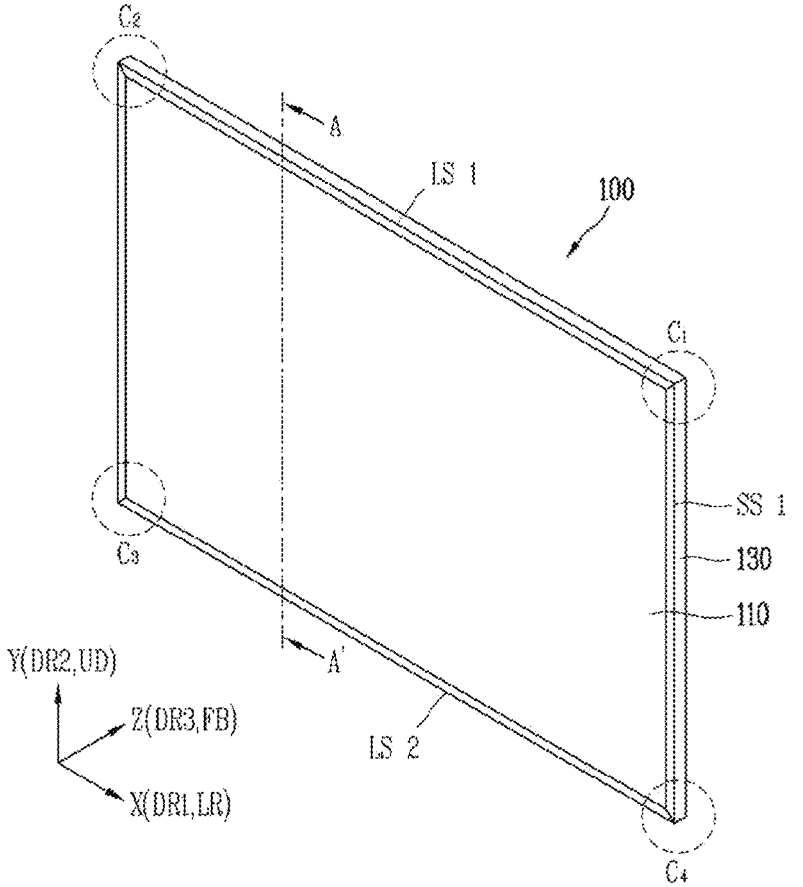
FIG. 7A illustrates an outer configuration of a display device having a display panel according to the present disclosure.
Figure 7B:
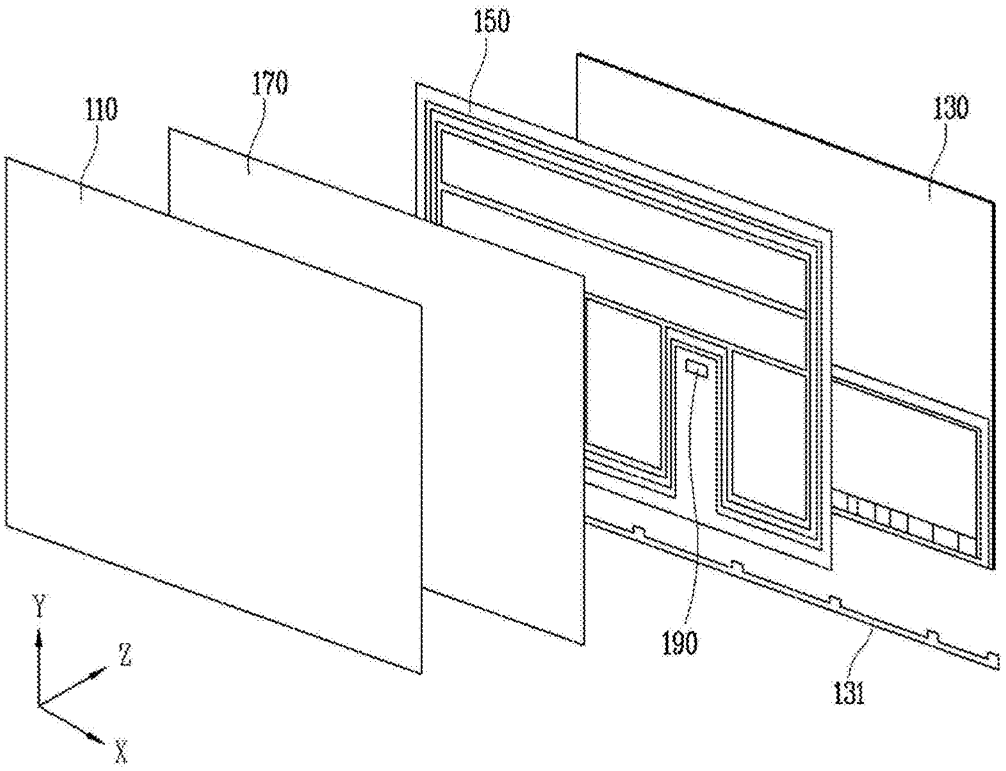
FIG. 7B is a perspective view of each configuration of the display device of FIG. 7A.

An antenna module operating in a millimeter wave band described herein, and an electronic device including the antenna module are to be described. To do so, a configuration and structure of an electronic device operating as an image display device (a display device) is to be described in detail. In relation to this, FIG. 7A illustrates an outer configuration of a display device having a display panel described herein. FIG. 7B is a perspective view of each configuration of the display device of FIG. 7A.

Hereinafter, an organic light-emitting diode (OLED) panel is described as an example of a display panel. However, the display panel that may be applied to the present disclosure is not limited to the OLED panel, but may be a plasma display panel (PDP), a field emission display (FED), or a liquid crystal display (LCD).

Referring to FIG. 7A, the display device 100 may include a first long side LS1, a second long side LS2 facing the first long side LS1, a first short side SS1 adjacent to the first long side LS1 and the second long side LS2, and a second short side SS2 facing the first short side SS1.

In the display device 100, an area of the first short side SS1 may be referred to as a first side area, and an area of the second short side SS2 may be referred to as a second side area facing the first side area. In the display device 100, an area of the first long side LS1 may be referred to as a third side area adjacent to the first and second side areas and located between the first and second side areas. An area of the second long side LS2 may be referred to as a fourth side area adjacent to the first and second side areas, located between the first and second side areas, and facing the third side area.

Hereinafter, a first direction DR1 may be a direction parallel with the first and second longs sides LS1 and LS2 of the display panel 110, and a second direction DR2 may be a direction parallel with the first and second short sides SS1 and SS2 of the display panel 110. The third direction DR3 may be a direction perpendicular to the first direction DR1 and/or the second direction DR2.

From another viewpoint, a portion on which the display device 100 displays an image may be referred to as a front side or a front surface. When the display device 100 displays an image, a portion from which an image cannot be viewed may be referred to as a rear side or a rear surface. When the display device 100 is viewed from the front side or the front surface, a portion of the first long side LS1 may be referred to as an upper side or an upper surface, and a portion of the second long side LS2 may be referred to as a lower side or a lower surface. When the display device 100 is viewed from the front side or the front surface, a portion of the first short side SS1 may be referred to as a right side or a right surface, and a portion of the second short side SS2 may be referred to as a left side or a left surface.

The first long side LS1, the second long side LS2, the first short side SS1, and the second short side SS2 may be referred to edges of the display device 100. In addition, points at which the first long side LS1, the second long side LS2, the first short side SS1, and the second short side SS2 converge may be referred to as corners. For example, a point at which the first long side LS1 and the first short side SS1 converge may be a first corner C1, a point at which the first long side LS1 and the second short side SS2 converge may be a second corner C2, a point at which the second short side SS2 and the second long side LS2 converge may be a third corner C3, and a point at which the second long side LS2 and the first short side SS1 converge may be a fourth corner C4.

A direction from the first short side SS1 to the second short side SS2 or a direction from the second short side SS2 to the first short side SS1 may be referred to as a left-right direction LR or a horizontal direction, i.e., the first direction DR1. A direction from the first long side LS1 to the second long side LS2 or a direction from the second long side LS2 to the first long side LS1 may be referred to as an upper-lower direction UD or a vertical direction, i.e., the second direction DR2. A direction from the front surface to the rear surface or a direction from the rear surface to the front surface may be referred to as a front-rear direction, i.e., the third direction DR3 or a thickness direction FB. The front-rear direction DR3 may be a direction vertical to a left-right direction DR1 and/or an upper-lower direction DR2.

Referring to FIG. 7B, the display panel 110 may be provided on the front surface of the display device 100 and display an image. The display panel 110 may display an image as a plurality of pixels output red, green and blue (RGB) colors in correspondence with a timing for each pixel. The display panel 110 may be divided into an active area in which an image is displayed, and a de-active area in which an image is not displayed.

The display panel 110 may be a flat panel having a small thickness. For example, the display panel 100 may be an organic light-emitting diode (OLED) panel. An active matrix type organic light-emitting display panel includes a self-emissive organic light-emitting diode (hereinafter referred to as OLED), and has an advantage such as a high response speed, high light-emitting efficiency, great brightness, and a large viewing angle.

The main frame 130 may be arranged in a rear of the display panel 110. The main frame 130 may be combined with the display panel 110. To combine the main frame 130 with the display panel 110, the main frame 130 and/or another structure adjacent to the main frame 130 may include a protruding portion, a sliding portion, a coupling portion, etc. The main frame 130 may include a bottom frame 131. The bottom frame 131 may be arranged in a lower portion of the main frame 130. The bottom frame 131 may be separate from or combined with the main frame 130. The main frame 130 and the bottom frame 131 may cover a part of a front surface and a side surface of the display panel 110.

An inner frame 150 may be arranged in a rear of the display panel 110. The inner frame 150 may be arranged between the display panel 110 and the main frame 130. A front surface of the main frame 150 may face the display panel 110. Another front surface of the main frame 150 may be coupled to the display panel 130. The inner plate 150 may face a support plate 170 mounted on a rear surface of the display panel 110. The inner plate 150 may be connected to or combined with the support plate 170 through a combining member 190. The combining member 190 may combine the inner plate 150 with the support plate 170. The combining member 190 may be provided on or fixed to a rear surface of the support plate 170 and a front surface of the inner plate 150.

Figure 8A:
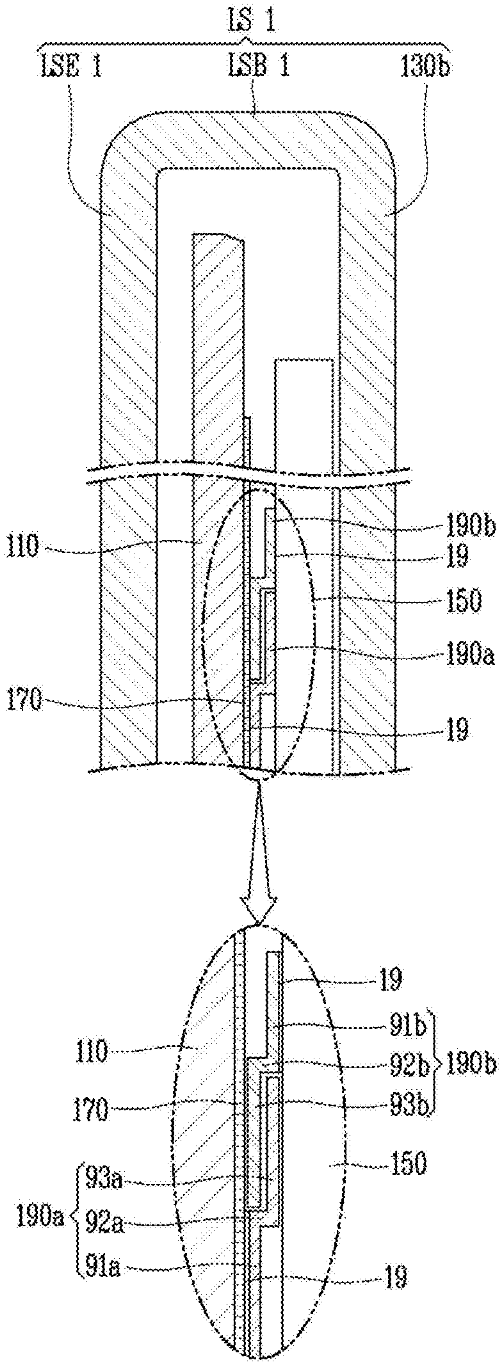
FIG. 8A is a side view illustrating a combination of an inner frame and a support frame both combined with a display panel and a main frame of an electronic device according to the present disclosure.
Figure 8B:
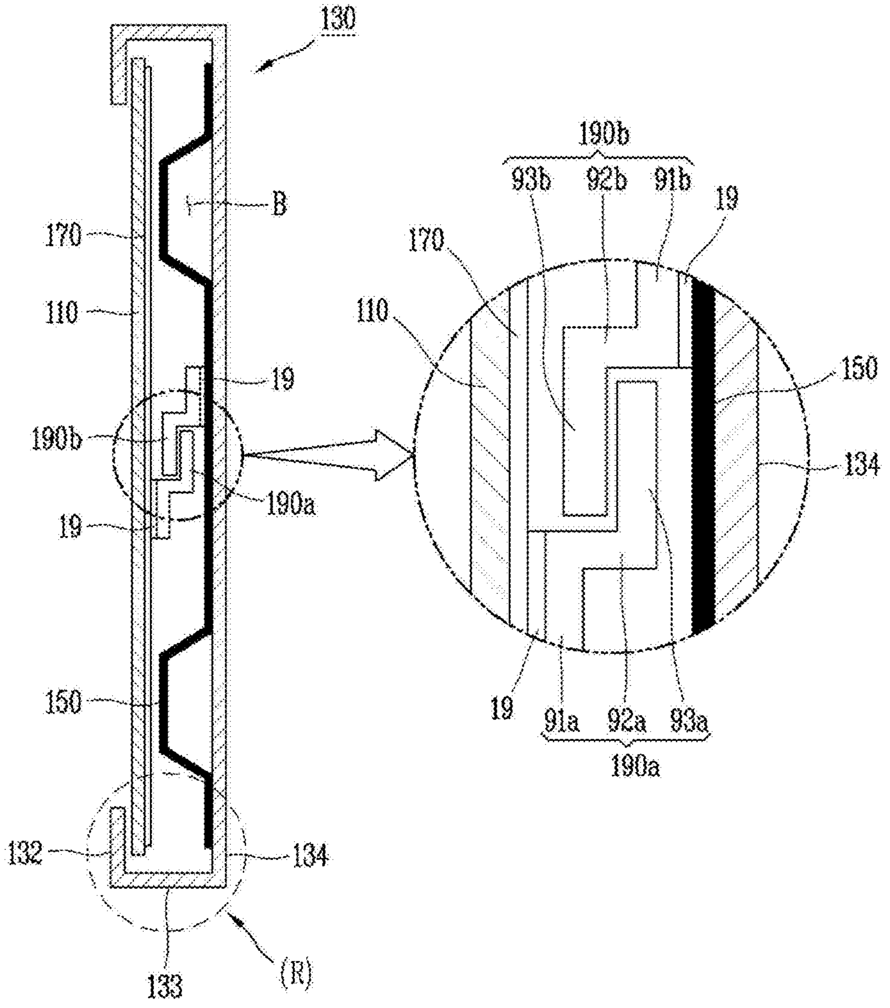
FIG. 8B is a side view illustrating a combination of a support frame and a combining member both combining an inner frame with a main frame of the electronic device according to the present disclosure.

A display device described herein may include a plurality of frames combined with a display panel. In relation to this, FIG. 8A is a side view illustrating a combination of an inner frame and a support frame both combined with a display panel and a main frame of an electronic device described herein. FIG. 8B is a side view illustrating a combination of a support frame and a combining member both combining an inner frame with a main frame of the electronic device described herein.

FIGS. 8A and 8B schematically illustrate a portion of the display device taken along line A-A' of FIG. 7A.

Edges LSB1 and LSE1 and a boundary provided on the first long side LS1 of the main frame 130 may be refracted at least once. For example, after the edges LSB1 and LSE1 of the main frame 130 may be bent toward a front side F of the main frame 130, and then, bent toward inside of the main frame 130 at an angle of 90° (degrees). An eleventh wall LSB1 of the first long side LS1 may be bent from a body 130*a* of the main frame 130 at 90 degrees. A twelfth wall LSE1 of the first long side LS1 may be bent from the eleventh wall LSB1 of the first long side LS1 toward inside of the main frame 130 at 90 degrees to face a body 130*b* of the main frame 130. A first combining member 190*a* may be combined with a second combining member 190*b*. The first combining member 190*a* may face or be in contact with the inner plate 150. The second combining member 190*b* may face or be in contact with the support plate 170.

When the display panel 110 is inserted into the main frame 130, an extension region 93*a* of the first combining member 190*a* may be arranged between an extension region 93*b* of the second combining member 190*b* and the inner plate 150.

One surface of the extension region 93*a* of the first combining member 190*a* may face or be in contact with the inner plate 150. Another surface of the extension region 93*a* of the first combining member 190*a* may be spaced apart from the inner plate 170. The another surface of the extension region 93*a* of the first combining member 190*a* may face or be in contact with another surface of the extension region 93*b* of the second combining member 190*b*. When the display panel 110 is inserted into the main frame 130, the extension region 93*b* of the second combining member 190*b* may be arranged between the extension region 93*a* of the first combining member 190*a* and the support plate 170.

One surface of the extension region 93*b* of the second member 190*b* may face or be in contact with the support plate 170. The another surface of the extension region 93*b* of the second combining member 190*b* may be spaced apart from the inner plate 150. The another surface of the extension region 93*b* of the second combining member 190*b* may face or be in contact with the another surface of the extension region 93*a* of the first combining member 190*a*. That is, the first combining member 190*a* may be combined with the second combining member 190*b* using a hook method. Thus, the display panel 110 may maintain a constant space with the main frame 130. A phenomenon in which a central portion of the display panel 110 is leaned toward a front surface may be prevented.

In addition, the inner plate 150 may include a plurality of bead shapes. The bead shapes may protrude toward the display panel 110. The inner plate 150 includes a plurality of bead shapes B to constantly maintain a space between the display panel 110 and the main frame 130 and ensure rigidity.

Figure 9A:
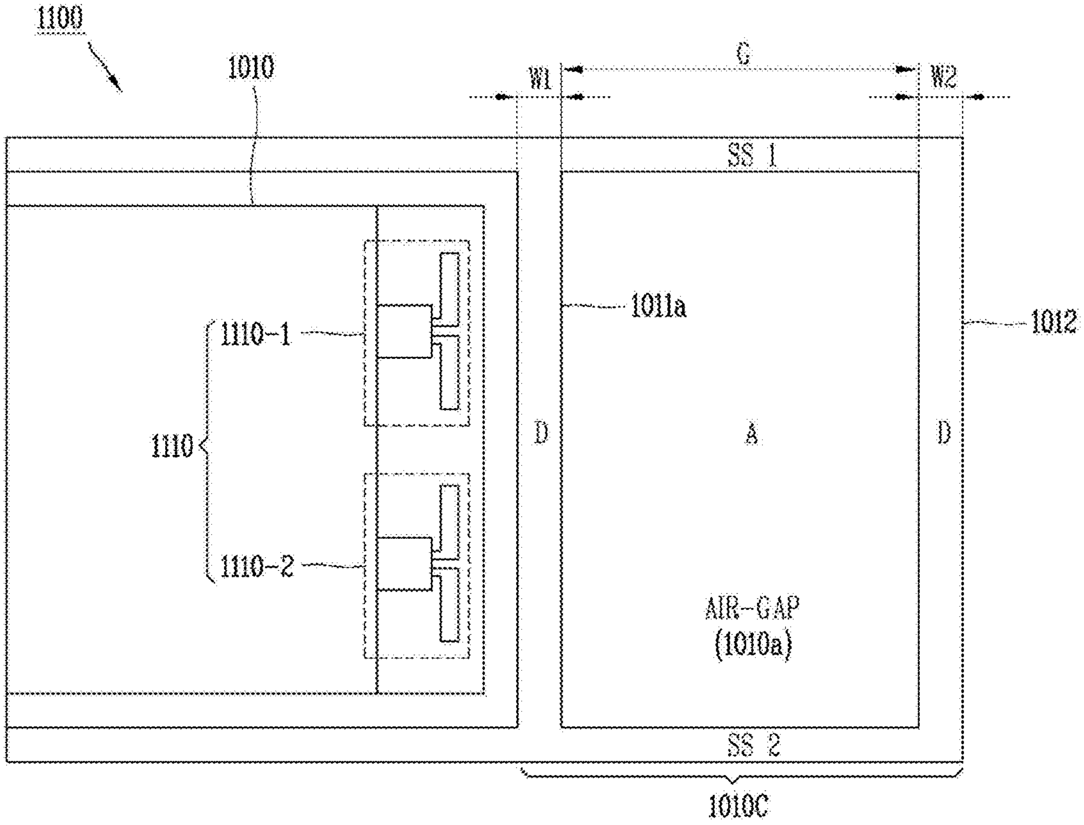
FIG. 9A is one side view of an antenna module according to the present disclosure.
Figure 9B:
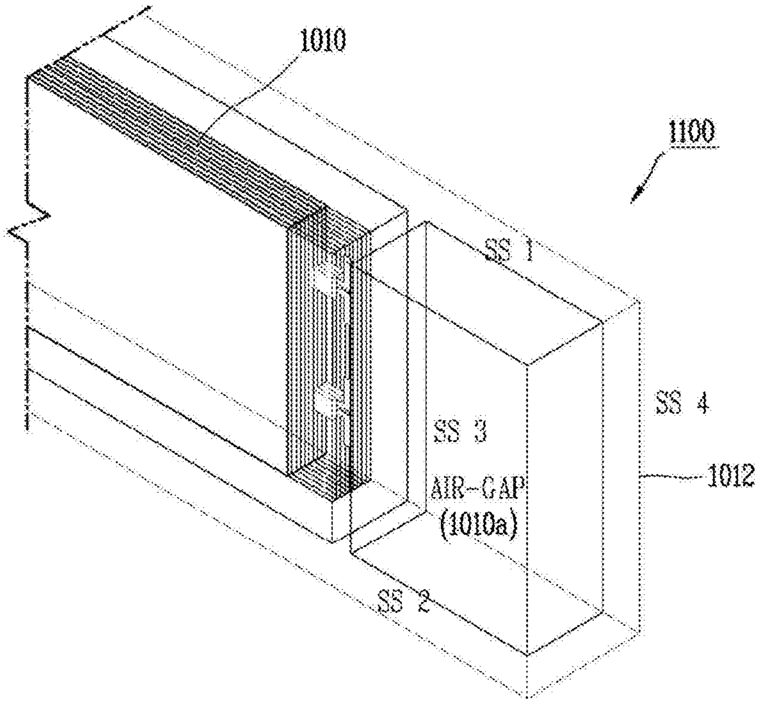
FIG. 9B illustrates a side view and another side view of an antenna module in which an antenna substrate provided with antenna elements according to the present disclosure is arranged.

An antenna module may be provided in a main frame of an image display device having the aforementioned configuration and structure, i.e., an electronic device to perform wireless communication with a peripheral electronic device. In relation to this, FIG. 9A is one side view of an antenna module according to the present disclosure. FIG. 9B illustrates a side view and another side view of an antenna module in which an antenna substrate provided with antenna elements according to the present disclosure is arranged.

Figure 10A:
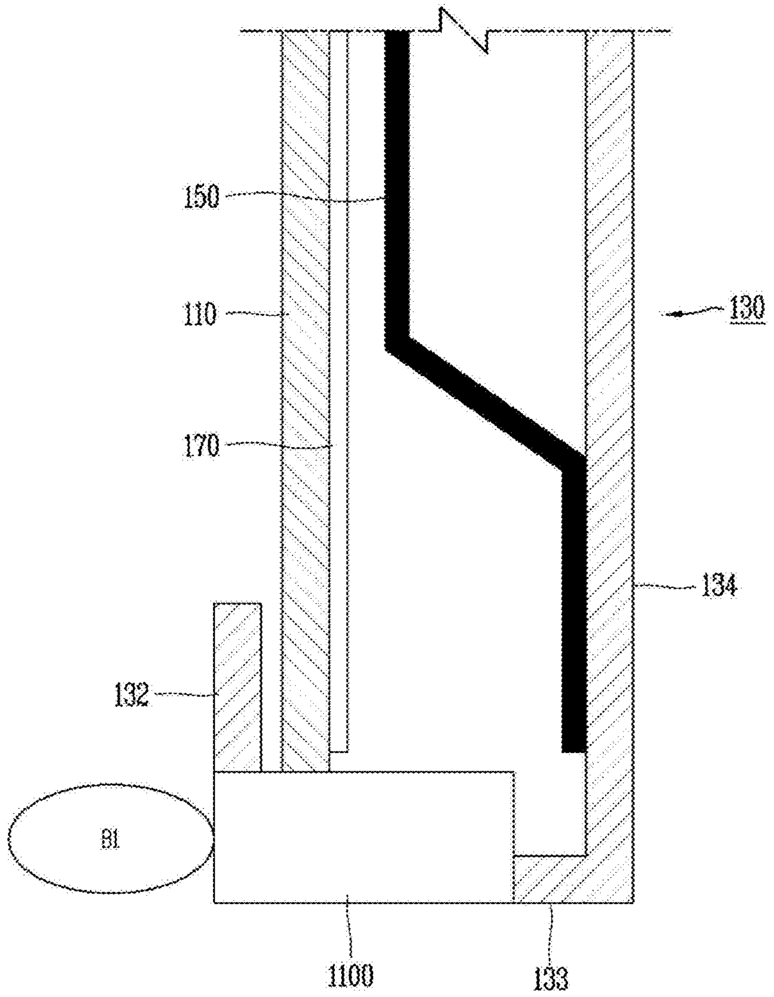
FIGS. 10A to 10C illustrate a configuration of an antenna module that may be arranged in a main frame according to the present disclosure.
Figure 10B:
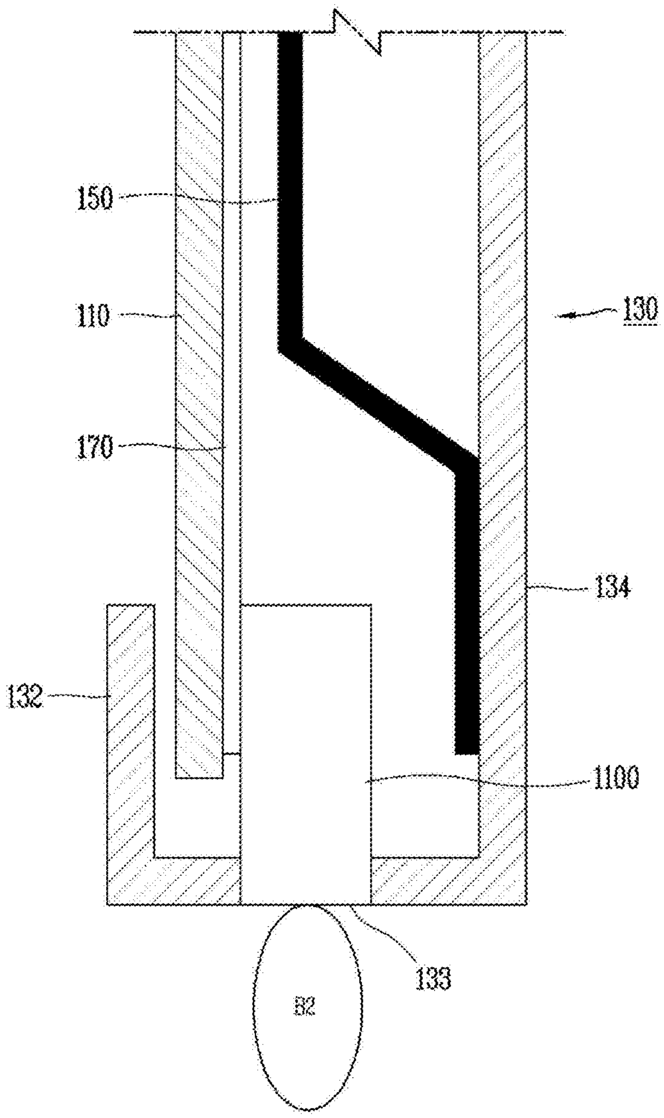
Figure 10C:
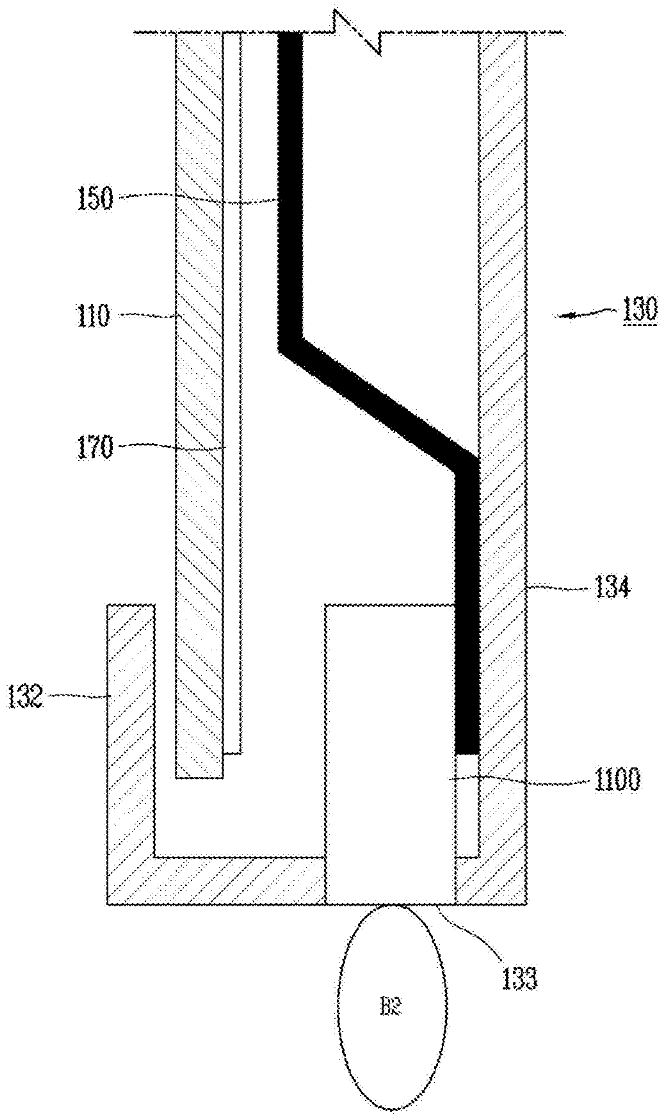

Dielectrics arranged in an outer portion, among a plurality of dielectrics in the antenna module disclosed herein, may be configured as main frames provided on a front surface and a side surface of the electronic device. In relation to this, FIGS. 10A to 10C illustrate a configuration of an antenna module that may be arranged in a main frame according to the present disclosure. FIG. 10A illustrates a structure in which the antenna module 1100 is provided integrally with a front surface portion 132 of the main frame 130. Referring to FIG. 10A, a beamforming radio signal B1 radiated through the antenna module 1100 is radiated toward a front direction of the electronic device to perform wireless communication with an electronic device arranged in a front direction.

FIG. 10B illustrates a structure in which the antenna module 1100 is provided integrally with a side surface portion 133 of the main frame 130 and attached to the inner frame 170. FIG. 10C illustrates a structure in which the antenna module 1100 is provided integrally with the side surface portion 133 of the main frame 130 and attached to the support frame 150. Referring to FIGS. 10B and 10C, beamforming radio signals B2 and B3 radiated through the antenna module 1100 are radiated toward a lower direction of the electronic device to perform wireless communication with an electronic device arranged in a lower direction.

Referring to FIGS. 7A to 10C, the electronic device 1000 disclosed herein may be configured to include the display 110, the main frame 130, and the antenna module 1100.

The display 110 may be arranged on a front surface of the electronic device and configured to display information. The main frame 130 may be arranged along a peripheral region of the display 110 arranged on the front surface, and arranged to extend along side and rear surface regions of the electronic device. The main frame 130 may be arranged to include a front surface region (a front surface portion) 132, a side surface region (a side surface portion) 133, and a rear surface region (a rear surface portion) 134.

The antenna module 1100 is arranged in an inner space of the main frame 130, and configured to radiate a radio signal in a front direction or a lower direction of the electronic device through the main frame 130. In relation to this, a part of an outer structure of the antenna module 1100 may be implemented as the main frame 130. Thus, to configure such that a thickness (width) of the outer structure of the antenna module 1100 has an optimum value, a thickness (width) of the main frame 130 in a corresponding area may be provided to be different from that in other areas.

The antenna module 1100 may be configured to include the antenna substrate 1010, a first dielectric layer 1011, a second dielectric layer 1012, and an air gap layer 1010*a*.

As an antenna element is arranged on the antenna substrate 1010 as illustrated in FIG. 5C, the antenna substrate 1010 may be implemented as the multi-layer substrate 1010 on which a transceiver circuit such as the RFIC 1250 is arranged. The antenna substrate 1010 may be configured such that a plurality of antenna elements are arranged thereon.

The first dielectric layer 1011 may be arranged to be apart from one side surface of the antenna substrate 1010 in a first direction toward which the antenna elements radiate signals. The first dielectric layer 1012 may be arranged to be apart from the first dielectric layer 1011 in the first direction. Since the first dielectric layer 1011 and the second dielectric layer 1012 provide a partial appearance of the antenna module 1100, the first dielectric layer 1011 and the second dielectric layer 1012 may be referred to as a first dielectric portion 1011 and a second dielectric portion 1012, respectively. The air gap layer 1010*a* may be configured to be arranged between the first dielectric layer 1011 and the second dielectric layer 1012.

The first dielectric layer 1011 may be provided to have a first width W1 in the first direction, and the second dielectric layer 1012 may be provided to have a second width W2 in the first direction. The air gap layer 1010*a* may be provided to have a particular gap G in the first direction.

As such, the first dielectric layer 1011, the second dielectric layer 1012, and the air gap layer 1010*a* arranged therebetween may improve antenna performance, particularly, an antenna gain. A structure of the first dielectric layer 1011—the air gap layer 1010*a*—the second dielectric layer 1012 may be referred to as a dielectric-air gap-dielectric (DAD) structure. Through this DAD structure, antenna performance, particularly, an antenna gain may be improved. Hereinafter, a principle of improving antenna performance through the DAD structure is to be described.

Figure 11A:
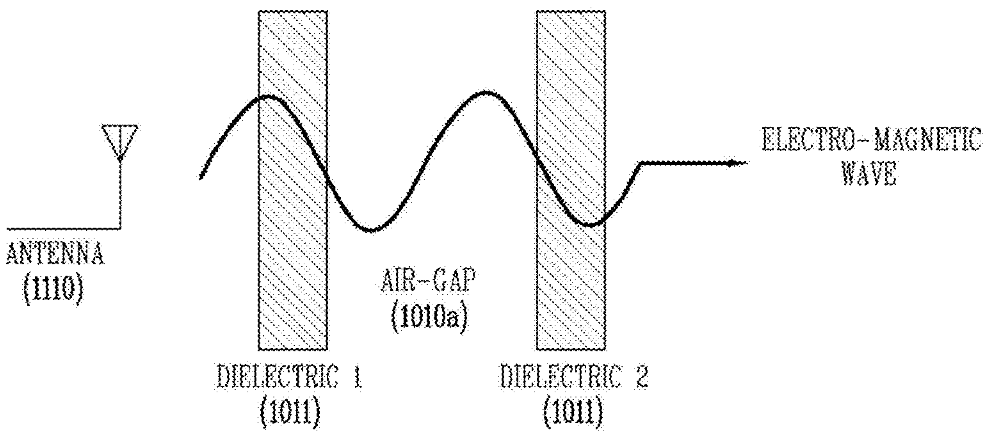
FIG. 11A illustrates a dielectric-air gap-dielectric (DAD) structure arranged in a direction in which an electromagnetic wave proceeds through an antenna element.
Figure 11B:
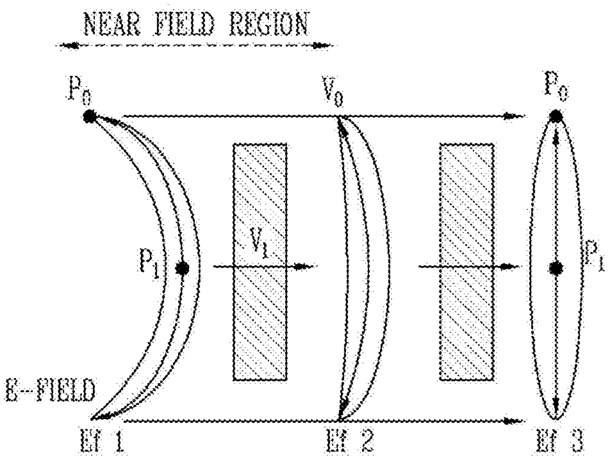
FIG. 11B illustrates an antenna operation mechanism according to electric field distributions in different areas. In addition, FIC. 11C illustrates an electromagnetic wave propagation direction according to a boundary surface of a dielectric, and an antenna operation mechanism resulting therefrom.

In relation to this, FIG. 11A illustrates a DAD structure arranged in a direction in which an electromagnetic wave proceeds through an antenna element. FIG. 11B illustrates an antenna operation mechanism according to electric field distributions in different areas. In addition, FIC. 11C illustrates an electromagnetic wave propagation direction according to a boundary surface of a dielectric, and an antenna operation mechanism resulting therefrom.

Referring to FIG. 11A. antenna performance, particularly, an antenna gains may be improved using two dielectric layers such as the first and second dielectric layers 1011 and 1012 and the air gap layer 1010*a* arranged therebetween. Referring to FIGS. 9A to 11A, when the antenna element 1110 radiates an electromagnetic wave in a particular direction, an electromagnetic wave (a radio signal) passes through a plurality of layers in an order of a dielectric+an air gap+a dielectric (DAD). As described, a structure of the first dielectric layer 1011—the air gap layer 1010*a*—the second dielectric layer 1012, through which a radio signal passes, may be referred to as a dielectric-air gap-dielectric (DAD) structure. In this case, antenna performance (an antenna gain) in a direction toward which a radio signal proceeds may be enhanced using a DAD structure arranged in a front radiation region of the antenna element 1110.

Referring to FIGS. 9A to 11B, the first dielectric layer 1011 is located in a near field region of an antenna. Accordingly, since a first electric field distribution Ef1 does not correspond to a plane wave, an end point P0 and an intermediate point P1 of the first electric field distribution Ef1 are not provided in a vertical direction.

Since the end point P0 does not pass a dielectric layer, an electromagnetic wave may proceed at a speed of v0. However, the electromagnetic wave may proceed at the intermediate point P1 at a speed of v1 due to the dielectric layer. In relation to this, since v0>v1, when the electromagnetic wave passes the first dielectric layer 1011, a second electric field distribution Ef2 becomes close to a plane wave.

In the air gap layer 1010*a*, since the electromagnetic wave proceeds at a same speed at the end point P0 and the intermediate point P1, a radio signal propagates in a form of a same electric field distribution as the second electric field distribution Ef2. However, when the electromagnetic passes through the second dielectric layer 1012, a point at which the end point P0 and the intermediate point 1012 are arranged in a same vertical position is present due to a speed difference. Thus, a second width W2 of the second dielectric layer 1012 may be set so that the end point P0 and the intermediate point P1 are arranged in a same vertical position. Accordingly, a third electric field distribution Ef3 of the electromagnetic wave that have passed through the second dielectric layer 1012 becomes a plane wave. Therefore, when an electromagnetic wave having passed through the second dielectric layer 1012 is received, a radio signal having a same phase at the end point P0 and the intermediate point P1 is received. Accordingly, as the radio signal having passed through the second dielectric layer 1012 is received without a signal loss that may be caused by a phase difference, an antenna gain may be improved.

The first electric field Ef1 may be changed to the second electric distribution Ef2 similar to a plane wave by providing the first dielectric layer 1011 to have the first width W1. As the air gap layer 1010*a* is provided between the first dielectric layer 1011 and the second dielectric layer 1012, the second electric field distribution Ef2 is maintained in correspondence with a certain space, and thus, performance deterioration due to a drastic change in an electric field distribution may be prevented. As the second electric distribution Ef2 is maintained in correspondence with a certain space, a bandwidth decrease due to a drastic change in an electric field distribution may be prevented. In addition, by providing the second dielectric layer 1012 to have the second width W2, the second electric field Ef2 may be provided as the third electric distribution Ef3 having a complete form of a plane wave.

Figure 11C:
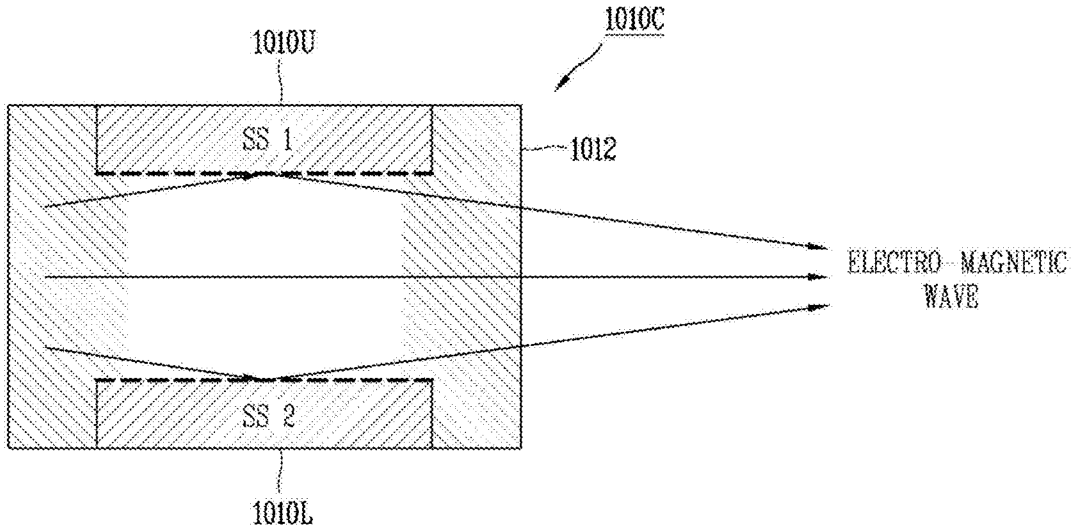

As illustrated in FIGS. 11A to 11C, a third dielectric layer may be further arranged between the first dielectric layer 1011 and the second dielectric layer 1012. In other words, another dielectric layer, i.e., the third dielectric layer may be further arranged in between the air gap layer 1010*a*.

A third effective permittivity of the third dielectric may be set to have a lower value than that of a first permittivity of the first dielectric 1011 and a second permittivity of the second dielectric 1012. In this case, the air gap layer 1010*a* may include a first air gap layer and a second air gap layer. The first air gap layer may be provided between the first dielectric layer 1011 and the third dielectric layer. The second air gap layer may be provided between the third dielectric layer and the second dielectric layer 1012.

Referring to FIGS. 9A to 11C, the first and second dielectric layers 1011 and 1012 of the antenna module 1011 having a DAD structure are connected to each other via a dielectric to thereby provide a dielectric cavity 1010C. In detail, the first and second dielectric layers 1011 and 1012 may be connected to each other through first to fourth side surfaces SS1 to SS4 constituting a side surface region of the antenna module. Accordingly, the first dielectric layer 1011 and the second dielectric layer 1012 may constitute a hexahedron structure having an air gap layer implemented therein.

The third dielectric layer may be arranged between the first dielectric layer 1011 and the second dielectric layer 1012. Referring to FIGS. 9A to 11C, the third dielectric layer may be connected to the first to fourth side surfaces SS1 to SS4 of the hexahedron structure. As described above, the third effective permittivity of the third dielectric layer may be set to have a lower value than that of the first permittivity of the first dielectric layer 1011 and a second permittivity of the second dielectric layer 1012.

The first dielectric layer 1011 may constitute a rear surface of the hexahedron structure, and the second dielectric layer 1011 may constitute a front surface of the hexahedron structure. A radio signal radiated through antenna elements may provide directivity toward a front direction through the dielectric cavity 1010*c* corresponding to the hexahedron structure.

Dielectric boundary surfaces of an upper surface 1010U and a lower surface 1010L of the dielectric cavity 1010C provided as a hexahedron structure are configured to reflect an electromagnetic wave radiated from an antenna. That is, the dielectric boundary surfaces of the upper surface 1010U and the lower surface 1010L of the dielectric cavity 1010C may function to reflect a radio signal. Accordingly, a radio signal diverging from a first direction, i.e., a front direction in which the electromagnetic wave proceeds may be reflected in the first direction to thereby improve an antenna gain.

As an example, permittivities of the upper surface 1010U and the lower surface 1010L of the dielectric cavity 1010C may be set to a value greater than that of a permittivity of another surface of the dielectric cavity 1010C. As another example, metal patterns may be provided to be apart from each other to have a certain space therebetween in a form of a plurality of matrices to reflect a radio signal onto the upper surface 1010U and the lower surface 1010L of the dielectric cavity 1010C.

Figure 12:
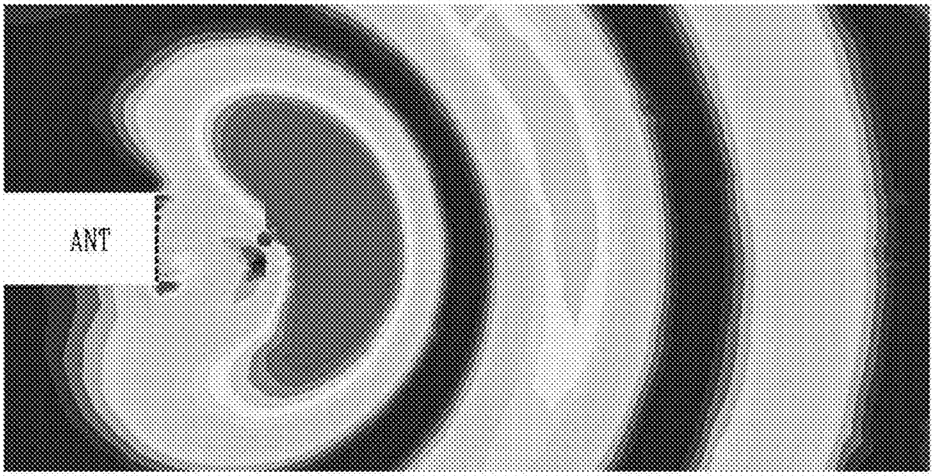
FIG. 12 illustrates a comparison of changes in electric field distributions according to whether or not a DAD structure is present.
Figure 12:
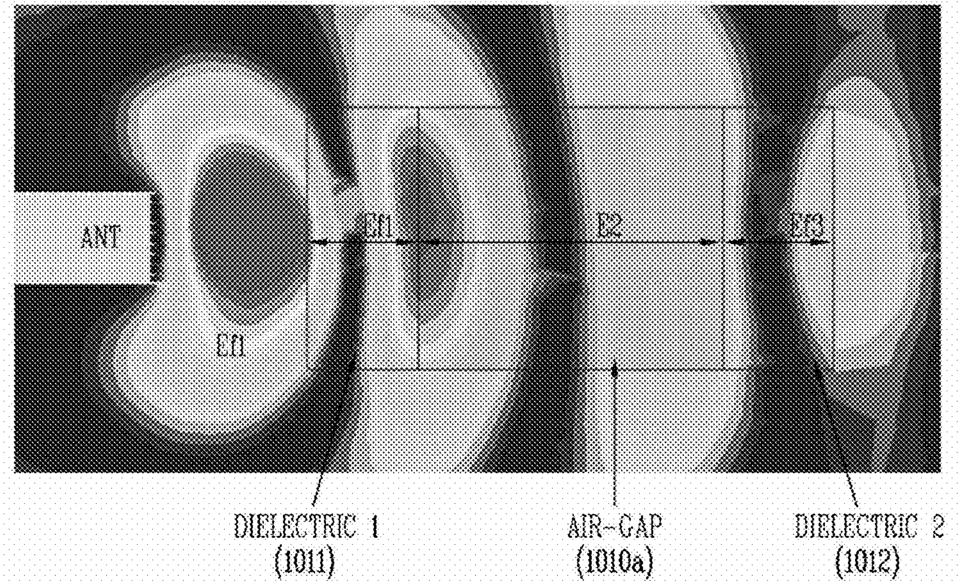

Hereinafter, an electric field distribution provided in a DAD structure disclosed herein is described in detail. In relation to this, FIG. 12 illustrates a comparison of changes in electric field distributions according to whether or not a DAD structure is present. (a) of FIG. 12 illustrates an electric field distribution, i.e., an electric field strength when an end-fire antenna is provided on an antenna substrate. On the other hand, (b) of FIG. 12 illustrates an electric field distribution, i.e., an electric field strength when an end-fire antenna is provided on an antenna substrate and a DAD structure is provided in a direction toward which a signal is radiated.

Referring to (a) of FIG. 12, three regions in which an electric field strength is greater at a left side are provided. It may be checked that in a portion nearer a left region corresponding to a near field region, an in-phase electric field distribution is configured to have a curved surface form, and thus, does not constitute a plane wave. In addition, since a region having a third greatest electric field strength includes a curved surface form, it may be checked that a plane wave is not provided.

Referring to FIGS. 9A to 11C, and (b) of FIG. 12, when a DAD structure is applied to an end-fire antenna, the region having the third greatest electric field strength may be a region in which the air gap layer 1010*a* is arranged. In this case, it may be checked that the second electric field distribution Ef2 in the region in which the air gap layer 1010*a* is arranged is similar nearly to a plane wave. In addition, as an electromagnetic wave passes through the second dielectric layer 1012, it may be checked that the third electric field distribution Ef3 constitutes a plane wave having a flat surface form instead of a curved surface form.

Referring to FIGS. 9A to 11C, the dielectric cavity 1010C including the first and second dielectric layers 1011 and 1012 of an antenna module having a DAD structure disclosed herein, i.e., a dielectric structure may be configured to have a form of an instrument injection molding. The dielectric cavity 1010C including the first and second dielectric layers 1011 and 1012, i.e., the dielectric structure may include a material such as plastic, etc. Permittivities of the first and second dielectric layers 1011 and 1012 and the first to fourth side surfaces SS1 to SS4 may be changed according to applications. A third permittivity of the third dielectric layer between the first and second dielectric layers 1011 and 1012 may be set to be lower than permittivity of another dielectric layer.

The first dielectric layer 1011 arranged in a region near the antenna element 1110 may be configured to surround the antenna substrate 1010 so that the antenna substrate 1010 is fixedly arranged inside the dielectric cavity 1010C.

The antenna element 1110 may include a plurality of dipole array antennas 1110-1 and 1110-2. A number of antenna elements constituting the dipole array antennas 1110-1 and 1110-2 may be two, but is not limited thereto. Accordingly, the number of the antenna elements constituting an array antenna may be expanded to two, four, six, eight, or the like. Accordingly, the array antenna may be configured as a 1×2, 1×4, 1×6, or 1×8 array antenna.

A ground provided on any layer of a multi-layer substrate in the antenna substrate 1010 functions as a reflector of the antenna element 1110. Accordingly, an electromagnetic wave may be guided in a particular direction to be radiated toward a direction in which a DAD structure is arranged as illustrated in FIG. 11C.

The second dielectric layer 1012 may constitute an outer appearance of an instrument corresponding to the dielectric cavity 1010C, i.e., a dielectric structure. A width of the air gap layer 1010*a*, i.e., the gap G may be provided to have a thickness greater than the first width W1 of the first dielectric layer 1011. According to embodiments, a width of the air gap layer 1010*a*, i.e., the gap G may be provided to have a thickness greater than the second width W2 of the second dielectric layer 1012, but is not limited thereto.

In relation to this, since the first dielectric layer 1011 is arranged near the antenna element 1110, a thickness of the first dielectric layer 1011 may be set to have a value equal to or greater than a first lower limit value to improve an antenna gain. However, when a thickness of the first dielectric layer 1011 is set to a value equal to or greater than a first upper limit value, antenna efficiency may deteriorate due to a dielectric loss.

Meanwhile, since the second dielectric layer 1012 is arranged further apart from the antenna element 1110 compared to the first dielectric layer 1011, an effect of the second dielectric layer 1012 on antenna performance may be less compared to the first dielectric layer 1011. However, a thickness of the second dielectric layer 1012 may be set to a value equal to or greater than a second lower limit value to provide an electric field distribution having a complete form of a plane wave. A thickness of the second dielectric layer 1012 may be set to a value equal to or less than a second upper limit value to maintain a whole size of the antenna module within a certain range. As a thickness of a particular dielectric layer including the second dielectric layer 1012 increases, a higher order mode may occur. Accordingly, a thickness of the second dielectric layer 1012 may be set to a value equal to or less than the second upper limit value so that antenna efficiency does not decrease due to occurrence of the higher order mode.

Figure 13A:
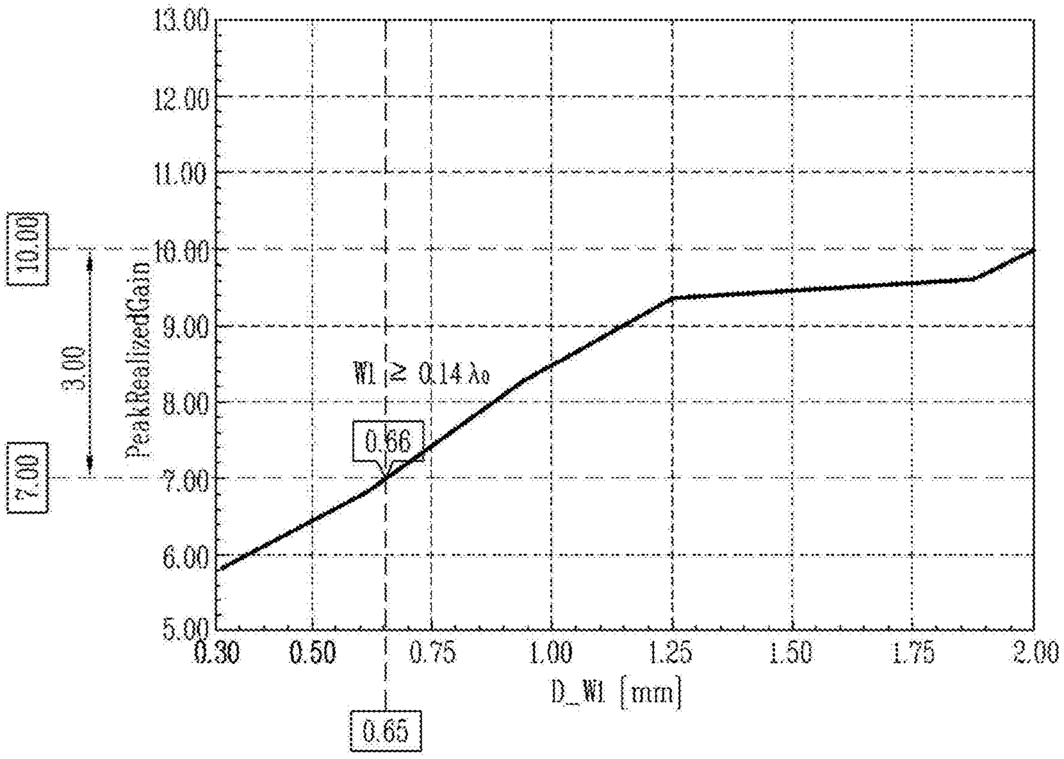
FIGS. 13A to 13C show simulation results with respect to one antenna element constituting an array antenna.
Figure 13B:
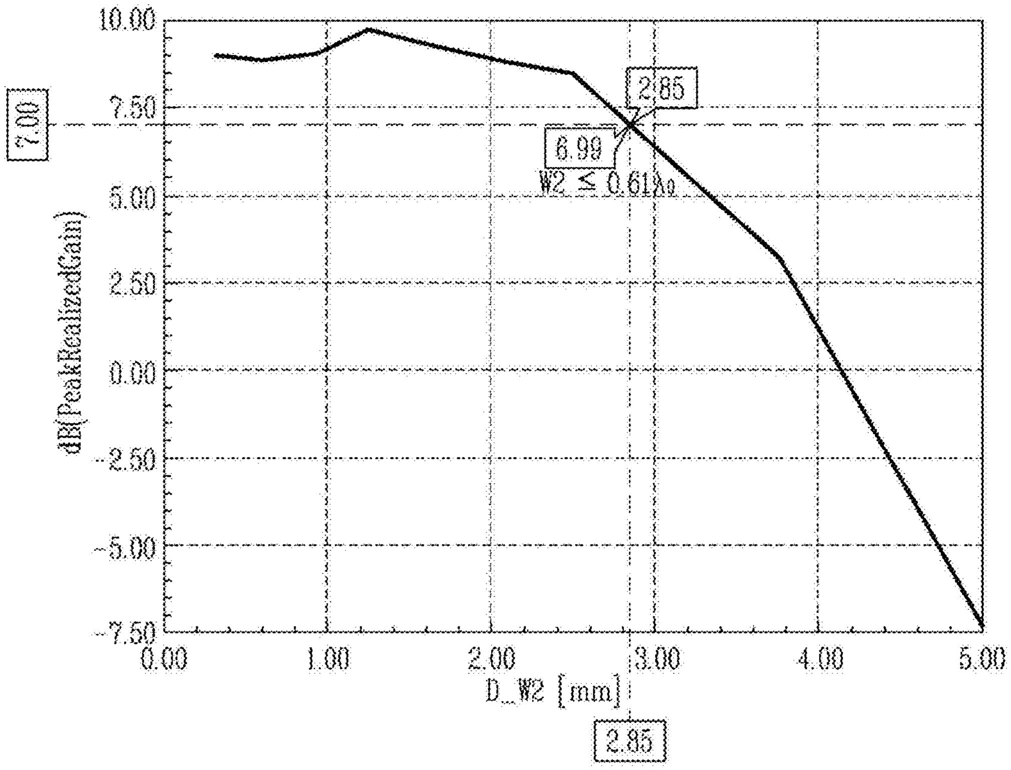
Figure 13C:
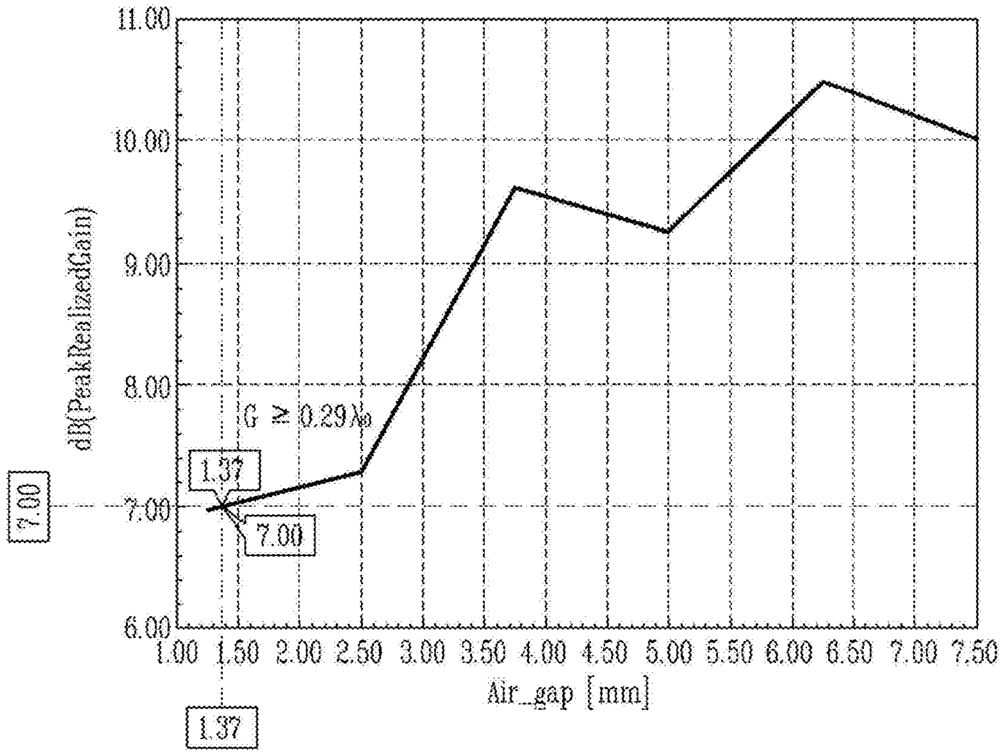

In relation to this, FIGS. 13A and 13C illustrate widths and peak gains of a first dielectric layer, an air gap layer, and a second dielectric layer. FIG. 13A illustrates the first width W1 and a peak gain of the first dielectric layer 1011. FIG. 13B illustrates a second width W2 and a peak gain of the second dielectric layer 1012. FIG. 13C illustrates the gap G and a peak gain of the air gap layer 1010*a*.

Referring to FIGS. 9A to 11C and 13A, the first width W1 of the first dielectric layer 1011 may be set to a value equal to or greater than a first threshold value (or a first lower limit value) of a wavelength corresponding to an operating frequency of the antenna element 1110. Referring to FIGS. 9A to 11C and 13A, the second width W2 of the second dielectric layer 1012 may be set to a value equal to or less than a second threshold value (or a second upper limit value) of a wavelength corresponding to an operating frequency of the antenna element 1110.

As described above, a thickness of the first dielectric layer 1011 adjacent to the antenna element 1110 in a DAD structure may be defined as the first width W1. A thickness of the second dielectric layer 1012 spaced apart from the antenna element 1110 may be defined as the second width W2. A thickness of the air gap layer 1010*a* provided between the first and second dielectric layers 1011 and 1012 may be defined as a particular gap G. Threshold value for stably implementing antenna performance using the DAD structure are present. In the present disclosure, threshold values of W1, W2, and G are set.

According to embodiments, with reference to an antenna operating at a center frequency of 63.5 GHZ, when a dipole antenna is implemented as an array antenna, the threshold values of W1, W2, and G may be set. Alternatively, when one single antenna element is arranged, the threshold values of W1, W2, and G may be set.

FIGS. 13A to 13C show simulation results with respect to one antenna element constituting an array antenna. This is because even when a signal is applied to all of the plurality of antenna elements 1110-1 and 1110-2, and thus, the antenna elements operate as an array antenna, a similar change in antenna gain characteristics according a thickness change is shown.

Referring to FIGS. 9A to 11C and 13A, an antenna gain change according to a change in the first width W1 of the first dielectric layer 1011 is shown. When the first width W1, i.e., a thickness of the first dielectric layer 1011 decreases, an antenna gain decreases. When an antenna gain is 7 dBi, the first width W1 is 0.65 mm. Since a wavelength 2*o* is about 4.7 mm at 63.5 GHz, a first threshold value of the first width $W1=0.14\lambda_0$.

Referring to FIGS. 9A to 11C and 13B, an antenna gain change according to a change in the second width W2 of the second dielectric layer 1012 is shown. When the second width W2, i.e., a thickness of the second dielectric layer 1012 increases, an antenna gain decreases. When an antenna gain is 7 dBi, the second width W2 is 2.85 mm. Since a wavelength 2*o* is about 4.7 mm at 63.5 GHZ, a threshold value of the second width $W2=0.61\lambda_0$.

Referring to FIGS. 9A to 11C and 13C, an antenna gain change according to a change in the air gap layer 1010*a* is shown. When a particular gap G, i.e., a thickness of the air gap layer 1010*a* decreases, an antenna gain decreases. When an antenna gain is 7 dBi, the gap G is 1.37 mm. Since a wavelength $\lambda_0$ is about 4.7 mm at 63.5 GHZ, the particular gap $G=0.29\lambda_2$.

Referring to FIGS. 9A to 11C and FIGS. 13A to 13C, the first width W1 of the first dielectric layer 1011 may be set to a value equal to or greater than 0.14 times a value of a wavelength corresponding to an operating frequency of the antenna element. The second width W2 of the second dielectric layer 1012 may be set to a value equal to or less than 0.61 times a wavelength corresponding to an operating frequency of the antenna element. The particular gap G of the air gap layer 1010*a* may be set to a value equal to or greater than 0.29 times a value of a wavelength corresponding to an operating frequency of the antenna element.

An antenna module having a DAD structure disclosed herein may be implemented using a main frame of an electronic device (a display device). Referring to FIG. 9B, an antenna module having a DAD structure may be arranged in a region R including a front lower portion, a side lower portion, and a rear lower portion of a main frame. In relation to this, FIGS. 14A and 14B illustrate an arrangement structure of an antenna module having a DAD structure in which a part of a main frame combined with a display panel is used as a second dielectric layer.

Figure 14A:
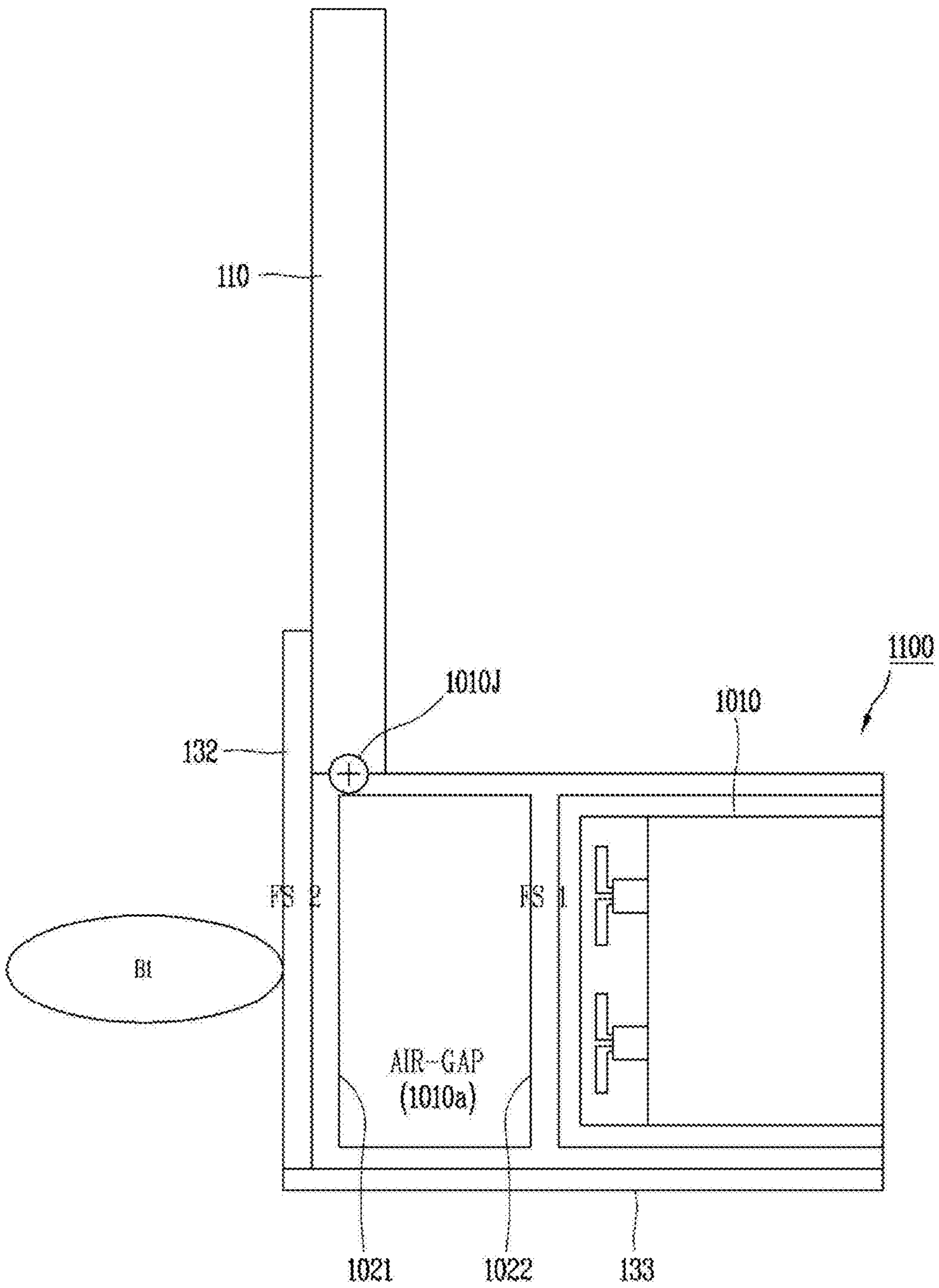
FIGS. 14A and 14B illustrate an arrangement structure of an antenna module having a DAD structure in which a part of a main frame combined with a display panel is used as a second dielectric.
Figure 14B:
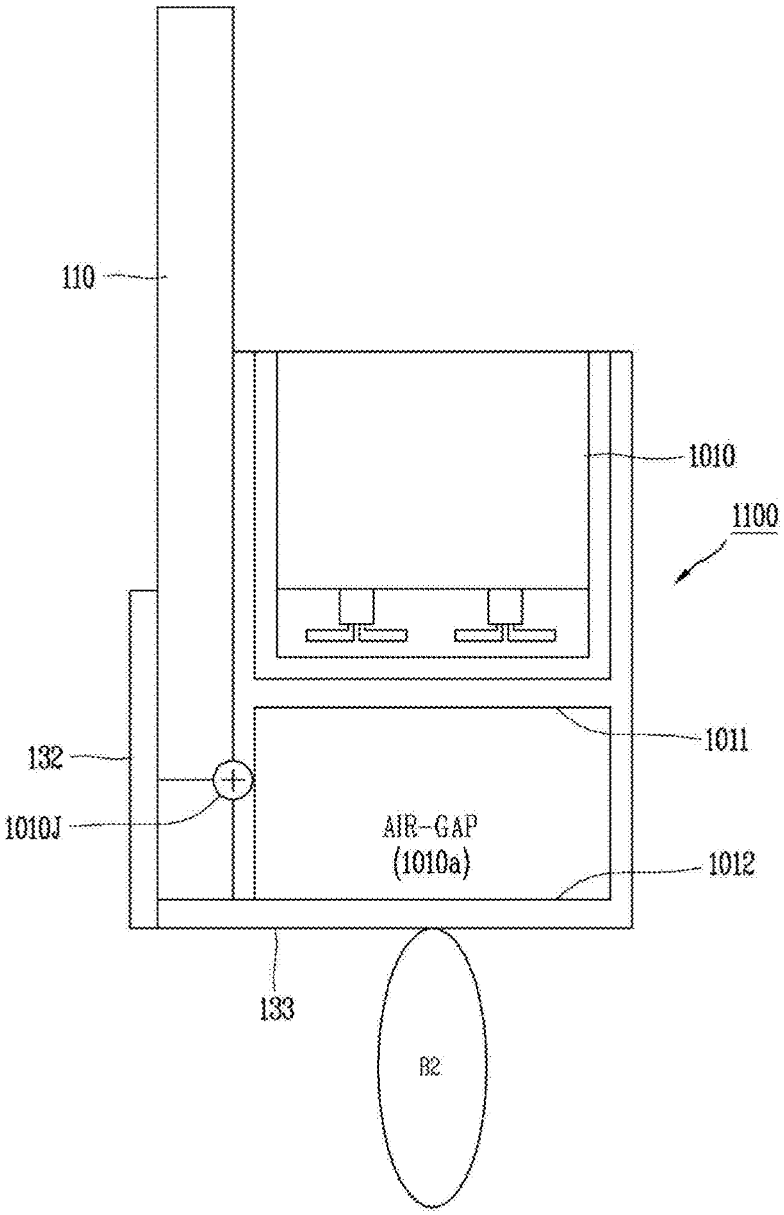

FIG. 14A illustrates a configuration in which the antenna module 1100 having a DAD structure is combined with a front surface region 132 (a front surface portion) of the main frame 130. In the antenna module 1100 having a DAD structure, a part of the front surface region 132 (the front surface portion) of the main frame 130 may be used as the second dielectric layer. FIG. 14B illustrates a configuration in which the antenna module 1100 having a DAD structure is combined with a side surface region 133 (a side surface portion) of the main frame 130. In the antenna module 1100 having a DAD structure, a part of the side surface region 133 (a side surface portion) of the main frame 130 may be used as the second dielectric layer.

An antenna module having such a DAD structure may be arranged to be combined with at least one from among the front surface region 132 (a front surface portion), the side surface region 133 (the side surface portion) 133, and the rear surface region 134 (a rear surface portion). In relation to this, FIGS. 15A to 15C illustrate arrangement structures of a DAD antenna module according to various embodiments.

Figure 15A:
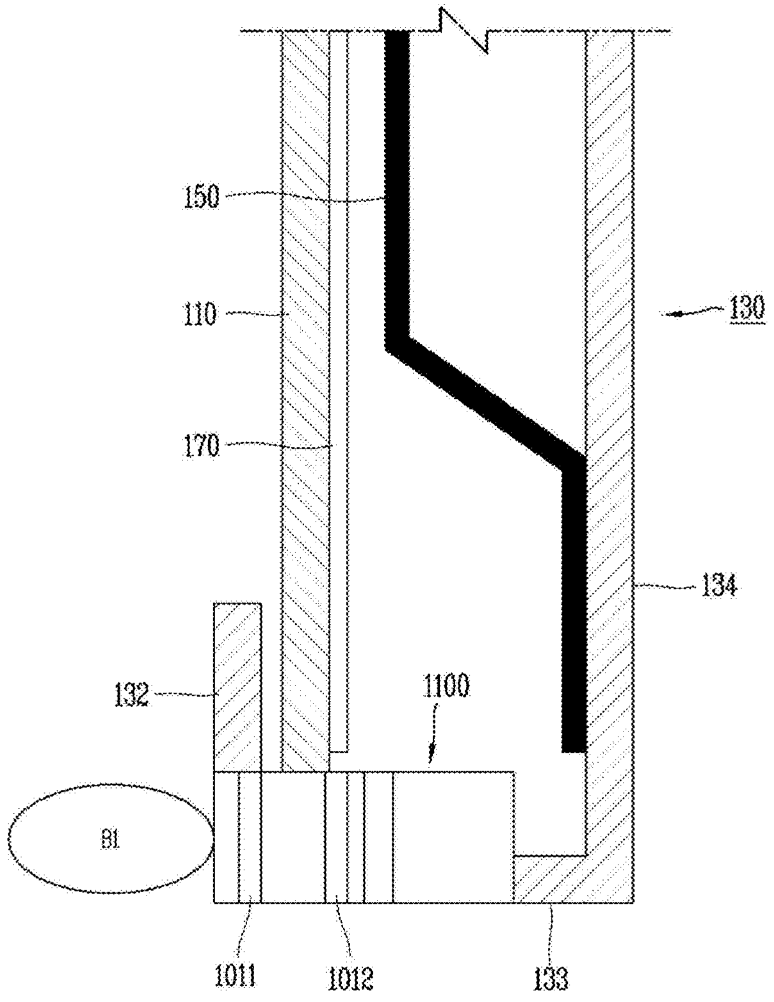
FIGS. 15A to 15C illustrate arrangement structures of a DAD antenna module according to various embodiments.
Figure 15B:
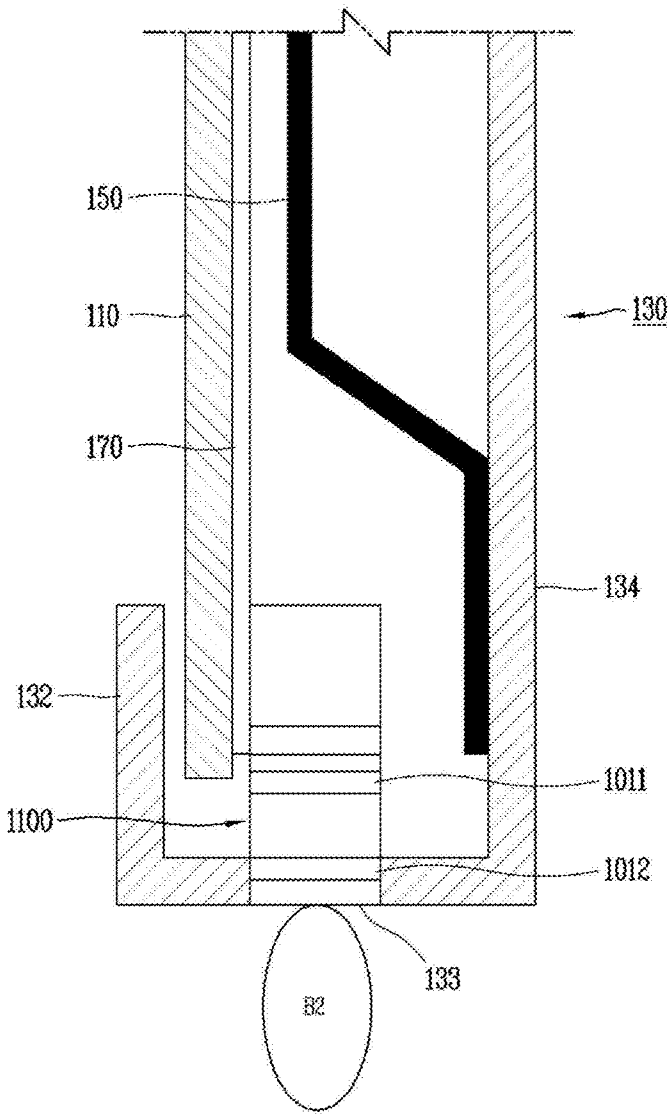
Figure 15C:
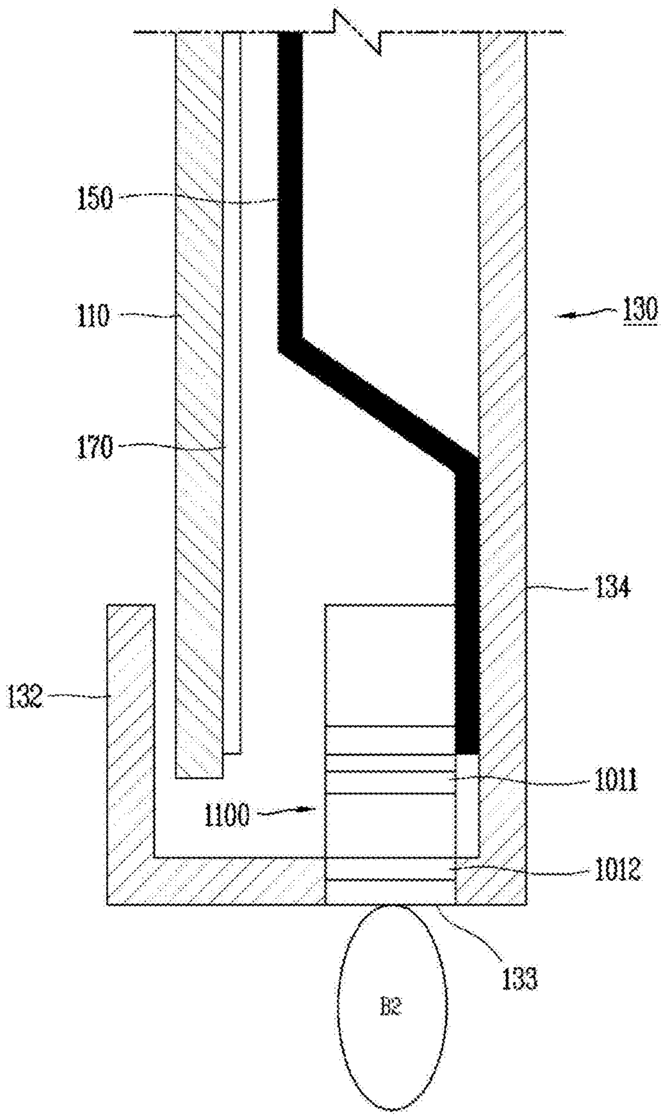

FIG. 15A illustrates a first structure in which the antenna module 1100 having a DAD structure is provided integrally with the front surface portion 132 (a front surface portion) of the main frame 130. FIG. 15B illustrates a second structure in which the antenna module 1100 having a DAD structure is provided integrally with the side surface portion 133 (a side surface portion) of the main frame 130 and combined with the inner frame 170. FIG. 15C illustrates a third structure in which the antenna module 1100 having a DAD structure is provided integrally with the side surface portion 133 (the side surface portion) of the main frame 130 and combined with the support frame 150.

Referring to FIGS. 7A to 11C and 14A to 15C, the main frame 130 may constitute an outermost dielectric layer of a DAD antenna structure. In relation to this, the first dielectric layer 1011 may constitute a first surface FS1 of the antenna module 1110. The second dielectric layer 1012 may be implemented as a main frame 130 combined with a second surface FS2 of the antenna module 1110. The air gap layer 1010*a* may be provided as a space from a first surface FS1, i.e., a front surface of the antenna module 1100 to the main frame 130.

The antenna module 1100 and the main frame 130 are connected to each other on a side surface region to constitute a hexahedron structure, i.e., the dielectric cavity 1010C as illustrated in FIGS. 9B, 14A, and 14B. That is, the first dielectric layer 1011 and the main frame 130 are connected to each other through the first to fourth side surfaces SS1 to SS4 constituting a side surface region of the antenna module 1100 to constitute the hexahedron structure 1010C having the air gap layer 1010*a* implemented therein.

The hexahedron structure 1010C may be assumed as an empty structure arranged on a front surface of the antenna element 1100. In relation to this, the first dielectric layer 1011 constitutes a rear surface of the hexahedron structure 1010C, and the main frame 130 may constitute a front surface of the hexahedron structure 1010C. Accordingly, a radio signal radiated through the antenna elements 1110 may provide directivity toward a front direction through the dielectric cavity 1010*c* corresponding to the hexahedron structure including the main frame 130.

Referring to FIGS. 14A to 15A, the second dielectric portion 1012 of the antenna module 1100 may be provided integrally with the front surface portion 132 of the main frame 130. Accordingly, a beamforming signal radiated through the antenna elements 1110 is radiated toward a front direction through the front surface portion 132 of the main frame 130.

In relation to this, in the antenna module 1100, an outermost dielectric may be provided by the front surface portion 132 of the main frame 130 without the second dielectric portion. In this case, a second width W2 of a DAD antenna structure is determined as a width of the front surface portion 132 of the main frame 130. Alternatively, in the antenna module 1100, an outermost dielectric may be provided by combining the second dielectric portion 1012 with the front surface portion 132 of the main frame 130. In this case, the second width W2 of a DAD antenna structure is determined by a sum of a width of the front surface portion 132 of the main frame 130 and a width of the second dielectric portion 1012.

Referring to FIGS. 14B, 15B, 15C, the second dielectric portion 1012 of the antenna module 1100 may be provided integrally with the side surface portion 133 of the main frame 130. Accordingly, a beamforming signal radiated through the antenna elements 1110 may be radiated toward a side direction through the side surface portion 133 of the main frame 130.

In relation to this, in the antenna module 1100, an outermost dielectric may be provided by the side surface portion 133 of the main frame 130 without the second dielectric portion. In this case, the second width W2 of a DAD antenna structure is determined by a width of the side surface portion 133 of the main frame 130. Alternatively, the antenna module 1100 may be provided with an outermost dielectric by combining the second dielectric portion 1012 with the side surface portion 133 of the main frame 130. In this case, the second width W2 of a DAD antenna structure is determined by a sum of a width of the side surface portion 133 of the main frame 130 and a width of the second dielectric portion 1012.

Referring to FIG. 15B, the antenna module 1100 may be attached to a side surface portion 133 of the main frame 130 and the inner frame 170. In relation to this, the second dielectric portion 1012 of the antenna module 1100 may be provided integrally with the side surface portion 133 of the main frame 130. The antenna module 1100 may be combined with the inner frame attached to a rear surface of a display 110 and the side surface portion 133 of the main frame 130. Accordingly, a beamforming signal radiated through the antenna elements 1100 may be radiated through the side surface portion 133 of the main frame 130. In addition, the antenna module 1100 may be fixedly arranged inside an electronic device by the side surface portion 133 of the main frame 130 and the inner frame 170.

Referring to FIG. 15C, the antenna module 1100 may be attached to the side surface portion 133 of the main frame 130 and the support frame 150. In relation to this, the second dielectric portion 1012 of the antenna module 1100 may be provided integrally with the side surface portion 133 of the main frame 130. The antenna module 1100 may be combined with the support frame 150 attached to the rear surface portion 134 of the main frame 130 and the side surface portion 133 of the main frame 130. Accordingly, a beamforming signal radiated through the antenna elements 1100 may be radiated through the side surface portion 133 of the main frame 130. In addition, the antenna module 1100 may be fixedly arranged inside the electronic device by the side surface portion 133 of the main frame 130 and the support frame 150.

Referring to FIGS. 14A and 14B, the antenna module 1100 may be combined with the rear surface of the display 110 through a joint portion 1010J. An example of the joint portion 1010J may be a screw for fixing a DAD antenna structure, and may include a plastic or metal material. Like the screw, the joint portion 1010J is arranged between a side antenna, i.e., the antenna element 1110-1 located at an uppermost portion and the display 110 not to block or interfere with a proceeding direction of an electromagnetic wave radiated from an antenna. Like a screw, the joint portion 1010J may operate as a director configured to transmit an electromagnetic wave generated from the antenna elements 1110 toward a side surface of a multi-layer substrate, i.e., a front surface of the electronic device.

Referring to FIG. 14A, the antenna module 1100 may be connected through the joint portion 1010J at a point in one side surface region in which the first and second dielectric layers 1011 and 1012 of the antenna module 1100 are connected to each other. In relation to this, the antenna module 1100 may be combined with the side surface portion 133 of the main frame 130, the display 110, or the inner frame 170.

Referring to FIG. 14B, the antenna module 1100 may be connected to the inner frame 170 arranged on the rear surface of the display 110 through the joint portion 1010J at a point in one side surface region in which the first and second dielectric layers 1011 and 1012 of the antenna module 1100 are connected to each other. Referring to FIG. 15C, a structure shown in FIG. 14B may be configured such that the antenna module 1100 is combined with the support frame 150 arranged on the rear surface portion 134 of the main frame 130 through the joint portion 1010J.

Figure 16:
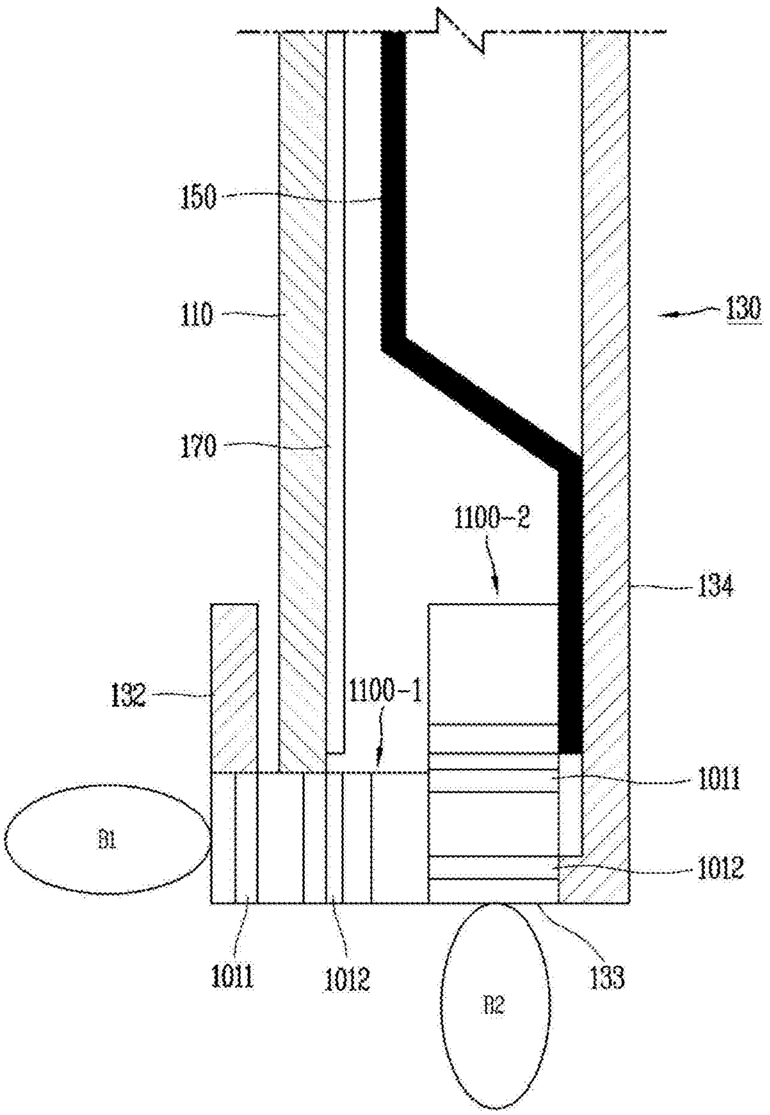
FIG. 16 illustrates a configuration in which a plurality of antenna modules are arranged in an electronic device according to one embodiment of the present disclosure.

A front radiation structure and a rear radiation structure disclosed herein may be implemented simultaneously by arranging a plurality of antenna modules in an electronic device. In relation to this, FIG. 16 illustrates a configuration in which a plurality of antenna modules are arranged in an electronic device according to one embodiment of the present disclosure. Referring to FIGS. 14A to 16, the antenna module 1100 may be configured to include a first antenna module 1100-1 and a second antenna module 1100-2.

The first antenna module 1100-1 may be configured such that the second dielectric portion 1012 is provided integrally with the front surface portion 132 of the main frame 130. The first antenna module 1100-1 may be configured such that a first beamforming signal B1 provided through a first array antenna may be radiated through the front surface portion 132 of the main frame 130. The first array antenna may be an end-fire array antenna (e.g., a dipole array antenna) configured to radiate the first beamforming signal B1 toward a side surface region of the multi-layer substrate 1010, i.e., the first surface portion 132 of the main frame 130.

The second antenna module 1100-2 may be configured such that the second dielectric portion 1012 is provided integrally with the side surface portion 133 of the main frame 130. The first antenna module 1100-1 may be configured such that a second beamforming signal B2 provided through a second array antenna may be radiated through the side surface portion 133 of the main frame 130. The second array antenna may be an end-fire array antenna (e.g., a dipole array antenna) configured to radiate the second beamforming signal B2 toward a side surface region of the multi-layer substrate 1010, i.e., the first surface portion 133 of the main frame 130.

The second antenna 1100-2 is illustrates as being combined with the support frame 150 arranged in the rear surface portion 134 of the main frame 130, but is not limited to this combination structure. As illustrated in FIG. 15B, the second antenna module 1100-2 of FIG. 16 may be combined with the inner frame 170 arranged on the rear surface of the display 110.

Figure 17A:
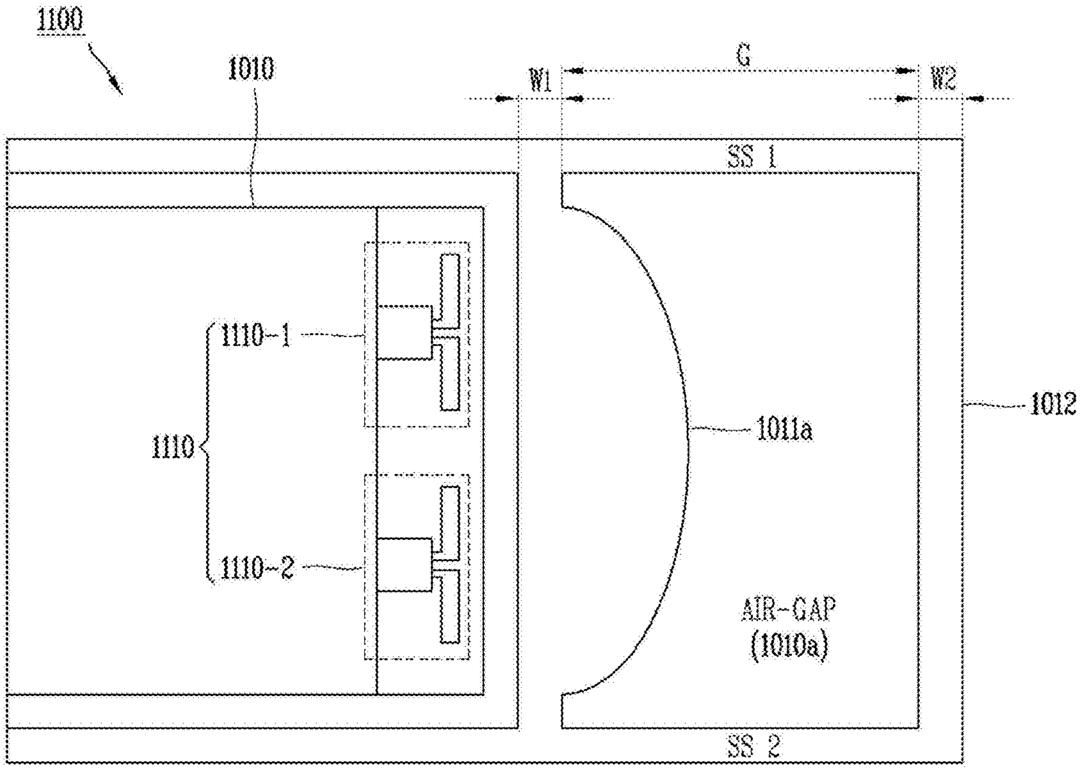
FIG. 17A illustrates a structure in which a first dielectric layer is provided as a dielectric lens structure.

A DAD antenna structure disclosed herein may be changed to various structures according to applications. In relation to this, FIG. 17A illustrates a structure in which a first dielectric layer is provided as a dielectric lens structure. FIG. 17A illustrates a structure in which the first dielectric layer is configured as a dielectric lens 1011*a* to be convex in a first direction (a first direction) and provided in the antenna module 1100. The first dielectric layer is provided to have a convex form to be the dielectric lens 1011*a*. Accordingly, the dielectric lens 1011*a* is partially enlarged into an internal area of the air gap layer 1010*a* to have a convex form. The air gap layer 1010*a* is provided to be concave from upper and lower ends to a center of a side surface. A structure shown in FIG. 17A and including a dielectric lens-air gap-dielectric structure may be referred to as a dielectric lens-air gap-dielectric (DLAD) structure.

As described above, the dielectric lens 1011*a* provided to be convex may concentrate an electromagnetic wave into the air gap layer 1010*a*. Thus, more electromagnetic waves may be concentrated into the dielectric cavity 1010C to further improve an antenna gain.

According to applications, a shape of a dielectric lens is not limited to a shape convex in a front direction, and may be implemented as a shape concave in the front direction. Accordingly, a dielectric lens provided to be concave may be configured to have a form in which an electromagnetic wave is less concentrated in the air gap layer 1010*a* and diverges. However, the diverging electromagnetic wave may be reflected onto upper and lower portions of the dielectric cavity 1010C to be concentrated in a front direction.

Figure 17B:
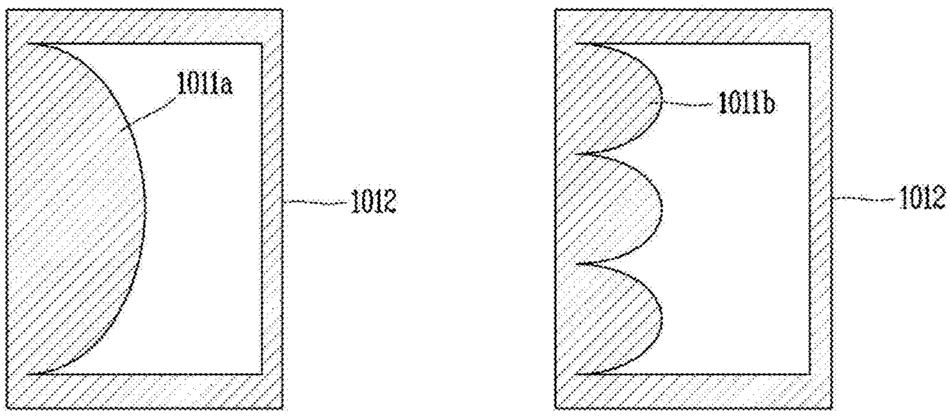
FIG. 17B illustrates various embodiments of the dielectric lens structure of FIG. 17A.

FIG. 17B illustrates various embodiments of the dielectric lens structure of FIG. 17A. Referring to (a) of FIG. 17B, the first dielectric layer is provided to have a structure of a single dielectric lens 1011*a* which is convex in the first direction. Referring to (b) of FIG. 17B, the first dielectric layer is provided to have a plurality of dielectric lens grating structures 1011*b* which is convex in the first direction. The dielectric lens grating structures 1011*b* may improve a side-lobe level (SLL) of an antenna radiation pattern. In addition, the dielectric lens grating structures 1011*b* may constantly maintain a radiation pattern in a wideband frequency range.

Figure 17C:
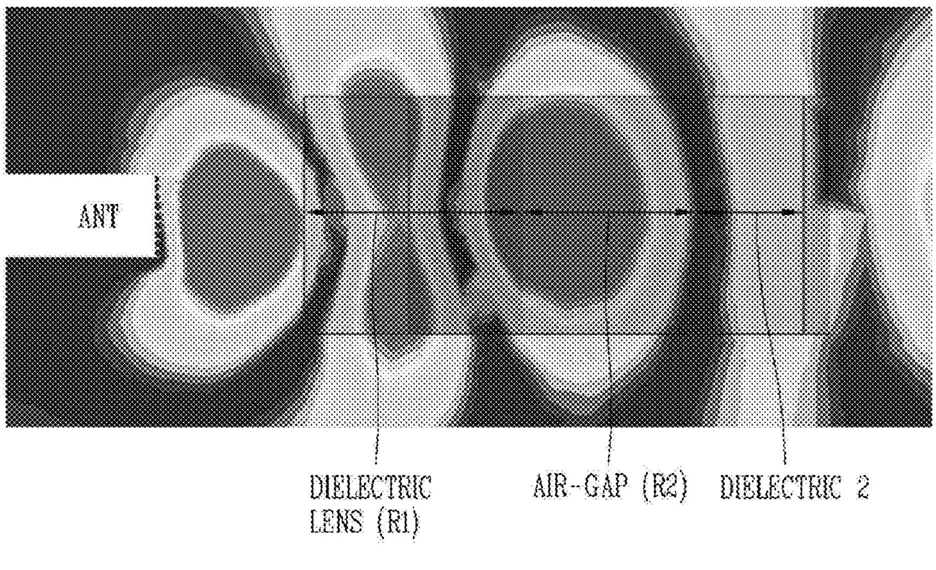
FIG. 17C illustrate an electric field distribution of an antenna module having a dielectric lens-air gap-dielectric (DLAD) structure.

FIG. 17C illustrate an electric field distribution of an antenna module having a dielectric lens-air gap-dielectric (DLAD) structure. Referring to FIGS. 17A and 17C, due to the electric lens 1011*a*, an electric field distribution is higher in a region R1 of the dielectric lens 1011*a* and a region R2 of the air gap layer 1010*a*, compared to the DAD structure of (a) of FIG. 12. Due to the dielectric lens 1011*a*, the second electric field distribution Ef2 in the region R2 of the air gap layer 1010*a* is provided to be less spread, compared to the DAD structure. Accordingly, it may be checked that the second electric field Ef2 in the region R2 of the air gap layer 1010*a* is further concentrated into the dielectric cavity 1010C.

The second dielectric layer 1012 may be provided to have a flat surface structure. According to applications, the second dielectric layer 1012 may be implemented to have a shape convex in the front direction or a shape concave in the front direction. In relation to this, the first dielectric layers 1011, 1011*a*, and 1011*b* may be provided as a first curved surface portion having a first curvature of a first shape. The second dielectric layer 1012 may be provided as a flat surface structure or a second curved surface portion having a second curvature of a second shape. Accordingly, the first dielectric layers 1011, 1011*a*, and 1011*b* and/or the second dielectric layer 1012 may improve directivity toward a front direction of the antenna module 1100.

Figure 18:
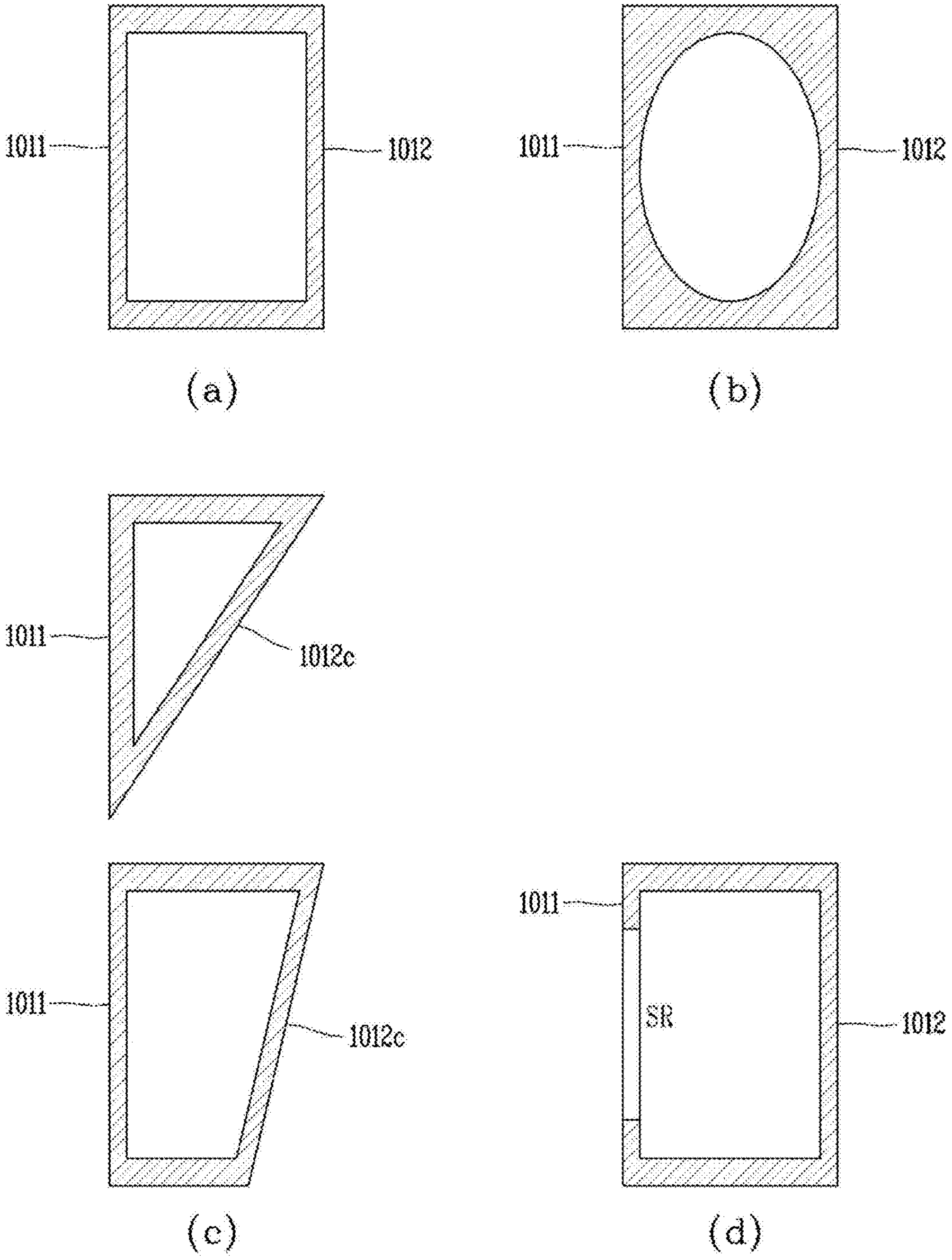
FIG. 18 illustrates dielectric-air gap structures arranged on front surfaces of antenna elements having enhanced directivity according to various embodiments.

Hereinafter, an antenna structure that may improve directivity according to various embodiments of the present disclosure is described. In relation to this, FIG. 18 illustrates dielectric-air gap structures arranged on front surfaces of antenna elements having improved directivity according to various embodiments. (a) of FIG. 18 illustrates a dielectric-air gap-dielectric (DAD) structure. (b) of FIG. 18 illustrates a dielectric lens-air gap-dielectric (DLAD) structure. (c) of FIG. 18 illustrates a dielectric-triangular air gap-dielectric (DTAD) structure. (d) of FIG. 18 illustrates a dielectric slot-air gap-dielectric (DAD) structure.

Referring to (a) of FIG. 18, the DAD structure is a structure in which the air gap layer 1010*a* is provided between the first dielectric layer 1011 and the second dielectric layer on a front surface. Referring to FIG. 9B and (a) of FIG. 18, the first dielectric layer 1011 and the second dielectric layer 1012 may be configured to be connected to each other by a dielectric constituting the first to fourth side surfaces SS1 to SS4. The DAD structure shown in (a) of FIG. 18 may be provided as a DADAD structure by adding a dielectric layer to inside of the air gap layer 1010*a*.

Referring to FIG. 17A and (b) of FIG. 18, the DLAD structure may be provided such that a surface has a concave or convex form by varying a thickness of the first dielectric layers 1011, 1011*a*, and 1011*b* or the second dielectric layer 1012 to thereby further improve an antenna gain.

Referring to (c) of FIG. 18, the DTAD structure may be configured such that a plurality of dielectrics, i.e., the first and second dielectrics 1011 and 1012*c* are not parallel with each other. Accordingly, a form of the air gap layer 1010*a* is not limited to a rectangle, but may have a shape of a triangle or any quadrangle.

Referring to FIG. 9A and (c) of FIG. 18, the first dielectric layer 1011 and the second dielectric layer 1012*c* may be configured to be connected to each other on a side surface.

The second dielectric layer 1012*c* may be arranged to be inclined at a certain angle with respect to the first dielectric layer 1011 to thereby change a direction of a radio signal radiated through the second dielectric layer 1012*c* of the antenna module 1100 by a certain angle. As an example, a direction of a radio signal radiated through the second dielectric layer 1012*c* may be changed by an inclination angle of the second dielectric layer 1012*c* in a direction vertical to the second dielectric layer 1012*c*.

The first and second dielectric layers 1011 and 1012*c* may be configured to be connected to each other at a point at a lower end or on a second surface SS by a separate dielectric. In relation to this, the front surface portion 132 of the main frame 130 of FIGS. 14A to 15C may be provided to be inclined at a certain angle.

Referring to (d) of FIG. 18, in the DSAD structure, a slot region SR may be arranged on the first dielectric layer 1011 adjacent to an antenna element. The DSAD structure may be configured such that the slot region SR is arranged on the first dielectric layer 1011*d* adjacent to the antenna element to thereby prevent antenna performance from being distorted by a reflection loss and mutual coupling of antennas. In relation to this, a location of a slot may be provided between the antenna elements 1110-1 and 1110-2 of FIG. 9A or provided to cover upper portions of the antenna elements 1110-1 and 1110-2.

When the slot region SR is provided between the antenna elements 1110-1 and 1110-2, a level of interference between the antenna elements 1110-1 and 1110-2 may be reduced. The slot region SR may be provided to cover the upper regions of the antenna elements 1110-1 and 1110-2. Accordingly, most electromagnetic waves radiated through the antenna elements 1110-1 and 1110-2 are reflected on the first and second side surfaces SS1 and SS2 in upper and lower portions to be guided. Accordingly, an electromagnetic wave may be guided through the slot region SR and the first and second side surfaces SS1 and SS2 of the first dielectric layer 1011 and the second dielectric layer 1012 to enhance antenna gains.

An antenna gain of a single antenna element is improved through an antenna structure having improved directivity disclosed herein. Accordingly, a number of antenna elements in an array antenna may be reduced. As the number of the antenna elements is reduced, a whole size of an antenna module is reduced. In relation to this, 1×4 and 1×8 array antennas may be implemented as 1×2 and 1×4 array antennas, respectively. Accordingly, the number of antenna elements in an array antenna may be reduced to a half level.

Figure 19A:
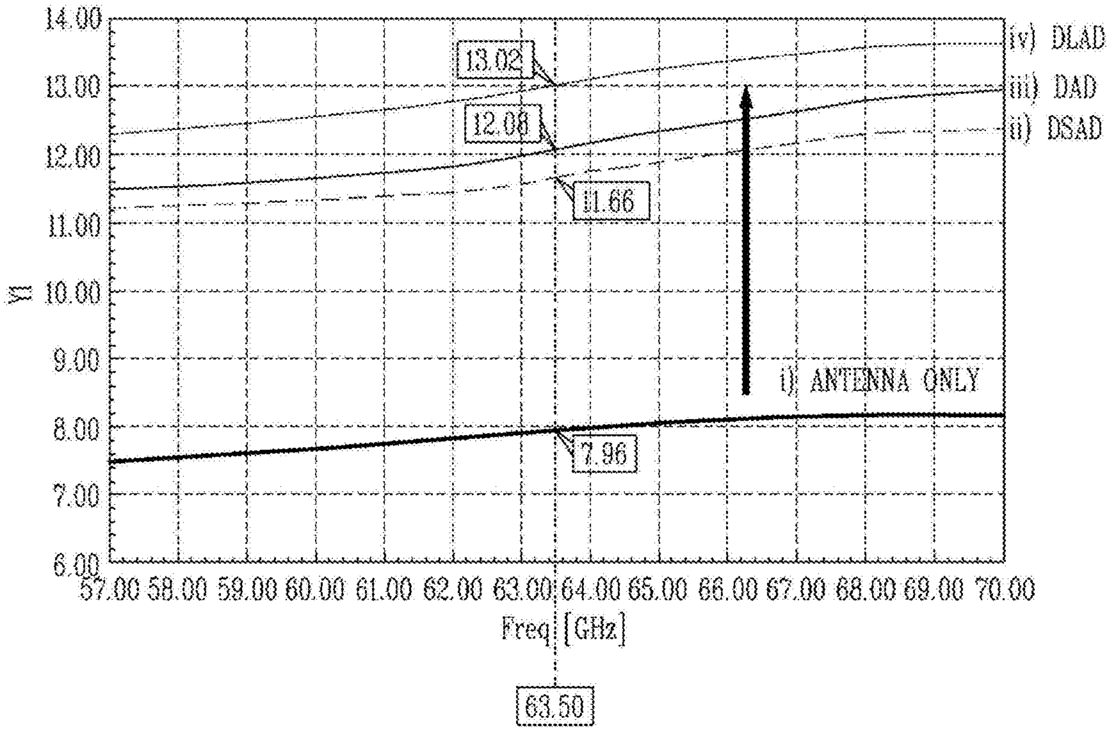
FIG. 19A illustrates antenna gain characteristics according to various antenna structures.

In relation to this, FIG. 19A illustrates antenna gain characteristics according to various antenna structures. FIG. 19A illustrates a value of a gain for each frequency according to the presence or absence and a configuration of a multi-layer structure in a 1×2 array antenna.

Referring to FIG. 19A, i) an antenna structure without a multi-layer dielectric structure (antenna only) has an antenna gain equal to or less than 8 dBi at a center frequency of 63.5 GHz. On the other hand, in the ii) DSAD, iii) DAD, and iv) DLAD structures, an antenna gain has a maximum value equal to or greater than 13 dBi at a center frequency of 63.5 GHz. Accordingly, an antenna gain may be improved by 5 dBi or greater at maximum through a multi-layer dielectric structure in which an air gap is provided. Antenna gains in various multi-layer dielectric structures are in an order such that ii) DSAD<iii) DAD<iv) DLAD.

Figure 19B:
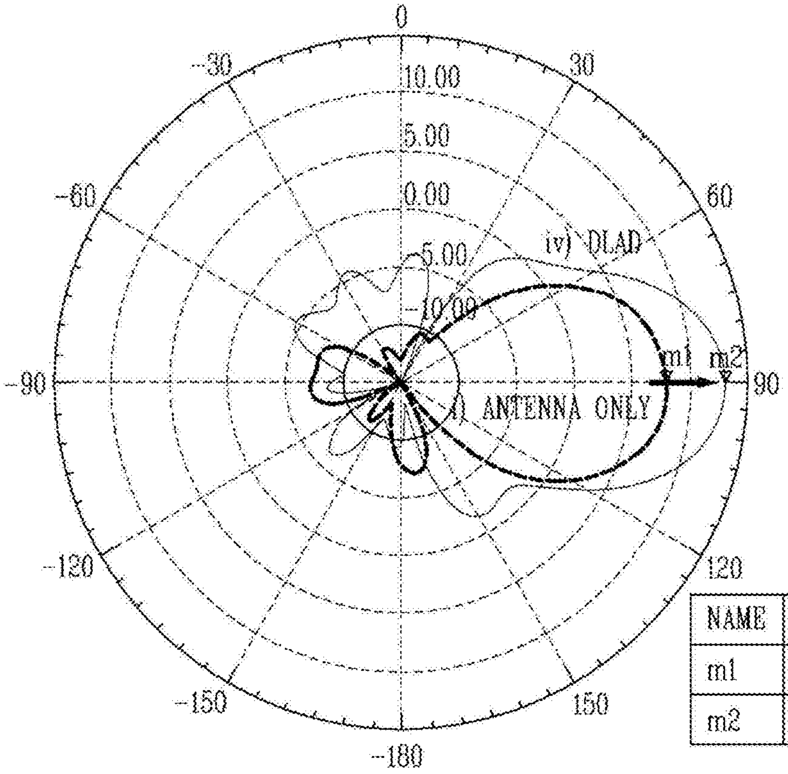
FIG. 19B illustrates a comparison of antenna radiation patterns of i) an antenna structure without a multi-layer dielectric structure (antenna-only) and iv) an antenna structure having a DLAD structure.

FIG. 19B illustrates a comparison of antenna radiation patterns of i) an antenna structure without a multi-layer dielectric structure (antenna-only) and iv) an antenna structure having a DLAD structure. Referring to FIG. 19B, antenna directivity is improved in a front direction toward which an electromagnetic wave proceeds iv) through the DLAD structure. Directivity is further improved in a front direction in the DLAD structure, compared to other structures such as a DSAD or DAD structure, and thus, a flat-top radiation pattern is implemented. Due to the flat-top radiation pattern, directivity is improved within a certain range of angles with reference to a direction of 90 degrees, a side direction of a multi-layer substrate, i.e., a front direction of an electronic device. In addition, since a radiation level outside a certain range of angles is reduced due to the flat-top radiation pattern, a radiation level is decreased, thereby reducing an interference level.

Figure 20:
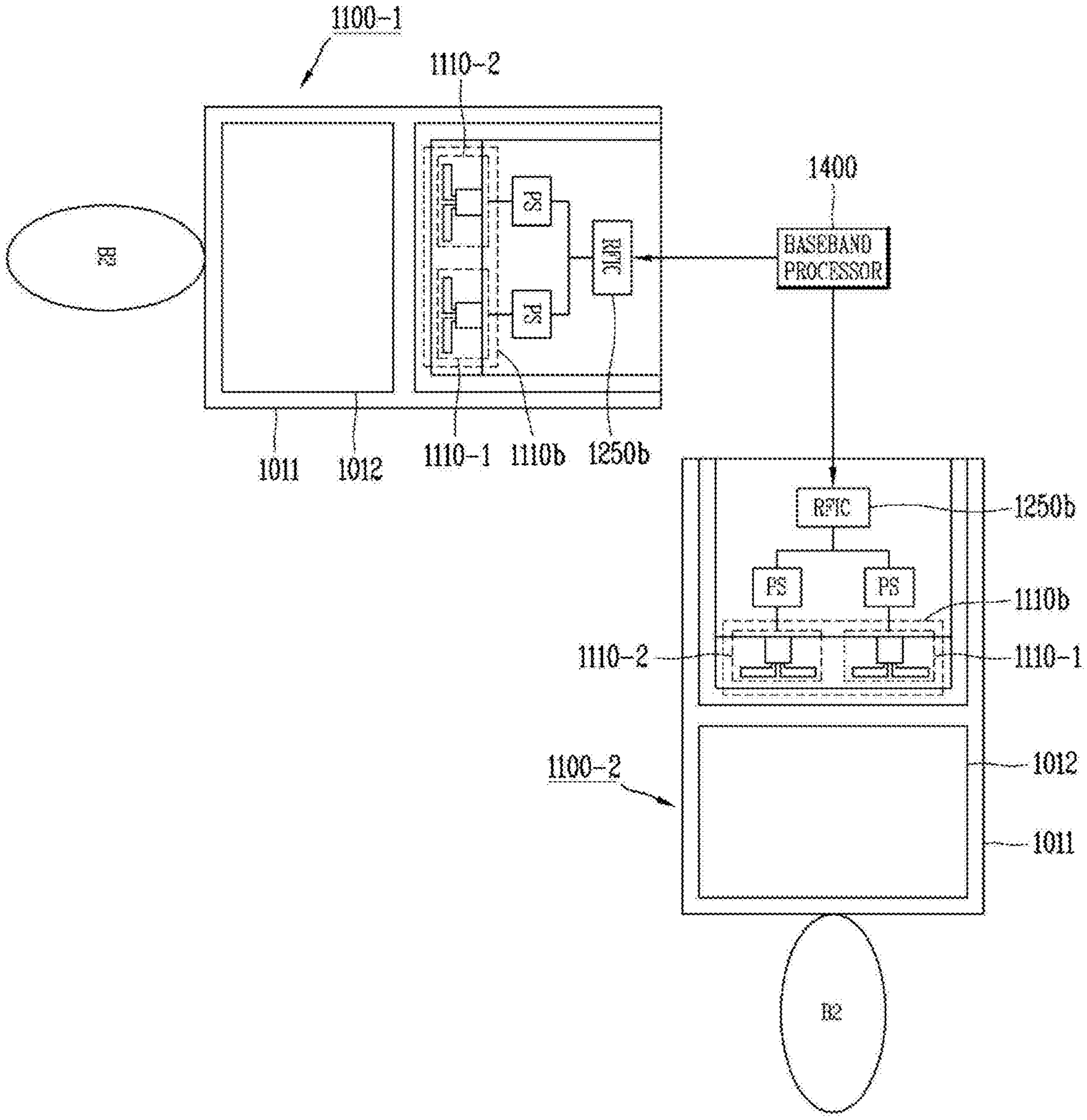
FIG. 20 illustrates a configuration in which antenna elements in an antenna module having a DAD structure according to one embodiment of the present disclosure may be controlled through a transceiver circuit.

The antenna module 1100 having improved directivity disclosed herein may be electrically connected to the transceiver circuit 1250. In relation to this, FIG. 20 illustrates a configuration in which antenna elements in an antenna module having a DAD structure according to one embodiment of the present disclosure may be controlled through a transceiver circuit.

Referring to FIGS. 5C, 9A, 14A to 16, and 20, the antenna module 1100 may further include the transceiver circuit 1250. The antenna module 1100 may be arranged on a rear surface of the multi-layer substrate 1010, but is not limited thereto. The antenna module 1100 may be electrically connected to the antenna elements 1110-1 and 1110-2 and configured to apply a radio frequency (RF) signal. The transceiver circuit 1250 may be configured to apply signals having different phases to the antenna elements 1110-1 and 1110-2. To do so, a phase control element such as a phase shifter (PS) may be electrically connected to each of the antenna elements 1110-1 and 1110-2. Accordingly, the transceiver circuit 1250 may apply a signal to the antenna elements 1110-1 and 1110-2 to radiate a beamforming radio signal through the antenna module 1100.

The antenna substrate 1010 may be configured as the multi-layer substrate 1010 including a plurality of dielectric layers and a conductive layer. The antenna elements 1110-1 and 1110-2 may be arranged on or inside the multi-layer substrate 1010 and configured to radiate a beamforming signal through a side surface of the multi-layer substrate 1010.

The antenna module 1100 may be configured to include the antenna modules 1100-1 and 1100-2 that may be arranged in different regions of an electronic device, The first antenna module 1100-1 may be configured to generate a first beam B1 in a front direction of the electronic device. The second antenna module 1100-2 may be configured to generate a second beam B2 in a side direction of the electronic device.

Transceiver circuits 1250 and 1250*b* may apply a first or second signal to the first or second array antenna 1110*a* or 1110*b* to radiate a first or second beamforming signal B1 or B2 through the antenna module 1100-1 or 1100-2. The transceiver circuit 1250 or 1250*b* may be operably coupled to the baseband processor 1400. The baseband processor 1400 corresponding to a modem may apply signals through the first or second transceiver circuit.

An electronic device equipped with an antenna module having improved directivity according to an aspect of the present disclosure has been described above. Hereinafter, an antenna module having improved directivity according to another aspect of the present disclosure is to be described. Hereinafter, only some main features of the antenna module having improved directivity will be described. This description may be combined with the aforementioned structure and features of the electronic device including the antenna module.

Referring to FIGS. 5A to 20, the antenna module 1100 implemented as a multi-layer substrate may include the antenna substrate 1010, the first dielectric layers 1011, 1011*a*, 1011*b*, and 1011*d*, and the second dielectric layers 1012 and 1012*c*. The antenna module 1100 may be configured to further include the air gap layer 1010*a* arranged between the first dielectric layers 1011, 1011*a*, 1011*b*, and 1011*d*, and the second dielectric layers 1012 and 1012*c*.

The antenna substrate 1010 may be configured such that a plurality of antenna elements are arranged thereon. The first dielectric layers 1011, 1011*a*, 1011*b*, and 1011*d* may be configured to be apart from one side surface of the antenna substrate 1010 in a first direction (a front direction) toward which the antenna elements 1110, 1110-1, and 1110-2 radiate a signal to have elements arranged thereon. The second dielectric layer 1012 and 1012*c* may be arranged to be apart from the first dielectric layer 1011, 1011*a*, 1011*b*, and 1011*d* in the first direction.

The first dielectric layers 1011, 1011*a*, 1011*b*, and 1011*d* may be provided to have a first width W1 in the first direction. An average thickness of the first dielectric layers 1011*a* and 1011*b* may be provided to have the first width W1 in the first direction. The second dielectric layers 1012 and 1012*c* may be provided to have a second width W2 in the first direction. The air gap layer 1010*a* may be provided to have a particular gap G in the first direction. The gap G in the air gap layer 1010*a* between the first dielectric lenses 1011*a* and 1011*b* and the second dielectric layers 1012 and 1012*c* may be determined by taking into account an average thickness of the air gap layer 1010*a*.

The first dielectric layers 1011, 1011*a*, 1011*b*, and 1011*d* and the second dielectric layer 1012 and 1012*c* may be connected to each other through the first to fourth side surfaces SS1 to SS4 constituting a side surface region of the antenna module 1100. The first dielectric layers 1011, 1011*a*, 1011*b*, and 1011*d* and the second dielectric layer 1012 and 1012*c* may constitute a hexahedron structure having an air gap layer implemented therein, i.e., the dielectric cavity 1010C.

The first dielectric layers 1011, 1011*a*, 1011*b*, and 1011*d* may constitute a rear surface of the hexahedron structure 1010C, and the second dielectric layer 1012 and 1012*c* may constitute a front surface of the hexahedron structure 1010C. Accordingly, the hexahedron structure 1010C may be configured to be arranged on an existing antenna module. As another example, an external mechanical structure of the antenna module 1100 may be provided integrally to include the hexahedron structure 1010C. A radio signal radiated through the antenna elements 1110-1 and 1110-2 may have directivity toward a front direction through the dielectric cavity 1010C corresponding to a hexahedron structure.

Figure 21A:
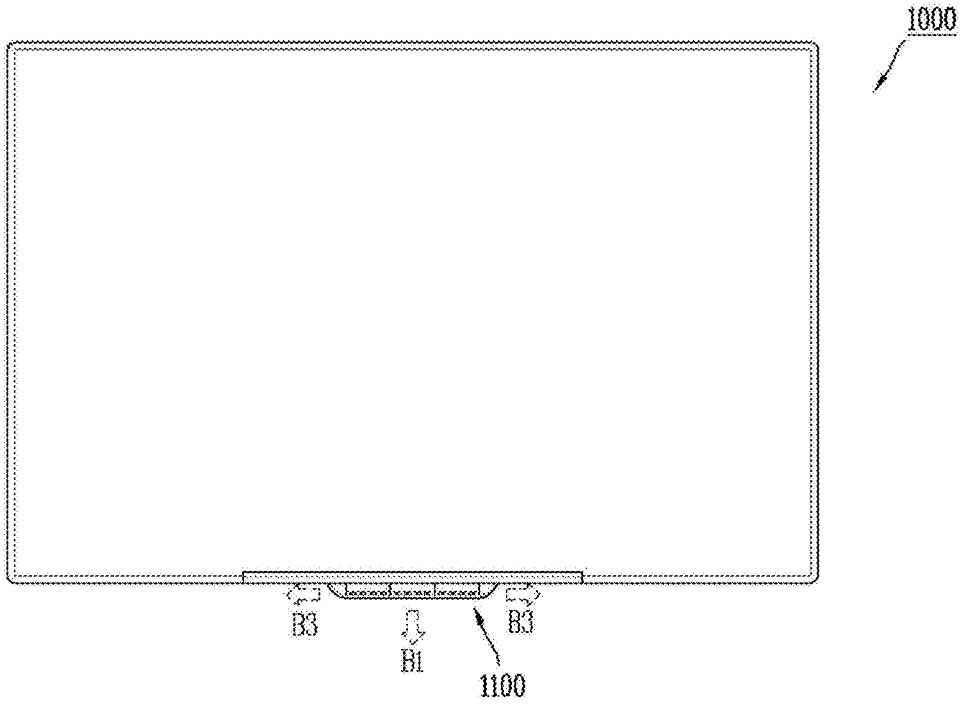
FIG. 21A illustrates a structure in which an antenna module 1100 including a first type antenna and a second type antenna both provided as an array antenna is arranged in an electronic device 1000.
Figure 21B:
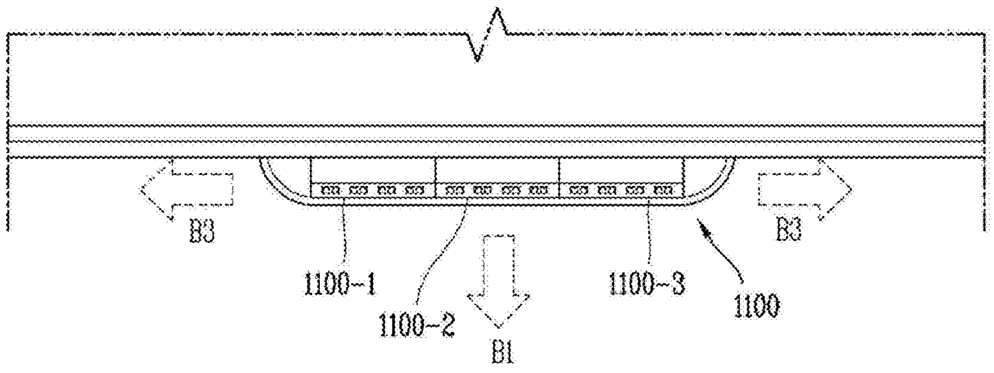
FIG. 21B is a magnified view of a plurality of array antenna modules.

An antenna module including a multi-layer dielectric structure having improved directivity disclosed herein may be configured as an array antenna. In relation to this, FIG. 21A illustrates a structure in which the antenna module 1100 including a first type antenna and a second type antenna provided as an array antenna is arranged in the electronic device 1000. FIG. 21B is a magnified view of a plurality of array antenna modules.

Referring to FIGS. 1 to 21B, an array antenna may include the first array antenna module 1100-1 and the second array antenna module 1100-2 arranged apart from the first array antenna module 1100-1 by a certain distance in a first horizontal direction. Array antenna modules are not limited to two array antenna modules. Three or more array antenna modules may be implemented as illustrated in FIG. 21B. Accordingly, the array antenna may be configured to include the first to third array antenna modules 1100-1 to 1100-3. As an example, at least one of first to third array antenna module 1100-1 to 1100-3 may be arranged on a side surface of the antenna module 1100 and configured to provide a beam in a side direction B3. As another example, at least one of the first array antenna module 1100-1 and the third array antenna module 1100-3 may be arranged on a front surface of the antenna module 1100 and configured to provide a beam in a front direction B1. In relation to this, first and second beams may be provided in the front direction B1 using the first array antenna module 1100-1 and the second array antenna module 1100-2, respectively.

Figure 9B:
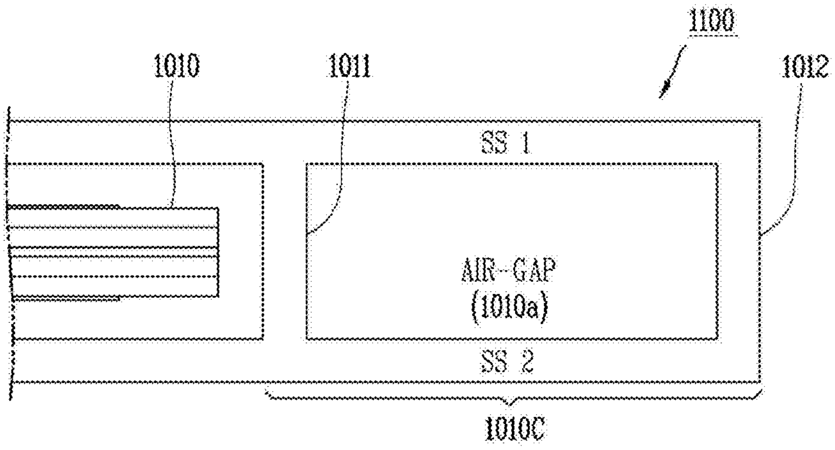

The processor 1400 corresponding to the modem of FIGS. 5C and 9 may control to provide the first beam and the second beam in the first direction and the second direction using the first and second array antenna modules 1100-1 and 1100-2, respectively. That is, the processor 1400 may provide the first beam from a horizontal direction toward the first direction using the first array antenna module 1100-1. In addition, the processor 1400 may provide the second beam from the horizontal direction toward the second direction using the second array antenna module 1100-2. In relation to this, the processor 1400 may perform MIMO using the first beam in the first direction and the second beam in the second direction.

In addition, the array antenna radiating a signal in a lower direction may be also configured as a plurality of array antenna modules. In relation to this, the array antenna module 1100 of FIGS. 14B, 15B, and 15C may be also configured as a plurality of array antenna modules spaced apart by a certain interval in a horizontal direction.

The processor 1400 may provide a third beam in a third direction using the first and second array antenna modules 1100-1 and 1100-2. In relation to this, the processor 1400 may control the transceiver circuit 1250 to synthesize signals received through the first and second array antenna modules 1100-1 and 1100-2. Also, the processor 1400 may control the signals transmitted to the first and second array antenna modules 1100-1 and 1100-2 through the transceiver circuit 1250 to be distributed to each antenna element. The processor 1400 may perform beamforming using a third beam having a beam width smaller than beam widths of the first beam and the second beam.

The processor 1400 may perform MIMO using the first beam in the first direction and the second beam in the second direction, and perform beamforming using the third beam having a beam width smaller than beam widths of the first and second beams. In relation to this, when quality of the first signal and the second signal received from another electronic device in a periphery of the electronic device is equal to or less than a threshold, beamforming may be performed using the third beam.

A number of elements of the array antenna is not limited to two, three, four, or the like as illustrated in the drawing.

For example, the number of the elements of the array antenna may be expanded to 4, 8, 16, or the like. In an antenna module including a multi-layer antenna structure having enhanced directivity disclosed herein, the number of antenna elements in an array antenna may be reduced to a half or less. As an example, in an antenna module including a multi-layer antenna structure having enhanced directivity disclosed herein, a previous 1×4 or 1×8 antenna may be may be implemented as a 1×2 or 1×4 array antenna.

Figure 22:
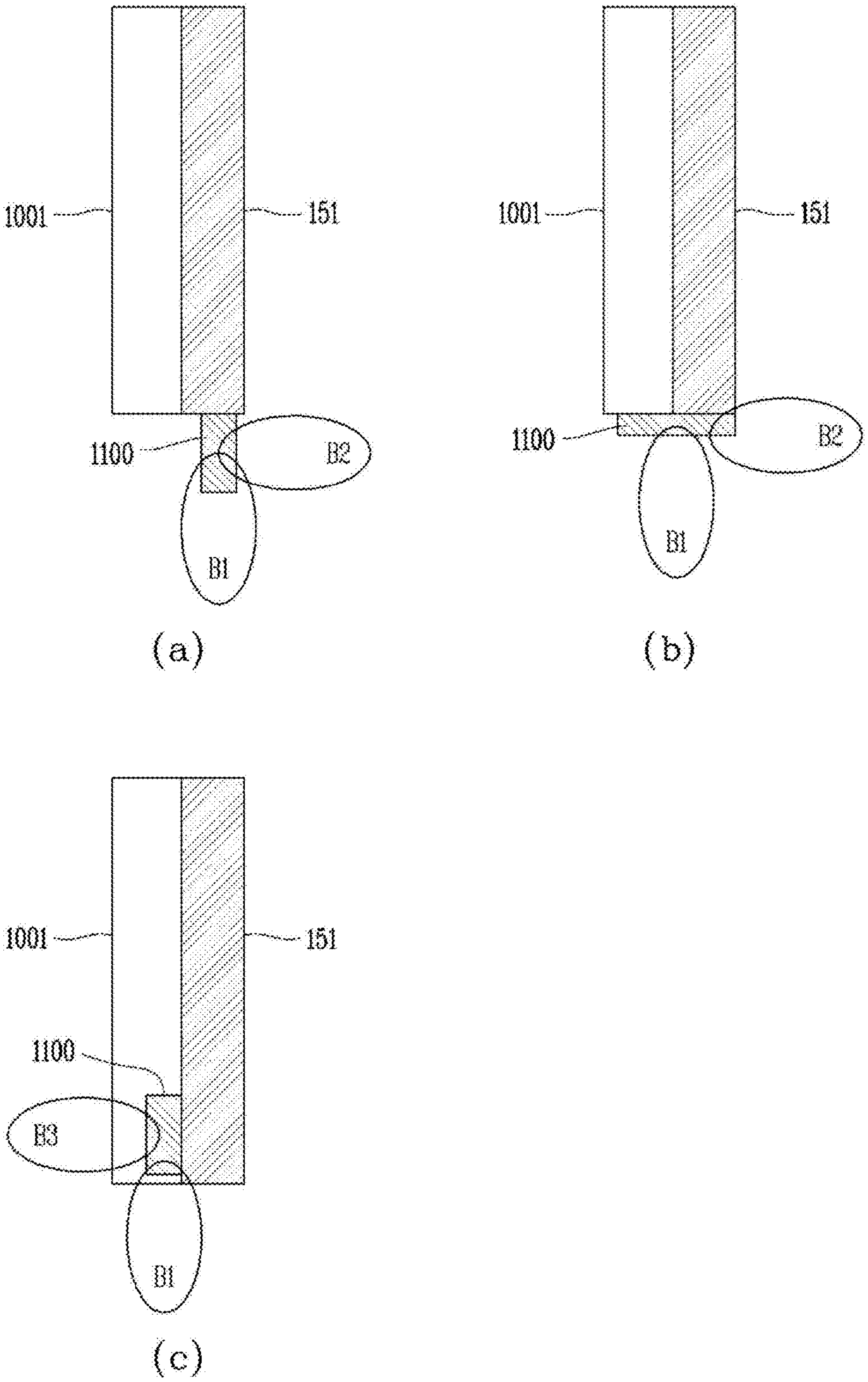
FIG. 22 illustrates antenna modules combined to have different combination structures in a particular position in the electronic device according to embodiments.

FIG. 22 illustrates antenna modules combined to have different combination structures at a particular position in the electronic device. Referring to (a) of FIG. 22, the antenna module 1100 may be arranged in a lower region of a display 151 to be substantially horizontal with the display 151. Accordingly, the beam B1 may be generated in a lower direction of the electronic device through a monopole radiator. Another beam, i.e., the second beam B2 may be generated in a front direction of the electronic device through a patch antenna.

Referring to (b) of FIG. 22, the antenna module 1100 may be arranged in a lower region of the display 151 to be substantially vertical to the display 151. Accordingly, the beam B2 may be generated in a front direction of the electronic device through the monopole radiator. Another beam B1, i.e., the first beam B1 may be generated in a lower direction of the electronic device through the patch antenna.

Referring to (c) of FIG. 22, the antenna module 1100 may be arranged in a rear case 1001 corresponding to a mechanical structure. The antenna module 1100 may be arranged substantially parallel to the display 151 in the rear case 1001. Accordingly, the beam B2 may be generated in a lower direction of the electronic device through a monopole radiator. Another beam, i.e., a third beam B3 may be generated in a rear direction of the electronic device through the patch antenna.

Referring to FIGS. 1 to 22, the array antenna modules 1100-1 to 1100-3 implemented on the multi-layered substrate 1010 according to an embodiment of the present disclosure is described.

The array antenna modules 1100-1 to 1100-3 may include the antenna substrate 1010, the first dielectric layers 1011, 1011*a*, 1011*b*, and 1011*d*, and the second dielectric layers 1012 and 1012*c*. The array antenna modules 1100-1 to 1100-3 may further include the air gap layer 1010*a* arranged between the first dielectric layers 1011, 1011*a*, 1011*b*, and 1011*d* and the second dielectric layers 1012 and 1012*c*.

The antenna substrate 1010 may be configured such that a plurality of antenna elements are arranged thereon. The first dielectric layers 1011, 1011*a*, 1011*b*, and 1011*d* may be configured to be apart from one side surface of the antenna substrate 1010 in a first direction (a front direction) toward which the antenna elements 1110, 1110-1, and 1110-2 radiate a signal to have elements arranged thereon. The second dielectric layer 1012 and 1012*c* may be arranged to be apart from the first dielectric layer 1011, 1011*a*, 1011*b*, and 1011*d* in the first direction.

The first dielectric layers 1011, 1011*a*, 1011*b*, and 1011*d* may be provided to have a first width W1 in the first direction. An average thickness of the first dielectric layers 1011*a* and 1011*b* may be provided to have the first width W1 in the first direction. The second dielectric layers 1012 and 1012*c* may be provided to have a second width W2 in the first direction. The air gap layer 1010*a* may be provided to have a particular gap G in the first direction. The gap G in the air gap layer 1010*a* between the first dielectric lenses 1011*a* and 1011*b* and the second dielectric layers 1012 and 1012*c* may be determined by taking into account an average thickness of the air gap layer 1010*a*.

The first dielectric layers 1011, 1011*a*, 1011*b*, and 1011*d* and the second dielectric layers 1012 and 1012*c* may be connected to each other through the first to fourth side surfaces SS1 to SS4 constituting a side surface region of the array antenna modules 1100-1100-3. The first dielectric layers 1011, 1011*a*, 1011*b*, and 1011*d* and the second dielectric layer 1012 and 1012*c* may constitute a hexahedron structure having an air gap layer implemented therein, i.e., the dielectric cavity 1010C.

The first dielectric layers 1011, 1011*a*, 1011*b*, and 1011*d* may constitute a rear surface of the hexahedron structure 1010C, and the second dielectric layer 1012 and 1012*c* may constitute a front surface of the hexahedron structure 1010C. Accordingly, the hexahedron structure 1010C may be configured to be arranged on an existing antenna module. As another example, an external mechanical structure of the array antenna modules 1100-1 to 1100-3 may be provided integrally to include the hexahedron structure 1010C. A radio signal radiated through the antenna elements 1110-1 and 1110-2 may have directivity toward a front direction through the dielectric cavity 1010C corresponding to a hexahedron structure.

An antenna module in a multi-layer dielectric structure having enhanced directivity and an electronic device including the antenna module have been described above. Hereinafter, technical effects of an antenna module implemented as a multi-layer substrate disclosed herein, and an electronic device including the antenna module are to be described.

According to embodiments, a wideband antenna module adopting a dielectric module structure to which a multi-layer dielectric structure operating in a millimeter wave band is applied, and an electric device including the wideband antenna module may be provided.

According to embodiments, in designing a multi-layer antenna structure in a millimeter wave band, a dielectric module structure to which a multi-layer dielectric structure is applied is implemented to improve directivity of an antenna element to thereby improve an antenna gain.

According to embodiments, in designing a multi-layer antenna structure in a millimeter wave band, an air gap is implemented to enhance efficiency of an antenna element to thereby improve an antenna gain.

According to embodiments, an antenna module to which a dielectric module structure is applied may be arranged in different positions below an electronic device to thereby perform wireless communication with various peripheral electronic devices in several directions.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art. In relation to the present disclosure described above, designing and driving of an antenna operating in a millimeter waver band and an electronic device controlling the antenna may be implemented as computer-readable codes on a medium having a program recorded thereon.

The computer-readable medium includes all kinds of recording devices in which data readable by a computer system is stored. Examples of the computer-readable medium include a hard disk drive (HDD), a solid-state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). The computer may include the control unit of the terminal. The above detailed description should not be limitedly construed in all aspects and should be considered as illustrative. The scope of the present disclosure should be determined by reasonable interpretation of the appended claims, and all changes within the scope of equivalents of the present disclosure are included in the scope of the present disclosure.

What is claimed is:

1. An electronic device comprising:

a display;

a main frame disposed along a peripheral region of the display and arranged to extend along a side region and a rear region of the electronic device; and at least one antenna module disposed at a side of the main frame and configured to radiate a radio signal in at least one direction, wherein each of the at least one antenna module comprises:

an antenna substrate on which a plurality of antenna elements are arranged; and a dielectric-air gap-dielectric (DAD) structure arranged to correspond to a corresponding direction of the at least one direction, wherein the dielectric-air gap-dielectric (DAD) structure comprises:

a first dielectric layer spaced apart from the antenna substrate with respect to the corresponding direction; and a second dielectric layer forming a peripheral region of the antenna module and spaced apart from the first dielectric layer with respect to the corresponding direction and such that an air gap is defined between the first dielectric layer and the second dielectric layer, wherein the air gap of one of the at least one antenna module is defined to have a triangular cross-sectional shape configured to enhance a directivity of the radiated radio signal in a specified direction, and wherein the triangular cross-sectional shape is defined by:

a first short side surface defining the air gap located near the display;

a first side surface of the first dielectric layer; and a first side surface of the second dielectric layer.

2. The electronic device of claim 1, wherein the triangular cross-sectional shape is configured to enhance an efficiency of the radiated radio signal in the specified direction.

3. The electronic device of claim 1, wherein the triangular cross-sectional shape is configured to enhance an antenna gain of the radiated radio signal in the specified direction.

4. The electronic device of claim 1, wherein the first dielectric layer and the second dielectric layer are connected to each other at a side surface.

5. The electronic device of claim 4, wherein the second dielectric layer is angled at a certain angle relative to the first dielectric layer, and the radiated radio signal is radiated through the second dielectric layer toward the specified direction based on the certain angle.

6. The electronic device of claim 1, wherein the first dielectric layer is provided as a dielectric lens that is convex in the specified direction.

7. The electronic device of claim 1, wherein the first dielectric layer is provided as a dielectric lens that is concave in the specified direction.

8. The electronic device of claim 1, wherein the first dielectric layer is configured to surround the antenna substrate so that the antenna substrate is fixedly disposed inside the antenna module.

9. The electronic device of claim 1, further comprises a third dielectric layer disposed between the first dielectric layer and the second dielectric layer.

10. The electronic device of claim 9, wherein a third permittivity of the third dielectric layer is lower than a first permittivity of the first dielectric layer and a second permittivity of the second dielectric layer.

11. The electronic device of claim 1, wherein the antenna module further comprises a transceiver circuit arranged on a multi-layer substrate and configured to be electrically connected to the plurality of antenna elements to apply a radio frequency (RF) signal, and wherein the transceiver circuit is configured to control the plurality of antenna elements to radiate a beamforming radio signal through the antenna module by applying signals having different phases to the plurality of antenna elements.

12. The electronic device of claim 1, wherein the antenna substrate is configured as a multi-layer substrate comprising a plurality of dielectric layers and a conductive layer, and wherein the plurality of antenna elements are arranged on or inside the multi-layer substrate to radiate a beamforming signal through a side surface of the multi-layer substrate.

13. An antenna module configured to radiate a radio signal in at least a specified direction and implemented as a multi-layer substrate, the antenna module comprising:

an antenna substrate on which a plurality of antenna elements are arranged; and a dielectric-air gap-dielectric (DAD) structure arranged in a specified direction, wherein the dielectric-air gap-dielectric (DAD) structure comprises:

a first dielectric layer spaced apart from the antenna substrate with respect to the specified direction;

a second dielectric layer forming a peripheral region of the antenna module and spaced apart from the first dielectric layer with respect to the specified the direction such that an air gap is defined between the first dielectric layer and the second dielectric layer, wherein the air gap is defined to have a triangular cross-sectional shape configured to enhance a directivity of the radiated radio signal in a specified direction, and wherein the triangular cross-sectional shape is defined by:

a first short side surface defining the air gap;

a first side surface of the first dielectric layer; and a first side surface of the second dielectric layer.

14. The antenna module of claim 13, wherein the triangular cross-sectional shape is configured to enhance an efficiency of the radiated radio signal in the specified direction.

15. The antenna module of claim 13, wherein the triangular cross-sectional shape is configured to enhance an antenna gain of the radiated radio signal in the specified direction.

16. The antenna module of claim 13, wherein the first dielectric layer and the second dielectric layer are connected to each other at a side surface.

17. The antenna module of claim 16, wherein the second dielectric layer is angled at a certain angle relative to the first dielectric layer, and the radiated radio signal is radiated through the second dielectric layer toward the specified direction based on the certain angle.

18. The antenna module of claim 13, wherein the first dielectric layer is configured to surround the antenna substrate so that the antenna substrate is fixedly disposed inside the antenna module.

19. The antenna module of claim 13, further comprises a third dielectric layer disposed between the first dielectric layer and the second dielectric layer.

20. The antenna module of claim 19, wherein a third permittivity of the third dielectric layer is lower than a first permittivity of the first dielectric layer and a second permittivity of the second dielectric layer.

* * * * *